(12) United States Patent
Myrick

(10) Patent No.: US 10,941,500 B1
(45) Date of Patent: Mar. 9, 2021

(54) METHOD AND SYSTEM FOR DIAMOND ELECTRODEPOSITION

(71) Applicant: James J. Myrick, Glencoe, IL (US)

(72) Inventor: James J. Myrick, Glencoe, IL (US)

( * ) Notice: Subject to any disclaimer, the term of this patent is extended or adjusted under 35 U.S.C. 154(b) by 0 days.

(21) Appl. No.: 16/369,393

(22) Filed: Mar. 29, 2019

Related U.S. Application Data

(63) Continuation-in-part of application No. 14/150,750, filed on Jan. 8, 2014, now abandoned, which is a continuation-in-part of application No. 13/651,337, filed on Oct. 12, 2012, now Pat. No. 9,604,020.

(60) Provisional application No. 61/546,547, filed on Oct. 12, 2011, provisional application No. 61/750,193, filed on Jan. 8, 2013.

(51) Int. Cl.
| | | |
|---|---|---|
| *C25D 9/08* | (2006.01) |
| *C25D 5/48* | (2006.01) |
| *C25D 17/10* | (2006.01) |
| *C25D 5/10* | (2006.01) |
| *C25D 5/18* | (2006.01) |
| *C25D 7/10* | (2006.01) |
| *C25D 5/00* | (2006.01) |
| *C01B 32/25* | (2017.01) |

(52) U.S. Cl.
CPC ............... *C25D 9/08* (2013.01); *C25D 5/011* (2020.08); *C25D 5/10* (2013.01); *C25D 5/18* (2013.01); *C25D 5/48* (2013.01); *C25D 17/10* (2013.01); *C01B 32/25* (2017.08); *C25D 7/10* (2013.01)

(58) Field of Classification Search
None
See application file for complete search history.

(56) References Cited

U.S. PATENT DOCUMENTS

2013/0341204 A1* 12/2013 Sung ............... C25B 11/0442
205/626

* cited by examiner

*Primary Examiner* — Brian W Cohen
(74) *Attorney, Agent, or Firm* — Husch Blackwell LLP

(57) ABSTRACT

A method and system for electrodeposition of high-sp3 diamond/DLC by significantly increasing the sp3 carbon content of electrodeposited net-shape diamond, and use of same for manufacture of particulate and nanocrystalline diamond and composites.

12 Claims, 6 Drawing Sheets

900

402 — ~7 μ diameter carbon fiber, ~3-5 GPa tensile strength

406 — Covalent surface functionalization for matrix resin bonding

404 — Monolithically contiguous diamond/DLC layer 0.25 –2 μ thick, 20 – 100 GPa hardness, 7-30 GPa tensile strength, FIGURE 9     900
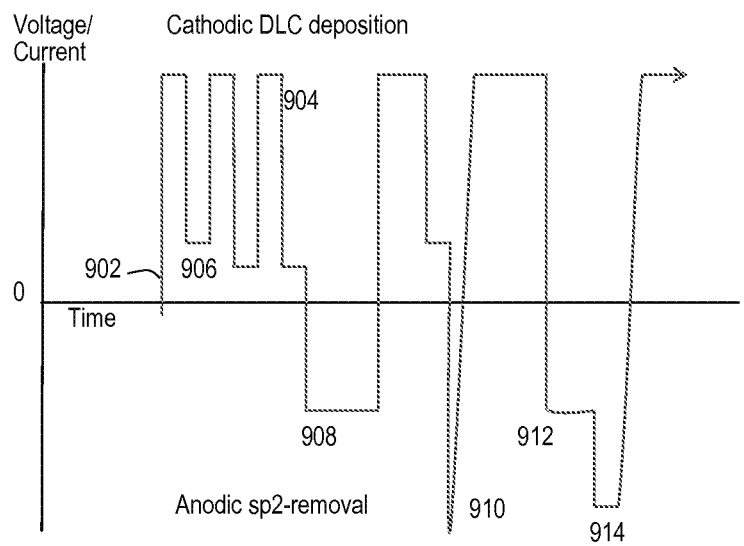
FIGURE 10    1000
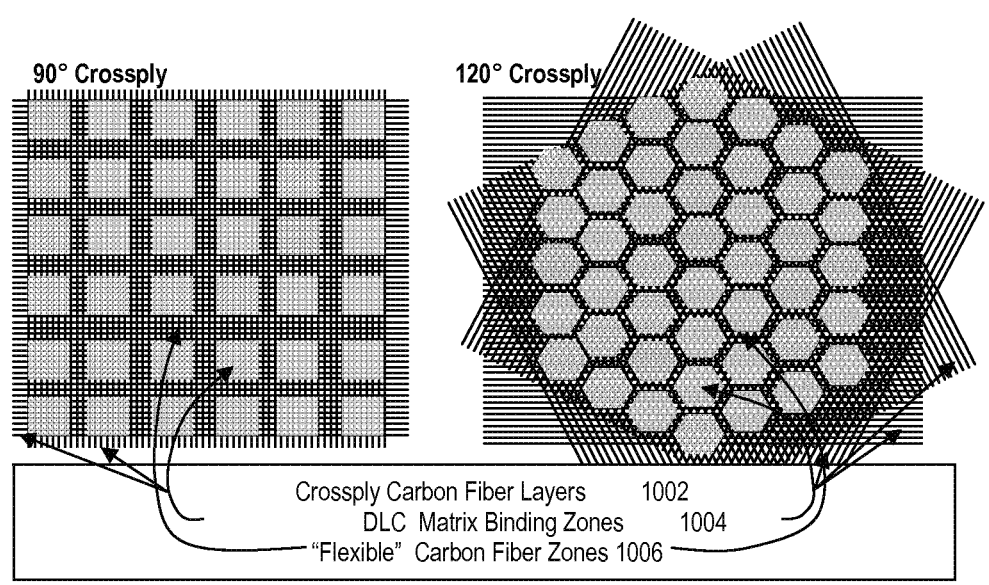

1102 Protective Vest (water containing)

1104 Drinking Water Outlet, Fill

1106 Water flush, optional thermoelectric heat-cool system

1204 – grafted polymer or oligomer

1202 Graphene nanosheet 1 Carbon atom thick ~0.05 to 5 microns wide-long 10-50 vol% C/BN nanoplatelets 1202

1204 Grafted polymer

1304 Thin 95% open porous PE foam (to hold drinking water)

1302 crossed UHMWPE fibers in "conch-like" graphene composite

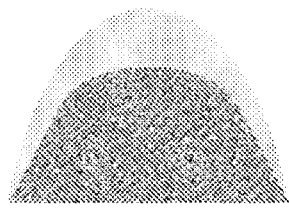

DLC 1102 on TiC, W, WC, TaC, polycrystalline diamond compact 1104

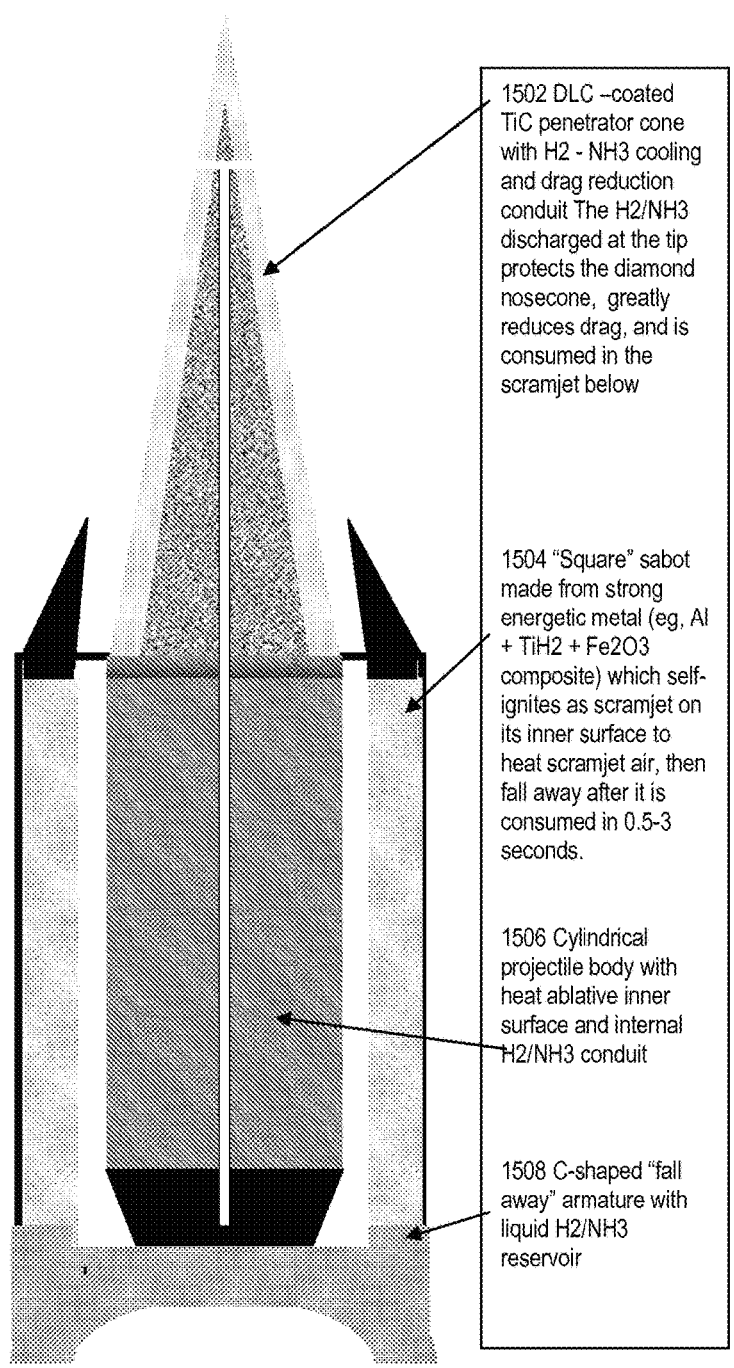

1502 DLC –coated TiC penetrator cone with H2 - NH3 cooling and drag reduction conduit The H2/NH3 discharged at the tip protects the diamond nosecone, greatly reduces drag, and is consumed in the scramjet below 1504 "Square" sabot made from strong energetic metal (eg, Al + TiH2 + Fe2O3 composite) which self-ignites as scramjet on its inner surface to heat scramjet air, then fall away after it is consumed in 0.5-3 seconds.

1506 Cylindrical projectile body with heat ablative inner surface and internal H2/NH3 conduit 1508 C-shaped "fall away" armature with liquid H2/NH3 reservoir

METHOD AND SYSTEM FOR DIAMOND ELECTRODEPOSITION

RELATED APPLICATIONS

This application is a continuation-in-part from U.S. patent application Ser. No. 14/150,750 of the same title filed Jan. 8, 2014, which (a) claimed priority to U.S. Provisional Application Ser. No. 61/750,193 having the same title and filed on Jan. 8, 2013 and which (b) is a continuation in part from U.S. patent application Ser. No. 13/651,377 of the same title filed on Oct. 12, 2012, said application Ser. No. 13/651,377 claims priority to U.S. Provisional Application Ser. No. 61/546,547 that was filed on Oct. 12, 2011, from which priority is claimed.

FIELD OF THE INVENTION

The present invention relates to electrodeposition of high-sp3 diamond/diamondlike carbon (DLC), manufacture of particulate diamond and diamondlike carbon, and to compositions, processes, products, devices and applications relating thereto.

BACKGROUND OF THE INVENTION

Artificially-manufactured diamond and diamondlike materials are strategic materials of the 21st century[1]. Diamond is a unique material with enormous strength, rigidity, incompressibility, thermal conductivity, hardness, and low-friction properties. It has extremely high electrical resistance, but can be made electrically conductive by appropriate doping. Its noncorroding inertness and reasonably high operating temperatures are also important characteristics. But practical bulk use of both natural and artificial diamond and diamondlike carbon have been limited by cost and size barriers.

DLC is conventionally manufactured by vapor deposition such as pulsed laser, chemical vapor and microwave plasma deposition. Such vapor deposition processes are relatively expensive, can produce very high internal stress as a result of thermal expansion mismatch, and are not well-suited for inexpensive mass-production of large-scale monolithic diamond interfaces on substrates such as large bearings and graphite fiber. CVD processing can etch substrates such as carbon fibers, preferentially creating or enhancing mechanical defects, thereby weakening fiber structural strength. CVD does not generally produce smooth diamond coatings on substrates such as carbon fibers, and typically utilizes small-volume-scale, expensive equipment.

Because of the expense and other limitations of DLC vapor deposition processes such as CVD, extensive research (eg, in China and India) has tested low-temperature electrolysis of organic liquids such as MeOH, DMF, DMSO and acetonitrile, with the goal of inexpensive, scalable, electrodeposition of diamond and diamondlike carbon (DLC)[2]. Smooth glassy DLC, and even some small particles of crystalline diamond, can be electrodeposited[3]. Yan et al and Wang et al have reported electrodeposited DLC films with moderately high (up to 19 GPa) hardness from simple methyl alcohol electrolyte. Gupta et al. report high-hydrogen-content DLC films electrodeposited from aqueous solutions of formic and acetic acid[4].

Although such work has produced thin DLC films with moderately high hardness from simple electrolytes like methanol, there is enormous potential for improvement because of the known, extremely high properties of sp3-diamond[5], including enormous hardness (>165 GPa), strength (>65 GPa), thermal conductivity (~2500 W/m K) and modulus (~1000 GPa).

Such conventional electrodeposited diamond/DLC/graphite typically comprises amorphous, disordered and/or graphitic sp2-bonded carbon content which can weaken the deposit, and can contain high hydrogen content. Conventional electrodeposited DLC is also typically self-limited to micron-scale thicknesses by the high electrical resistance ($1 \times 10^7$ to $10^{10+}$ ohm-cm or more) of the DLC films produced, which is higher than the electrical resistance of even highly resistive carbon-source electrolytes such as MeOH, acetonitrile and DMF. Conventional DLC electrodeposition has been largely empirical~evaluating properties of films from different $CH_3$-containing polar solvents such as MeOH, DMF, DMSO, and acetonitrile subjected to various cathodic plating voltages. The deposition mechanism is not fully understood, but is speculated to involve polarization-activation of $CH_3$ groups by a high electric field, forming $CH_3$ cations or radicals which are drawn to and react with the cathode surface to form DLC. The $CH_3$ groups are hypothesized to subsequently shed hydrogen to form amorphous, sp2 and sp3 bonded carbon.

Polycrystalline Composite Diamond (PCD) is conventionally manufactured by sintering fine diamond particles under high temperature high pressure conditions (HTHP) with a small amount of solvent or catalyst such as cobalt to produce a unitary structure in which diamond particles are strongly bonded together with intergrowth[6]. PCD composites are used as drill inserts, cutting tools, bearings and EDM machining/polishing electrodes, as well as high-speed projectiles. However, conventional polycrystalline composite diamond is relatively expensive for many applications and uses.

Truly inexpensive large-surface, monolithic, net-shape diamondlike structures, and inexpensive particulate diamond composites, would have many applications. Such applications include long-performance lubricated or unlubricated bearings and wear-resistant surfaces; ultrastrong, ultrastiff, net-shape diamond-matrix lightweight composites; diamond-coated carbon and metallic fibers (including carbon nanotube composites) of extreme strength; noncorroding structures and surfaces; lightweight net-shape diamond matrix structures of complex shape; heat sinks for high power laser diodes and lasers; heat sinks and packaging for high-power and/or high-frequency semiconductor and electronic devices; lightweight DLC gimbals, generators, centrifuges, motors and energy flywheels; ultrastrong all-axis heat conductive composites; and water treatment systems and processes. Defense applications include hard projectiles; armor; net-shape windows for missiles and IR imagers; protective surfaces for laser and EM microwave windows, helicopter blades and turbine blades for use in desert sand and other harsh environments; and ultrastrong thermally-conductive "stealth" fiber composites.

SUMMARY OF THE INVENTION

The present disclosure is directed to electrodeposition of high-sp3 diamond/DLC by significantly increasing the sp3 carbon content of electrodeposited net-shape diamond. The disclosure is also directed to manufacture of particulate and nanocrystalline diamond and composites.

DESCRIPTION OF THE DRAWINGS

FIG. 3 is a cross-sectional schematic illustration of a high-pressure, high-temperature reaction system for manufacturing diamond particulates, sheets, coatings and the like;

FIG. 9 is a graph illustrating a variety of voltage (or current) versus time parameters for reverse pulse cathodic DLC electrodeposition conditions which include anodic sp2 carbon removal;

FIG. 10 is a respective top view of 90° crossply and 120° crossply carbon fiber layers having a plurality of ultrastrong ultrahard diamondlike carbon matrix binding zones like those of FIG. 5, and intermediate flexible carbon fiber zones, for use as armor layers to protect against high-speed projectiles;

FIG. 14 is a cross-sectional view of an ultrahard high-speed projectile tip comprising a DLC coating on a hard compact of TiC, W, WC, TaC, polycrystalline diamond compact, or the like;

FIG. 15 is a schematic cross-sectional view of a railgun projectile having a DLC coating, a cryogenic reservoir for a coolant such as liquid hydrogen, and an energetic sabot configured to serve as a post-launch scramjet fuselage.

DETAILED DESCRIPTION

As indicated, some aspects of the present disclosure are directed to electrodeposition of high-sp3 diamond/DLC by significantly increasing the sp3 carbon content of electrodeposited net-shape diamond. The present processes include inexpensive and easily scalable methods for relatively low-temperature, ambient-to-moderate pressure electrodeposition of smooth, contiguous, monolithic diamond/DLC. Deposition temperatures in the range of from about 20 to about 175° C. are preferred, at atmospheric or slightly superatmospheric pressure. However, elevated pressures, for example up to say, 20 atmospheres, are useful when using low-boiling electrolytes and electrolyte components such as MeOH, water, acetic acid, acetonitrile, and the like at elevated temperatures.

Figure 1:
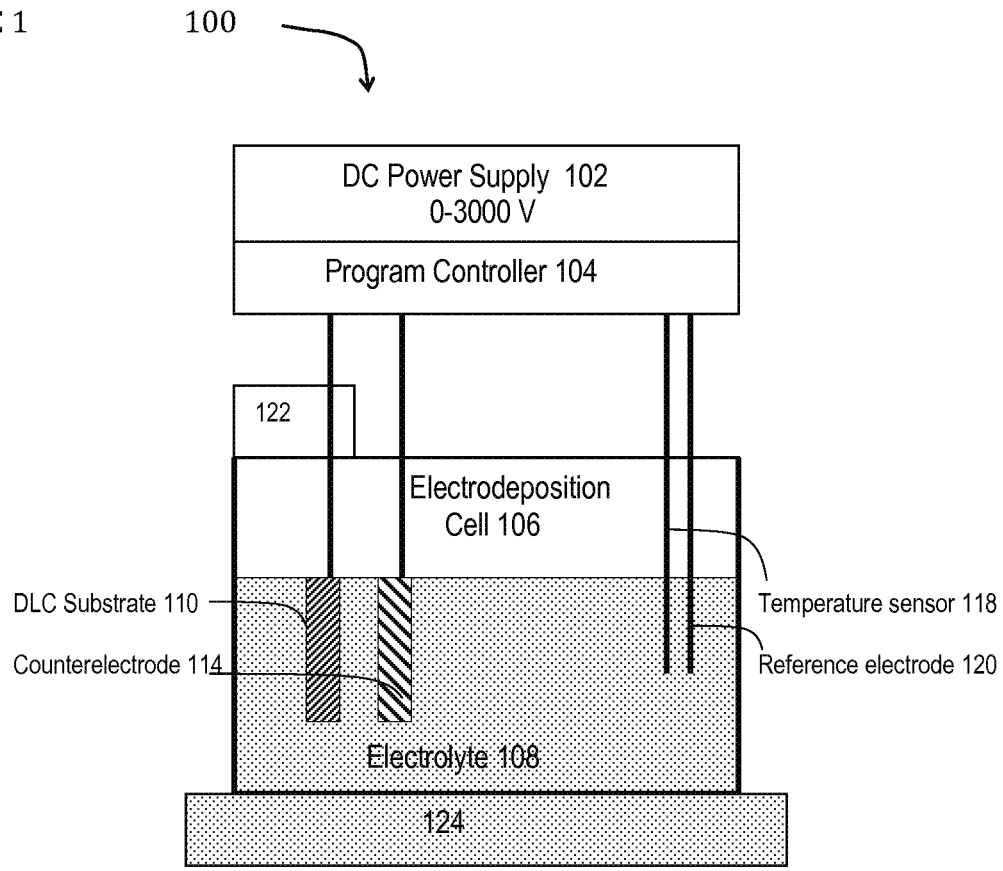
FIG. 1 is a schematic illustration of an electrodeposition system for electrodepositing diamondlike carbon.
Figure 2:
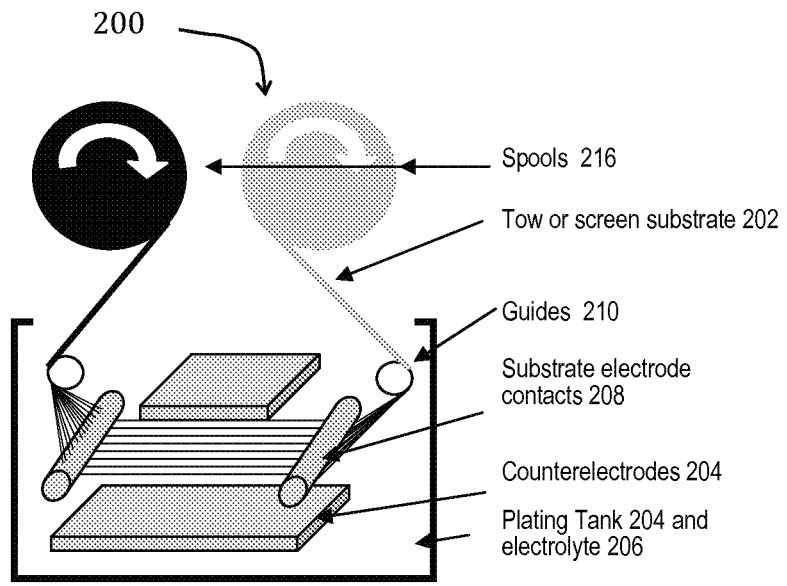
FIG. 2 is a schematic illustration of a continuous electrodeposition system for electrodepositing diamondlike carbon on electroconductive filaments, tows, sheets, screens and fabrics.
Figure 3:
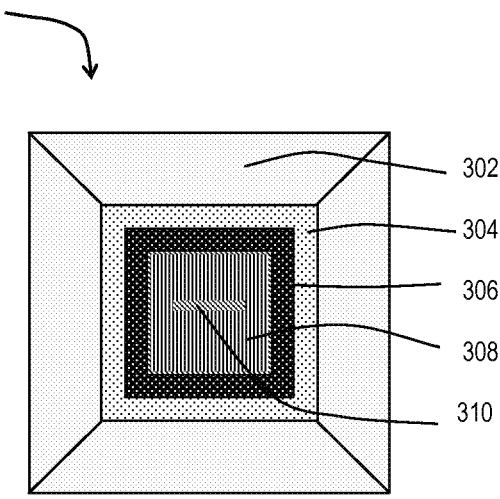

DLC films can be electrodeposited in accordance with the present disclosure, for example by electrodeposition systems such as illustrated in FIGS. 1 and 2, directly onto a variety of electroconductive substrates, including silicon, graphite, amorphous (eg, glassy, turbostratic) carbon and carbon fibers, eg, pyrolysis based cellulose, pitch, pyrolyzed polyacrylonitrile [PAN] fibers, doped carbon/graphite fibers and carbon nanotubes/nanotube-composites-wires), semiconducting substrates including ITO, SnO2, SiC, and metal wires and other substrates. Preferred substrates for DLC electrodeposition include doped-conductive silicon (mono- or polycrystalline), aluminum, steel (with coating), titanium, tantalum, tungsten, molybdenum, niobium, carbon/graphite fibers, and glassy carbon. Substrates can have a carbon implant or carbide interlayer. Iron-based substrates will preferably have a carbide and/or conductive oxide (eg, SnO2) interface layer to enhance adhesion and limit carbon migration[7].

In carbon electrodeposition, it is conventionally theorized that high electric fields at the cathode polarize electrolyte moieties of carbon-source materials such as methyl alcohol, ethyl alcohol, acetonitrile, dimethyl formamide, acetic acid, formic acid and dimethyl sulfoxide, to cause deposition of polarized/fragmented materials such as —$CH_3$ moieties. Electrolytic carbon deposition can be carried out in both conductive and relatively nonconductive electrolytes. High interelectrode electrodeposition voltages (for example in the range of from about 800 to about 2000 volts) can be used in nonconductive electrolytes, and lower interelectrode voltages (for example in the range of from about 10-200 volts) can be used in more electrically conductive electrolytes[8]. In relatively nonconductive electrolytes, the electric field generated adjacent the cathode depends significantly on the separation distance between the anode and the cathode, with shorter separation distances producing higher electric fields at the cathode and permitting use of lower inter-electrode deposition voltages. For highly conductive electrolytes such as room temperature ionic liquids, the major component of the electric potential applied between the anode and cathode is located in thin zones immediately adjacent the electrodes. A contribution to electrodeposition of sp3-bonded carbon is believed herein to be the extremely high pressures generated between the solid electrodeposition (cathode) surface and polarized and/or charged components (eg, $CH_3^+$ moieties) of the electrolyte immediately adjacent the cathodic deposition surface where carbon deposition occurs. At the relatively high substrate-electrolyte voltages employed in various embodiments of the present process, the pressure immediately adjacent the solid-phase electrodeposition surface can exceed 4, and preferably 5 or more gigapascals (>5 GPa)[9], at which diamond is a stable or metastable form of carbon. This deposition pressure is believed to be important for epitaxial deposition of sp3 carbon on sp3 carbon surfaces present on the deposition electrode by providing diamond-stable or metastable conditions for sp3 deposition. Tetragonal carbon source electrolyte materials such as described herein are desirably utilized in diamond/DLC electrodeposition in accordance with the present disclosure. Tetragonal carbon structures can become more stable and compact at high pressures. Graphitic trigonal sp2 structures are more stable at ambient pressure conditions, but tetragonal sp3 diamond bonding becomes increasingly metastable with increasing pressure, and becomes more stable than graphite at ultrahigh pressures. Similarly for example, under ambient pressure conditions, the hydrocarbon adamantane crystallizes in a disordered face-centered cubic structure which transforms into an ordered HO %) higher-density body-centered more rigid tetragonal phase at high pressures above 0.5 GPa which has more crystalline order. As indicated, the carbon electrodeposition conditions described herein can produce enormous pressure at the interface between the cathodic electrodeposition surface and the immediately adjacent molecules/ions of the electrolyte. This high pressure can enhance crystalline order and sp3 carbon bond incorporation from sp3 carbon structures such as adamantanes, graphenes and higher diamondoids, and facilitate hydrogen removal with more compact nongraphitic bonding of the electrodeposited carbon.

Electrodeposition currents of from about 2 to about 300 milliamperes per square centimeter of electrodeposition substrate surface are preferred. Deposition current control may be used instead of, or in combination with, applied electrodeposition voltage to control the deposition process. It is a significant advantage that the electrodeposition can be carried out under readily scalable and commercially practicable conditions, including ambient and modestly elevated temperatures and atmospheric pressure. Typical electrodeposition rates for electrodeposition of diamond/DLC from the electrolyte carbon source (excluding codeposited particulates) in accordance with preferred embodiments of the present disclosure may range from about 1 to about 20 or more nanometers per minute, for example about 2 nm per minute.

Inexpensive and/or large-area diamond/DLC manufacture has many applications. While graphene and carbon nanotubes may have slightly higher 2-D or 1-D properties, tetrahedral sp3-bonded diamond is the strongest, hardest, stiffest, and most heat conductive all-axis bulk carbon material. Hexagonally-bonded diamond (eg, Lonsdalite) without significant sp2 bonding has similarly remarkable bulk properties.

A major key to improvement of electrodeposited DLC is increasing the proportion of tetrahedral sp3 diamond carbon over amorphous, pentagonal and/or trigonal sp2 graphitic carbon, and increasing the content of hydrogen-free tetrahedrally bonded sp3 carbon in the electrodeposited layers or matrices.

Non-sp3 carbon removal. In accordance with some embodiments of the present disclosure, cathodically electrodeposited DLC is periodically subjected to anodic conditions to preferentially remove non-sp3 carbon content. Electrically conductive CVD diamond electrodes have very high overpotentials for both oxygen and hydrogen evolution. This gives such sp3 diamond electrodes without electrode surface sp2 carbon content, a very large potential window (−3.5 V) in aqueous[10] as well as non-aqueous electrolytes. Surface sp2 and other non-sp3 carbon of DLC can be destroyed and removed in an anodic oxidation portion of cyclic electrodeposition processes. In an oxidant-containing (eg, water[13], $H_2O_2$, —OH, —COOH, $NO2^-$, $SO4^=$ moieties; etc.) electrolyte, an anodic current wave starts before oxygen evolution as the sp2 carbon is consumed and removed from the DLC electrode surface in contact with the electrolyte. In general, the higher the sp2-nondiamond carbon content of the DLC, the smaller the potential window between hydrogen and oxygen evolution in aqueous electrolytes. This sp2 and other non-sp3 carbon removal is primarily a surface effect, not a deep volume effect (unless the sp2 carbon has continuous pathways through the DLC electrodeposit). Nucleation of sp3 carbon deposition is a critical factor in high-sp3 DLC production by electrodeposition. Anodic enhancement of the proportion of sp3 carbon at the electrodeposition surface by preferential removal of amorphous and sp2 carbon during anodic cycles significantly enhances nucleation of sp3 carbon during subsequent cathodic cycles, so that the proportion of sp3 carbon throughout the electrodeposited DLC is enhanced not only by removal of non-sp3 carbon, but also by increased deposition of sp3 carbon on newly-exposed sp3 surfaces provided by preferential anodic removal of non-sp3 surface carbon.

In accordance with various embodiments of the present disclosure, periodic reverse pulse anodic electrolytic conditions are applied during carbon electrodeposition to carry out preferential surface oxidation of sp2 carbon under anodic conditions. Such selective sp2 and other non-sp3 carbon removal can be accomplished in accordance with the present disclosure by short, reverse-polarity anodic duty cycles alternating with the cathodic electrodeposition duty cycles for diamond/DLC coating in conventional and new (eg, RTIL) DLC electrolytes.

In addition to direct oxidation and removal of non-sp3 carbon, hydrogen-terminated surface atoms of the carbon electrodeposit can be converted to an oxygen terminated surface during anodic oxidation, assisting in hydrogen removal. Such oxidation can occur in the presence of water, alcohols[11], or other oxidizing electrolyte and/or an oxidizing agent in the electrolyte which is activated at the anodic electropotential applied to the electrodeposited DLC layer. An at least partially oxygen-terminated diamond/DLC surface is somewhat more hydrophilic than the hydrogen-terminated surface produced by cathodic deposition potentials. Anodic treatment of the DLC/diamond surface may also produce a positive shift in both the photocurrent onset potential and the flatband potential indicating the displacement of the bandedges. The flatband potential at the oxidized diamond may exhibit a pH dependence. By applying UV/blue light during an anodic pulse, electrical conductivity can be increased, and non-sp3 carbon can be selectively "excited" for enhanced anodic oxidation/removal. An oxidizer such as nitromethane, nitroethane, etc. may also be included in the electrolyte[12].

Upon resumption of cathodic conditions, DLC is again deposited on the remaining sp3-enhanced surface, and oxygen terminated surface moieties can be converted back to hydrogen terminated surface moieties upon resumption of cathodic electrodeposition conditions in the pulse-reverse electrodeposition processing regimen. Oxygen at the surface can assist hydrogen abstraction in the cathodic electrodeposition regime. It is also noted that sp2 carbon can preferentially reduce oxygen ($O_2$) dissolved in the electrolyte under cathodic conditions to produce active oxygen species, which can also assist sp2 removal under appropriate higher-voltage electrodeposition conditions[13]. However, it is typically desirable for process control of reverse pulse processes to exclude dissolved oxygen ($O_2$) so that the electrolyte adjacent the cathodic deposition surface is substantially free of dissolved oxygen. High cathodic electrodeposition fields voltages may also assist hydrogen removal[14].

UV/blue light may limit sp2 deposition under cathodic conditions by selective energy deposition into incipient sp2 bond formation[15]. Frontside, or backside illumination through the electrolyte and/or a transparent substrate onto the DLC being deposited, is also useful for increasing electrical conductivity of the electrodeposited DLC layer by carrier generation, and facilitating electrical conduction enhancement (which can include avalanche multiplication under high electric field). Because "pure" sp3 diamond has a very wide bandgap, it transmits IR, visible and long-wavelength ultraviolet. However, sub-bandgap light is absorbed and induces conductivity and/or photocurrent in sp2-containing DLC. Anodic treatment of DLC/diamond produces a positive shift in both photocurrent onset potential and flatband potential. Very high electric fields together with activating UV light pulses may also facilitate incorporation of dopants into the sp3 diamond structure of the electrodeposited DLC film despite relatively low deposition temperatures[16]. Such conductivity-enhancing illumination may desirably be applied as light pulses during pulsed cathodic (and anodic) treatment as described herein.

As indicated, water can be a useful electrolyte component in organic carbon sources. Trace water can be initially present in the electrolyte, added during the electrodeposition, formed from oxygen-containing electrolytes such as MeOH[17], and/or formed from surface hydroxyls or other oxygen moieties of nanodiamond or graphene during electrodeposition. The high overpotential for oxygen evolution at anodic sp3 diamond facilitates anodic HO. radical production in water-containing electrolytes [$H_2O \rightarrow HO. + e- + H^+$], as well as oxidative reactions which can preferentially attack amorphous, disordered and sp2 carbon, and carbon attached to non-carbon atoms. Acetic acid/acetates/formic acid/formates are also useful electrolyte components for preferentially selective anodic removal of non-sp3, amorphous, disordered, turbostratic, fullerene and/or sp2 carbon.

Schematically illustrated in FIG. 1 is an electrodeposition system 100 for electrodepositing diamondlike carbon. The illustrated electrodeposition system 100 comprises a 0-3000 volt DC power supply 102, A program controller 104 for controlling the voltage and/or current output from the DC power supply 102, and an electrodeposition cell 106. The electrodeposition cell 106 contains an electrolyte 108 in which are placed a carbon deposition substrate 110 and a counterelectrode 114, each connected by a suitable conductor to the respective electrical outlets of the program controller 104. The electrodeposition cell 106 also comprises a temperature sensor 118 and a reference electrode 120, which also respectively are connected to the program controller 104. In accordance with good manufacturing practice, the electrodeposition cell is made of a suitably inert material which does not adversely interfere with the chosen electrolyte or electrodeposited diamond material under the selected electrodeposition conditions[18]. As also illustrated in FIG. 1, the electrolyte 108 of the electrodeposition cell 106 can be circulated through a temperature-controlled reservoir-and-circulation pump system 122 for temperature (heating and/or cooling) control, also under the control of the program controller 104. An ultrasonic vibration system 124 may be used to adjust surface diffusion layer conditions and even gas bubble evolution at the surface of the deposition electrode 110. A conductive membrane (not shown) such as an inert porous membrane, a cationic polymer membrane and/or an anionic polymer membrane may be used to separate the zones around the electrodeposition electrode(s) 110 and the counterelectrode(s) 114. This can increase electrical resistance, but can be useful when different electrolyte compositions are used adjacent the respective electrodes 110, 114, or when it is desirable to restrict electrolysis products to different zones.

Schematically illustrated in FIG. 2 is a continuous electrodeposition system 200 for electrodeposition of diamondlike carbon on electroconductive fiber substrates such as graphite or metal fibers or filaments 202 within an electrodeposition tank 204 containing a suitable electrolyte 206. The electrodeposition system 200 comprises electrical contacts and guides 208 for the conductive filaments 202, and may include multifilament tow spreaders and guides 210. Counterelectrode plates 212 are also provided within the electrodeposition tank 204. For single graphitic fiber, rope or cord, a curved (eg, at least partially-enclosing right circular cylindrical shape for rope or fiber substrates) are spaced a predetermined distance (eg, 5 mm) from the fiber(s). The guides 208 and counterelectrode plates 212 are electrically connected to a suitable electrodeposition power system such as that of FIG. 1 (not shown). In use, the electroconductive fibers/filaments/screens are unwound from a supply spool 216 which may also be in electrical contact with an electrodeposition power supply, and directed into the electrodeposition tank(s) via the electrical contacts and guides 208 and multifilament tow spreaders and guides 210. The fibers/filaments/screens may be in electrical contact with additional electrode surfaces along their length (not shown) as they traverse the tank 204, to maintain adequate current and electrodeposition conditions. The counterelectrode plates 212 in the electrodeposition tank are also electrically connected to the electrodeposition power system, which maintains appropriate DLC electrodeposition conditions, which may include reverse pulse and/or RTIL processing, to carry out high sp3 carbon deposition on the fibers/filaments. After electrodeposition treatment in the electrolyte, the DLC-coated fibers are rewound on the receiving spool 218, which also may be in electrical contact with the electrodeposition power supply. While the illustrated continuous DLC electrodeposition system 200 is shown with a single electrodeposition tank, the substrate fibers, filaments, tows, fabrics, screens and/or sheets may be conducted through multiple tanks having different electrodeposition conditions and/or electrolytes, before being wound on a receiving spool 218.

Figure 8:
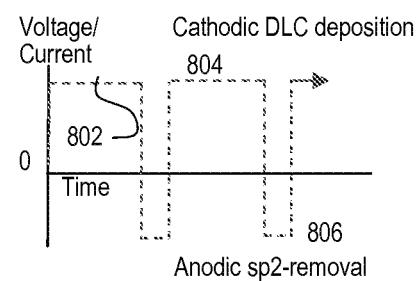
FIG. 8 is a graph illustrating relatively simple voltage (or current) versus time parameters of a pulsed cathodic DLC electrodeposition process with reverse pulsed anodic sp2 carbon removal, for electrodeposition of diamond-like carbon having enhanced sp3 carbon content.

Periodic anodic duty cycles applied to the electrodeposition substrate during cathodic DLC electrodeposition, such as schematically illustrated in FIGS. 8 and 9, preferentially remove electrodeposited sp2 carbon, preferentially leaving electrodeposited sp3 carbon intact to serve as a base for the next cathodic deposition cycle pulse. Hydrogen termination of a diamond surface reduces its ionization potential to negative electron affinity which permits the surface to be doped by physisorbed surface adsorbates which can extract electrons to induce p-type conductivity. A hydrogen-terminated diamond surface becomes oxygen-terminated during anodic oxidation with oxygen evolution, and the oxygen terminated surface is restored to hydrogen termination by cathodic treatment. These factors are useful in a pulse-reversed processing regimen to destroy sp2 carbon content by anodic oxidation. As illustrated in the relatively simple reverse pulse processing regimen of FIG. 8, the electrodeposition potential (or current) 802 applied to an electrodeposition substrate may be periodically switched from a cathodic DLC electrodeposition potential 804, to an anodic non-sp3 carbon oxidation-removal potential 806. This increases the sp3/sp2 carbon ratio in the diamond/DLC coating, both through non-sp3 carbon removal, and enhanced nucleation of sp3 carbon during subsequent cathodic DLC deposition. The cathodic potential will typically be higher, and of longer duration, than the anodic potential, so that the net result is deposition of DLC with enhanced carbon-to-carbon sp3 bonded content rather than complete removal of carbon which could occur with excessive anodic treatment. Preferably, the cathodic DLC electrodeposition duty cycle and the anodic sp2-oxidation duty cycle are adjusted and proportioned so that from about 5% to about 90% by weight of the carbon electrodeposited during the cathodic cycles (and more preferably from about 10% to about 40% by weight) is removed during the anodic cycles. The anodic potential may be selected at a voltage adequate to remove sp2 and amorphous carbon, but below that at which substantial sp3 carbon is removed. The anodic potential may also be selected at a higher potential at which some sp3 carbon is removed, but sp2 carbon removal is still significantly favored. This can both shorten the anodic treatment time to remove surface sp2 content prior to the next cathodic electrodeposition cycle, and also to smooth the surface by removal of sp2 and sp3 DLC peaks because of charge concentration at small-radius peaks. Such sp2 removal can also be a tool for control of internal residual stress in an electrodeposited diamond/DLC coating. Very small amounts of water[19], hydroxylamine, methylammonium perchlorate, ammonium borohydride, $H_2O_2$ and similar materials in the deposition electrolyte may also assist hydrogen abstraction during the cathodic part of the cycle, and/or participate in sp2-carbon oxidation during anodic reverse pulse processing to increase the sp3 tetrahedral carbon content, and/or facilitate doping. The cathodic duty cycle can be designed to control the thickness of the carbon deposited during the cathodic cycles. When the cathodic duty cycle is relatively short, a thin sp3 and sp2 containing layer can be deposited from which the sp2 can be largely or wholly removed. Use of longer cathodic duty cycles can deposit thicker layers of sp3 and sp2 carbon which can retain some internal sp2 which is not removed from the surface by the reverse pulse anodic cycle. This can be used to produce nanoscale layered composites of high Hall-Petch strength and toughness. Periodic anodic treatment control can also be utilized to produce layered electrodeposits of different composition and properties, as well as functionally graded DLC electrodeposited materials. Layered nanoscale composites, for example high-hardness sp3 layers of 5-50 nm thickness, interleaved with somewhat "softer" layers of moderately higher sp2 layers of 5-10 nm thickness, can be designed to have extraordinary combinations of properties, such as high strength and hardness, together with high toughness. Functionally graded materials can be designed to maximize interface capabilities, and to position optimum composite properties for optimum performance. As indicated, such layered and/or functionally graded electrodeposition, preferably utilized with codeposition of nanodiamond, carbon nanotube (eg, hydrogenated carbon nanotubes), graphane and/or graphene components in graded and/or layered codeposition concentration, can provide nanoscale (eg, Hall-Petch) toughness and/or anisotropic properties to the deposited DLC. The anodic cycle period may vary as appropriate for the specific design of the electrodeposited DLC or DLC composite. At low voltages, it may take up several seconds or more (eg, up to minutes) to remove sp2 carbon from the surface, depending on electrolyte composition, anodic voltage and other conditions. For example, a simple cyclic process may include cathodic 1000 to 2000 Volt pulses 804 applied to the electrodeposition substrate in a carbon source (eg, methanol) electrolyte in the range of 0.0001 to about 10 minutes in duty cycle length, and anodic pulses 806 of lower 20 to 900 Volt potential in the range of from about 0.01 to 30 seconds (with lower anodic potentials typically being applied for longer times).

As illustrated in FIG. 9, it is a significant advantage of various methods of the present disclosure that electrodeposition conditions may be precisely varied and controlled to provide appropriate processing for specific DLC electrodeposition processing and product designs. For example, the applied cathodic electrodeposition potential (current) 902 can be pulsed from a high voltage (current) 904 to a lower but still cathodic voltage 906 at a frequency in the range of from about 1 to about 15,000 Hz with a duty cycle of the higher voltage cathodic pulses ranging from about 10% to about 90% to facilitate DLC electrodeposition and hydrogen removal. Higher voltages favor sp3 carbon deposition, but the elimination of sp3-bonded hydrogen may take more time than the electrodeposition of sp3-bonded CH3-moieties, depending on substrate, electrolyte, nucleation rate and other conditions. Anodic pulses 910 may be alternated with the cathodic pulses, independently scheduled, or varied in voltage (current) to optimize the intended processing results. For example, anodic pulses 912 may have a duty cycle at a lower anodic voltage applied to the DLC substrate which removes sp2 carbon with little or no sp3 removal, followed by a higher voltage pulse component 914 to smooth sp3/sp2 peaks, while still preferentially removing sp2 and amorphous carbon.

The high electrical resistivity (eg, $\sim 1 \times 10^7$ to $10^{10+}$ ohm-cm) of conventional diamond/DLC electrodeposition products, which is typically higher than the resistivity of many organic carbon-source electrolytes such as neat MeOH, acetonitrile, DMF, DMSO, etc., may slow the deposition rate as the deposited thickness increases, and self-limit the thickness that can be electrodeposited, to typically several microns or less. The highly-insulating characteristics of pure undoped high-bandgap sp3 diamond, in contrast to the much higher electrical conductivity of low-bandgap sp2 carbon, is a further significant impediment to electrodeposition of high sp3 DLC electrodeposition. In this regard, the concentration of cathodic potential and current is through sp2 carbon moieties at the cathodic electrodeposition surface, rather than at the sp3 carbon surfaces where sp3 formation is favored. But diamond can be doped with elements such as boron (p-type), nitrogen (n-type), P, S, etc., and mixtures thereof, to make it more electrically conductive. Doped diamond can have a relatively high electrical conductivity, for example 1-10 $S/cm^{20}$ or more[21]. In accordance with the present methods, boron, nitrogen, phosphorous, sulfur, metals, conductive particles (eg, doped-nanodiamond, graphene and conductive carbon nanotubes), and/or other electrical conduction-enhancing components can be co-electrodeposited, to increase the electrical conductivity of the electrodeposited DLC. Nanodiamond and/or other particle codeposition rates are a function of particle surface charge, electrolyte velocity vectors (and/or turbulence) and/or in some electrolyte formulations and electrodeposition systems, sedimentation rate[22].

For example, for boron-doping, small amounts of boron electrodeposition precursors (depending on the electrolyte system) can be included in the electrolyte for doping of the electrodeposited DLC, such as boric acid[23], trimethylboron, triethylboron (both poisonous gases at room temperature so a closed electrodeposition system should be used), boronic acids such as methylboronic acid, corresponding boronate esters such as methyl dimethylboronate $H_3C-B(O-CH_3)_2$, boranes such as pinacolborane, boron hydrides, borinic acids and borinate esters such as dimethylborinic acid and dimethyl borinic methyl ester $(CH_3)_2BOCH_3$, carboranes such as $C_2B_4H_6$ (gas at room temperature) and particularly those with a single boron atom or multiple boron atoms separated by at least 3 carbon atoms, and halogenated boron compounds such as boron trichloride and mono/dimethyl boron chlorides, and mixtures thereof. For nitrogen-doping[24], small molecule carbon-nitrogen compounds such as trimethyl amine, dimethyl amine, DABCO (1,4-diazabicyclo[2.2.2]octane) or urea dissolved in an electrolyte such as methanol, can dope DLC electrodeposited therefrom with nitrogen molecules. Phosphorous doping can provide n-type conductivity[25]. Small molecule dopant compounds having an sp3-carbon bond to the dopant atom, such as B—$CH_3$, N—$CH_3$ and P—$CH_3$ bonds, are desirable dopant materials in the electrolyte. B-doped p-type diamond can be converted to n-type, and deep donor N can be converted into shallower donor levels by hydrogenation-deuteration[26] and small amounts of boron doping can enhance n-type doping with nitrogen. Cationic carbon sources such as acetonitrile[27] can introduce N into the substrate during both cathodic and anodic processing cycles. Similarly, small amounts of DMF in MeOH can serve as an N dopant. Carbon source materials such as DMSO, preferably in MeOH solution, may also serve as dopant sources (eg, for S) at high deposition voltages. It should be noted that even very low doping levels, such as $1\times10^{14}$ to $1\times10^{17}$ dopant molecules/cc, can increase the electrical conductivity of the electrodeposited DLC. While "pure" n-type and p-type semiconductivity is useful, hopping mechanism conductivity and metallic conductivity mechanisms are also useful for electrodeposition enhancement. Higher doping levels such as $1\times10^{18}$ to $1\times10^{22}$ dopant molecules/cc can further increase semiconductivity (and enhance degenerate metal-like conductivity[28]), but can also increase the sp2 content of the DLC. Because the concentration of such dopants is relatively low, and may be preferentially electrodeposited over sp3 carbon, the concentration of N, B, P etc. dopant precursors dissolved in the DLC electrolyte is also typically extremely low, for example from about $1\times10^{-2}$ to $1\times10^{-8}$ atomic percent of the electrolyte based on N, P, B atom content. This is particularly true of dopant precursors from which the dopant atoms are electrodeposited in preference to sp3 carbon (eg, nitrogen may be preferentially deposited at the cathode over carbon from urea dissolved in methanol). Increased electrical conductivity of the deposited DLC permits thicker and/or faster DLC layer formation, and can facilitate sp3 electrodeposition on sp3 diamond zones which would otherwise be non-conducting.

Nucleation Nucleation of sp3 carbon is an important factor for electrodeposition of high-sp3 DLC. Nanodiamond particles are particularly useful as sp3-nucleation agents and codeposition components in electrodeposition processes and products in accordance with the present disclosure. Nanodiamond particles may be manufactured by detonation, high-pressure, and/or milling processes[29]. For example, detonation synthesis from a mixture of strong oxygen-deficient explosives can produce pressures in excess of 20 GPa at high temperatures (eg, ~3000 K) to produce, after purification, a relatively narrow particle size distribution of nanodiamond particles, such as particles of spherical shape with an average diameter in the range of about 3-10 nanometers, typically 4-5 nanometers. While nanodiamond particles and agglomerates typically have high electrical resistance, nanodiamond can be doped and/or coated to provide electrical conductivity[30]. Purified nanodiamond particles can be substantially free of aromatic sp2 carbon, with a crystalline sp3 carbon core and surface hydrogen and/or —OH groups[31]. As described below, nanodiamond particles may be doped during manufacture, or may be coated with a doped ultrathin surface layer. Codeposition of doped, semiconducting nanodiamond particles increases the electrical conductivity of the DLC layer(s) in which they are co-deposited, thereby facilitating electrodeposition and enabling thicker deposits. Nanodiamond particles can be formed and dispersed in electrolytes, solvents and other liquids by a variety of procedures, such as ultrasonic dispersion, ball milling, and fluid milling[32]. Derivatives of cubanes[33], adamantanes and higher diamondoids[34] such as (preferably mono-) hydroxyl, carboxyl, amino, halo, boron and acetoamino derivatives (eg, monohydroxyadamantane and tetramantanes), can also be dissolved in the electrolyte as cathodic electrodeposition carbon sources, to enhance sp3 nucleation, and provide ongoing nucleation as electrodeposition proceeds. High sp3 carbomonoboranes and carbomonoamines (eg diamondoids with one boron atom or one nitrogen atom), for example, may also be useful for both doping and sp3 nucleation in various processes and products. Carbon sources with sp3 bonding, particularly including highly strained sp3 carbon bonds such as prismanes, cyclopropanes or cubanes may also be used in electrolytes with other carbon sources and RTILs (see below) to promote sp3 formation over sp2 formation. sp3-generating carbon source components such as t-butyl alcohol, t-butyl halides (eg, chloride), halomethanes and haloethanes such as chloroform, hexachloroethane and/or diamond-precursor electrolytic polymers such as poly(hydridocarbyne)[35] may be included in the electrolyte in low, controlled concentrations. Halosilanes such as methyltrichlorosilane or its electrolysis polymer SiC precursor poly(methylsilyne) can be included in the electrolyte to introduce silicon-carbide bonding in the electroformed layers[36]. This approach provides a rich opportunity for a wide range of functional property tailoring, for example including diamond/DLC graphite fiber interface design and manufacture.

Further in regard to use of multicarbon tetragonal carbon sources, sp3-based hydrocarbons such as tetrahedranes, prismanes, cubanes, adamantanes/higher diamondoids, fulleranes (hydrogenated fullerenes) and graphanes[37] (hydrogenated-graphenes, multilayer graphane-diamondoids and the like), hydrogenated carbon nanotubes (nanotube diamondoids), their derivatives and mixtures thereof have compact and/or cyclic nongraphitic carbon-carbon structures which can facilitate sp3 carbon electrodeposition from carbon-source electrolytes in accordance with the present disclosure.

Highly-strained nongraphitic hydrocarbons can be incorporated by electrodeposition, for example to adjust or "tune" strain in electrodeposited DLC. In this regard [3.2.1]propellane $C_8H_{12}$ is relatively heat-stable in the absence of oxygen, [3.3.3]propellane $C_{11}H_{18}$ mp 130° C., [4.3.3]propellane $C_{12}H_{20}$ mp 100-101° C., [6.3.3]propellane $C_{14}H_{24}$ is a relatively stable ambient temperature liquid bp 275-277° C., and [10.3.3]propellane $C_{18}H_{32}$ sublimes at 33-34° C. and their derivatives can be useful as nongraphitic carbon sources in electrolytes herein.

Adamantanes and higher diamondoids (including derivatives thereof) are useful as electrodeposition carbon sources, alone, or with other carbon electrodeposition sources. Diamondoids and heterodiamondids such as adamantanes, diamantanes, triamantanes, and higher polymantanes, 1-(1-adamantyl)diamantane, 1-(1-diamantyl)diamantane, 2-(1-adamantyl)triamantane, 2-(1-diamantyl) triamantane, and 2-(1-diamantyl)[121]tetramantane, their higher adamantalogs and substituted homologs are large-molecule sp3-carbon electrodeposition materials[38] which can facilitate electrodeposition of high-sp3-carbon, as well as heteratom (eg, electronic doping) components. Heterodiamondoids are compounds having a diamondoid cage or other nucleus in which one or more of the diamondoid nucleus carbon positions is replaced with a noncarbon atom such as boron, phosphorous, nitrogen, sulfur, silicon, oxygen, etc. For example, hexamethylenetetramine has an adamantane-like tricyclic cage structure with 4 equally-spaced nitrogen atoms substituted for corresponding sp3-carbon atoms, as a poly-substituted heteroadamantane diamondoid useful as a cationic species in electrolytes for n-doped diamond/DLC electrodeposition. Adamantane derivatives and higher diamondoid derivatives[39] such as thiadiamondoids and diamondoidthiols are useful carbon sources in electrolytes. Like other diamondoids, heterodiamondoids may be functionalized to carry one or more functional groups covalently pendant therefrom. Apical mono-, di-, and tricarboxylic acids, apical mono and diacetic acids, medial propionic acids of amantane and higher diamondoids and heteroatom diamondoids, as well as corresponding alcohols, carboxylic acids, nitrates and halides[40] are useful carbon sources for DLC electrodeposition. Co-electrodeposited diamondoid inclusions can contribute a variety of desirable characteristics for specific applications and uses of electrodeposited DLC[41]. Electrodeposition and/or codeposition of diamondoids can also reduce or control compressive strain in electrodeposited diamond/DLC layers. Pendant groups may comprise charge-separation-enhancing substituents such as thio, hydroxyl, carboxylic, amine, halide, lactone, boro, acetoamino, oxa, and aza groups. Adamantanes and higher diamondoids have relatively high thermal, structural and electrochemical stability of their sp3-carbon structure. In this regard, adamantanes (tricyclo[3.3.1.1$^{3,7}$]decane), including its isomers basketane (pentacyclo[4.4.0.0$^{2,5}$.0$^{3,8}$.0$^{4,7}$]decane) and twistane (tricyclo[4.4.0.0$^{3,8}$]decane) as well as their derivatives, are non-graphitic diamondoid carbon compounds having diamond sp3 carbon bonded configurations, which can introduce and/or assist sp3 carbon bond formation during electrodeposition, as well as increase the mass rate of electrodeposition in electrodeposited DLC in accordance with the present disclosure. Adamantane is both rigid and substantially stress-free, as are a variety of higher diamondoids. Heteroadamantanes and higher heterodiamondoids, graphenes and nanotube heterographenes[42] such as those having boron, phosphorous, sulfur, nitrogen and the like atoms within the sp3 carbon structure can also "dope" the electrodeposited diamond/DLC by incorporating dopant atoms within the electrodeposited diamond/DLC structure. For example, 1-aminoadamantane and adamantine methyl amine are nitrogen-containing compounds which are useful carbon sources which may also incorporate nitrogen doping in electrodeposited diamond/DLC. Adamantane is the most stable of the $C_{10}H_{16}$ based isomers, and like other higher diamondoids[43] is available as a component of crude petroleum, and by commercial syntheses. Such diamondoid-sp3-bonded carbon molecules can readily bond with co-electrodeposited DLC and other diamondoid molecules by hydrogen abstraction/removal reactions to produce a highly crosslinked sp3-carbon structure. As indicated, adamantanes (which are relatively inexpensive), higher diamondoids, graphanes and the like have stable 3 dimensional sp3 carbon structures[44] which can form cations useful as sp3-structured electrodeposition carbon sources. Adamantane for example, forms relatively stable cations[45], and higher diamondoids similarly form cations more readily with increasing size of diamondoid structure. Even dications of adamantane may be prepared in solutions of superacids. In accordance with the present disclosure, adamantane and higher diamondoid carbocation salts may be prepared with a wide range of anions, ranging from simple halides, and inorganic nitrates, tetrafluoborates, hexafluorophosphates and perchlorates, to RTIL organic anions such as bistriflimides, triflates and tosylates. Cationic adamantanes and higher diamondoids can undergo ring opening additions (eg, with or as a result of dehydrogenation) which can facilitate carbon addition to the diamond/DLC electrodeposition substrate. Cationic adamantane and higher diamondoid salts such as amide salts can be prepared in accordance with conventional RTIL preparation methods such as methathesis procedures[46] reacting the carbocation salt with an alkali or alkaline earth salt of the desired anion such as TFSI [bis(trifluoromethylsulfonyl) imide], TSAC [2,2,2-trifluoro-N-(trifluoromethylsulfonyl)-acetamide] or TSPS [N-(trifluoromethylsulfonyl)-pentafluoroethylsulfonamide] and a alkali/alkaline earth salt of different solubility and/or high enthalpy. The resulting carbocation ionic materials are typically hydrophobic, but are soluble or dispersable (eg, for "large" graphenes and the like) in RTILs.

Diamondoids can form charge-distributed closed shell carbocations by H-atom loss with decrease of ionization potential with increasing diamondoid size[47], which is useful for attraction to the cathode and electrodeposition on the cathodic surface. It is noted that while carbon nanotubes, fullerenes, and graphenes can be codeposited, they do not readily produce such extensive sp3 bonding density in the electrodeposited DLC as graphanes, graphane nanotubes, and fulleranes (hydrogenated "buckyballs" and other fullerenes).

Syntheses of higher diamondoids and their derivatives are similar to that of adamantane, and like adamantane, they can also be refined from petroleum. Synthesis and rearrangement of hydrocarbon precursors in acidic RTILs is also a useful process for bulk production of adamantanes and higher diamondoids and their derivatives[48].

While high sp3 diamond/DLC may be electrodeposited at ambient and warm temperatures, more elevated temperatures in the range of from about 100 to about 400° C. may be useful in various electrodeposition and electrolyte embodiments for facilitating mechanisms such as hydrogen removal and tetragonal compact carbon incorporation, heteroatom doping activation and/or sp2 carbon removal. This can be accomplished for low-boiling electrolytes such as methanol, ethanol, acetonitrile, DMF and the like by high pressure apparatus, but such superatmospheric processing is expensive for large-scale manufacture. In this regard, high-boiling thermally stable electrolytes such as wide electrochemical window RTILs are particularly useful for higher temperature electrodeposition, together with a low-volatility carbon source. For example, an adamantane and/or higher diamondoid may be mixed with a low-volatility room temperature ionic liquid having an electric stability window of at least about 5 V, in a range of from about 0.01 to about 95 weight percent based on the total electrolyte weight. A small amount of water, DMF, methanol and/or acetic acid (approximately 1 weight percent each, based on the total electrolyte solution weight) may be included in the electrolyte solution. The electrolyte may also include heterodiamondoid n- and/or p-type doping materials and/or cationic diamondoid salts. The electrolyte may be maintained at a temperature in the range of from about 100° C. to about 200° C. (eg, 100° C.) with reflux and stirring to retain volatile $MeOH/H_2O/CH_3COOH$ components.

The electric field at and immediately adjacent the electrodeposition surface is an important operative driving force for the electrodeposition process. The most effective electrodeposition voltages are a function of the conductivity of the electrolyte and separation distance of the electrodes. A uniform electric field and uniform current distribution at the deposition surface(s) are desirable. A conductive electrolyte, such as a high electrolytic window RTIL with a small amount of carbon electrodeposition source (such as pure MeOH, $CH_3COOH$, and/or $CH_3CN$ etc), can use a relatively low voltage between the electrodeposition and counterelectrodes. Because of its conductivity, an ionically electroconductive electrolyte has a relatively low voltage gradient across its bulk zone between the electrodes (excluding the surface zones immediately at and adjacent the electrodes), so that the electrodeposition potentials for conductive electrolytes can be smaller than for less-conductive and relatively nonconductive electrolytes. However, while the high reduction and oxidation potentials of high-window RTILs can limit/prevent their reaction at the electrodes, their ionic properties can also cause their polarized attraction to the electrodes under steady-state conditions, interfering with the proximity of the more easily reduced carbon source molecules from the high-near-surface electric field at electrodeposition electrodes (and oxidative species from the anodic electrode when using pulse-reverse sp2-carbon removal processes). Pulse-reversed processes and ultrasonic energy can mix the near-surface electrolyte concentrations to introduce carbon-source molecules into the high-field electrodeposition zone(s) immediately adjacent the electrodeposition cathode(s). Also, inclusion of cation diamondoid salts such as adamantane amine salts and/or carbocation diamondoid salts facilitate carbon source penetration to the growing electrodeposition surface. On the other hand, to produce the same or similar electric field gradients and currents at and immediately adjacent the electrodeposition electrode(s), a low-conductivity electrolyte such as high-purity methanol electrolyte will typically involve higher voltage potentials applied between the anodic and cathodic electrodes because of a higher voltage gradient within the bulk electrolyte volume between the electrodes. This can also produce relatively high $I^2R$ resistive energy loss and heating in the bulk zone between electrodes. A somewhat more electrically conductive electrolyte such as a mixture of pure methanol with a small amount of pure water and acetic acid may employ lower potentials applied between the cathode(s) and the anode(s), with a similar electric field being produced at the near-field zones at the electrode surfaces. For example a pure methanol electrolyte with small amounts of pure water and/or acetic acid (eg, 1-2 weight percent each, based on the total electrolyte weight) can have higher electrical conductivity than a pure methanol electrolyte, so it may be utilized for electrodeposition in accordance with the present disclosure at lower interest electrode potentials than a pure, relatively non-conductive methanol electrolyte. A somewhat more electrically conductive electrolyte such as a methanol solution with a small amounts of compatible RTIL (eg, 0.5-2 wt % based on total electrolyte) will also reduce the electric field gradient and energy loss in the bulk zone between the electrodes, while maintaining similarly high electric fields immediately adjacent the electrodes. Current control is a useful process control mechanism for uniformity. Both current and inter-electrode potential monitoring and control are highly useful for industrial process control of diamond/DLC electrodeposition in mass-production in accordance with various aspect of the present disclosure.

Boron is an excellent p-type dopant for electrodeposited diamond/DLC. Phosphorous doped and sulfur-doped diamond can have n-type conduction. Nitrogen can be an electron donor at deep levels which accordingly do not produce practical n-type conductivity in diamond at ambient temperatures, but which can provide n-type doping conductivity at higher temperatures and for electron emission applications[49]. Such N-doped electrodeposited diamond/DLC is useful for high temperature thermoelectric and peltier devices, and energy conversion processes[50].

One method for doping electrodeposited diamond/DLC in accordance with the present invention is co-electrodeposition of sp3-carbon bonded compounds with dopant atoms into the (growing) electrodeposited DLC layer(s) to facilitate incorporation of the dopant heteroatoms into a largely sp3-bonded carbon matrix. In this way, sp3-bonding is facilitated, and doping atoms are introduced in a controllable manner and concentration in the sp3-bonded carbon matrix. The relative concentrations of heteroatom electrodeposition carbon sources, and "pure" carbon sources (eg MeOH, diamondoids, $CH_3COOH$ and the like) can be adjusted in the electrolyte to achieve doping levels of, for example, $1 \times 10^{14}$ to about $1 \times 10^{20}$ atoms per $cm^3$ for semiconductive layers, and higher levels for degenerately more conductive layers. Heteroatom containing diamondoids[51] having an sp3 diamondoid nucleus in which one or more of the diamondoid nucleus carbons has been substitutionally replaced with a noncarbon atom such as boron, nitrogen, sulfur, etc. are particularly useful for "doping" electrodeposited DLC in accordance with the present disclosure. For example, boron, nitrogen and/or sulfur may be covalently incorporated in higher and lower diamondoids in sp3 configuration, which when electrodeposited on the growing cathodic surface, can provide donor and/or acceptor atoms or complexes to the DLC to produce n- or p-type semiconductive or conductive properties in the DLC. Codeposition of n- and p-doping heteroatoms can also be useful. For example, B and N doping can produce shallow doping levels which are adapted for ambient temperature conductivity in diamond. Such heterodiamondoids may have one or more functional groups (eg, covalently pendant therefrom) such as carboxylic, —OH, —NH2, etc which are advantageous for electrodeposition into a DLC layer.

A precleaned conductive (100) silicon wafer 20 mm long, 10 mm wide and 1 mm thick is used as an electrodeposition electrode 110 in an electrodeposition system like that of FIG. 1. A thin layer of diamondoids may be predeposited on the cathode in a variety of ways[52] to precondition the electrodeposition cathode for enhanced sp3-carbon deposition. A platinum plate, boron-doped diamond layer, or a graphite sheet of similar or slightly larger areal size is used as the counterelectrode 114. The distance between the electrodes may be varied from about 5 mm to about 7 mm. Pure methanol is used as the primary electrolyte, in which is dissolved a small amount of adamantine and/or higher diamondoid sp3 carbon source codeposition component. The diamondoid codeposition component concentration in the methanol electrolyte ranges for example from about 0.01 to about 0.5 milligrams per milliliter (mg/mL) of the electrolyte mixture in this example, but may be utilized on other concentrations and electrolyte compositions. DLC films are deposited at an applied voltage in the range of from about 800 to about 1600 V at a temperature of about 50° C. for a deposition time ranging from about 30 minutes to about 5 hours. The DLC films have high sp3 carbon content[53]. The electrodeposition may be repeated using a reverse-pulse anodic oxidation electrodeposition procedure. In this regard, after an initial 10 minutes of DC electrodeposition to establish and fix surface carbon on the deposition electrode 110, a duty cycle of alternating cathodic and anodic voltages like that of FIG. 8 or FIG. 9 is applied between the deposition electrode 110 and the counterelectrode 114 by power supply 102 to remove from about 5 to about 25 weight percent of the carbon deposited on the deposition electrode during the preceding cathodic duty cycle. Small amounts of an oxidizing agent such as water, nitromethane, etc may be included in the electrolyte to facilitate preferential sp2 carbon oxidation and removal. Diamondoid and/or heterodoped diamondoid carbon source(s) may be dissolved in the electrolyte in accordance with the present disclosure. At the conclusion of the electrodeposition, a high sp3 carbon electrodeposited layer is provided on the electrode 110 which has an enhanced sp3 carbon content compared to the deposit produced without preferential pulse-reverse oxidation of non-sp3 carbon. A similar process may be utilized to electrodeposit high sp3 carbon on carbon/graphite or metal fibers or sheets using an electrodeposition system like that of FIG. 2, and processes described in connection therewith.

Similarly, a precleaned silicon (100) substrate deposition electrode 110 and a polished platinum, conductive diamond, or graphite counterelectrode 114 may be used in an electrodeposition system like that of FIG. 1 at a parallel plane separation distance of about 6-10 mm. Pure methanol having an amine, carboxylic, and/or halide diamondoid derivative dissolved therein at a level of from about 0.05 to about 0.5 mg/mL is used as the electrolyte. Electrodeposition is carried out at a temperature of about 55° C. at a deposition potential of about 300-1000 Volts over a deposition time period of from about 10 minutes to about 4 hours. The electrodeposited DLC has high sp3 carbon content[54]. An electrodeposit using heterodiamondoids in the electrolyte may be significantly more electrically conductive than the DLC in the absence of heterodiamondoid co-electrodeposition. As examples of useful device structures, a p-type diamond layer may be electrodeposited on n-type silicon substrate to form an n-p heterojunction layers useful for thermoelectrics and other electronic and electrooptic devices. An n-type diamond/DLC layer may be electrodeposited atop a previously electrodeposited p-type diamond/DLC layer (or vice versa) to form p-n diamond/DLC homojunction structures similarly useful. Electrodeposited diamond/DLC structures may also be implanted with n- and/or p-type dopants in preselected device patterns in accordance with conventional integrated circuit procedures, and annealed to activate the dopants.

As indicated, diamondoid monolayer patterns may be used to prescribe zones of enhanced DLC electrodeposition. Diamondoid photoresist compositions[55], including doped heteroatom diamondoid resist compositions, may also be used to apply thin patterns to a conductive substrate electrode, which can be used as a base for DLC electrodeposition. Conventional patterning processes including positive, negative photolithography, ebeam writing, and nano or micro-imprinting may be used to produce desired patterns and configurations. The diamondoid photoresist patterns may be heated, for example to a temperature of at least 200° C. to consolidate the diamondoid film and increase its conductivity. By heating the film, hydrogen and other components of adjacent diamondoids or pendant groups may be removed and carbon-carbon bonds formed between the adjacent diamondoid components to form a more structurally crosslinked/unified network. Inclusion of appropriate doping atoms such as boron, sulfur, phosphorous and/or nitrogen can enhance the electroconductivity for subsequent electrodeposition thereon.

An important doping capability is contiguous or epitaxial electrodeposition of n- or p-type DLC atop an opposite-type substrate, with or without an intermediate intrinsic DLC zone. n- (or p-) type DLC can be electrodeposited adjacent p- (or n-) type DLC by electrolyte change with different dopants. Electrodeposited DLC products having a p-n interface (and n-p-n- and/or p-n-p interfaces) are useful for integrated circuit manufacture, as well as optical and photoelectric devices.

Nanodiamond particles may also be used to assist dispersion of carbon nanotubes[56] and/or graphene/graphene oxide nanosheets[57] in carbon electrodeposition electrolytes. CNTs can be readily dispersed in RTILs and other carbon source materials[58] for use in DLC electrodeposition electrolytes in accordance with the present disclosure.

Appropriate anodic oxidative treatment can decrease surface roughness of a DLC electrodeposit, expose crystalline sp3 diamond zones for nucleation, and provide a smoother surface for subsequent cathodic DLC deposition cycle(s). Such anodic treatment is especially useful to enable more uniform and controllable nucleation of diamondlike sp3 carbon electrodeposition when utilized in conjunction with (preferably electroconductive) nanodiamond particle co-electrodeposition. The anodic treatment cycle is designed to clean and expose the sp3 diamond carbon structure of the codeposited nanodiamond particles and surfaces, to serve as sp3 deposition zones under high pressure carbon deposition conditions of the following cathodic processing.

Appropriate particle codeposition can increase electrical conductivity and/or electrodeposition rate, as well as modify properties of the electrodeposited DLC. For example, codepositing ~3 to about 100 nm diameter electroconductive nanodiamond[59] particles can both increase the effective electrical conductivity of the electrodeposit, and provide new high-surface-field diamond nucleation sites for diamond sp3 growth. Conductive N-B and/or B-doped-diamond particles with low resistivity (eg, ~5-37×10 $\Omega$·m, and relatively high thermal conductivity (eg, >500 W/m·K) which can be milled/ground from larger particles or sheets[60], or formed by detonation of dopant-containing precursors, can be codeposited[61] with the DLC to increase the manufacturing throughput rate for a given thickness, and be a tool for internal residual stress control. Relatively nonconductive diamond powders can be coated with a very thin layer (eg, from about 0.5 to about 10 nm) of conductive doped diamond by vapor deposition[62], to provide electrically conductive diamond powders for codeposition use in accordance with the present disclosure. Degenerate, metallic-type and n-type nanodiamond particles are preferred for cathodic electron conduction, but p-type nanodiamond particles are also useful. Internal stress is a significant problem for conventional CVD materials deposited at high temperature because of differences in thermal expansion/contraction of the substrate and the vapor-deposited diamond/DLC. Electrodeposition of diamond/DLC coatings on silicon, metals, carbon fibers or other substrates at ambient-to-moderate temperature can limit the large internal residual stresses caused by cool-down of conventional vapor-deposited carbon coatmgs[63] due to thermal expansion coefficient mismatch. The reverse-pulse removal of sp2 and other non-sp3 carbon described herein can also be a tool for controlling compressive strain. Codeposition of nanodiamond, silicon, boron, graphene, carbon nanotubes, etc. can also permit internal stress control[64]. There are a wide variety of substrate materials with different thermal expansion coefficients, so this tailoring approach is an important capability. Au, Pt, Fe, Ni, etc. nanoparticles electrodeposited in diamond/DLC can provide additional electrode (eg, specific catalytic or electron emission) characteristics. Also, codeposition of metals or other materials which can be etched away can be used to produce high-surface-area DLC electrodes for water treatment, fuel cells, etc. It is noted that graphite particles can be selectively etched away by anodic oxidation. Interconnected/adjacent ("percolating") graphitic particles codeposited in a thick DLC layer can be etched away through the thickness by appropriate anodic oxidation, to leave a porous high-sp3 carbon electrode material which is particularly suited and useful for batteries, fuel cells, and wastewater treatment.

To illustrate various aspects of the present disclosure, a DLC film is prepared utilizing reverse pulse selective removal of sp2 and other non-sp3 carbon. In an electrolytic cell system 100 like that shown in FIG. 1, an n-type silicon (100) substrate with a sheet resistance of about 7-13 $\Omega/cm2$ is used as an electrodeposition electrode substrate 110. A graphite plate is used as the counterelectrode 114. The size of Si substrate 110 immersed in the liquid electrolyte 108 is 1.0 cm×1.5 cm. Analytically pure methanol ($CH_3OH$>99.5%) which may include 0.01 weight percent pure water and/or 0.01 weight % glacial acetic acid and/or hydrogen peroxide, is used as the electrolyte[65]. The silicon electrodeposition substrate is cleaned in aqueous 5% HF for 3 minutes at 25° C. before electrodeposition to remove the native oxide layer, and then sequentially cleaned in an ultrasonic bath with deionized water, ethanol and acetone. Before DLC coating, the surface of the silicon substrate 110 may activated with nanoscale or submicron diamond particles in a manner similar to conventional CVD seeding procedure[66] to form nucleation sites for electrodeposition growth of sp3 carbon during the electrodeposition process. The surface activation can be carried out by substrate polishing with diamond powder or by immersing the substrate into a liquid suspension of nanoscale or microscale diamond particles accompanied by ultrasonication in the presence of the diamond particles to treat the Si substrate surface, or both. The Si electrodeposition substrate 110 and the graphite counterelectrode 114 are then mounted face-to-face in parallel in the electrolyte 108 in the cell 106 at a uniform separation of 6 mm. Electrodeposition is carried out by initially applying a cathodic DC potential of −1600 Volts from the power supply 102 across the electrodeposition substrate 110 (as cathode) and the counterelectrode 114 (as anode) for approximately 5 minutes to initiate DLC electrodeposition. A simple reverse pulsed programmed sequence 802 like that of FIG. 8 is then applied to the deposition substrate 110 under control of power supply 102, with alternating cathodic voltage cycles of −1600 volts of 9 second duration and anodic voltage cycles of +500 volts of 1 second duration (90% cathodic duty cycle), at a temperature of 333° K for a sufficient time to produce a 450 nanometer thick DLC layer at a maximum cathodic current density of about 15-50 mA/cm$^2$. A strong, hard, compact, continuous, nonporous high-sp3 carbon content electrodeposited DLC layer is produced on the silicon substrate 110 (compare Yan et al[67]).

To illustrate the manufacture of a multidimensional high surface-area diamond electrode structure, an electrodeposition system 100 such as that illustrated in FIG. 1 is used to electrodeposit DLC on an aluminum screen, or another electroconductive substrate material which can be dissolved after DLC electrodeposition to produce a hollow-tube DLC structure useful as a high surface area electrode for wastewater treatment or other electrochemical purposes. A cleaned and electropolished flat screen of woven aluminum or titanium[68] wire of diameter 0.2 millimeters (15 wires/centimeter in both x and y directions) and having a screen dimension of 1.5 cm×1.5 cm, is mounted as the deposition electrode 110 in an electrodeposition system 100 like that of FIG. 1 containing methyl alcohol and trace water with small amounts of a doping agent (such as acetonitrile and/or $B_2O_3$) as the electrolyte. The screen 110 may be pretreated with nanodiamond to assist sp3 nucleation, and electroconductive nanodiamond particles are included in the electrolyte to enhance conductivity, sp3 nucleation, and deposition rate. Graphite plates of the same 1.5×1.5 cm planar size are spaced 7 mm from, and parallel to, each respective side of the Al screen 110 to serve as two counterelectrode(s) 114 with the aluminum screen deposition electrode 110 there between. DLC is initially electrodeposited on the screen 110 at an applied cathodic voltage of −1400 V for approximately 5 minutes. Subsequently a reverse pulse deposition regimen of alternating −1400 volt cationic pulses and 500 volt anodic pulses with a 90% cathodic duty cycle is carried out as described above, for a period of 8 hours at a constant temperature of about 50° C. (compare Li et al[69]). A hard, strong, continuous, high sp3 content DLC coating is formed over the entire aluminum screen, unifying it at the points of contact of the orthogonal wires in the screen. Conductive nanodiamond particles are preferably included at a concentration in the electrolyte such that from about 0.01% to about 0.5% of the total weight of the deposited DLC composite is codeposited electrically conductive nanodiamond particles integrally embedded in the DLC. Adamantane or higher diamondoid, as well as heerodiamondoid sp3-carbon and doping sources may also be included in the electrolyte, as described herein. The DLC-coated screen is then immersed in a suitable etchant for aluminum, such as hydrochloric acid, or sodium hydroxide, to remove the aluminum screen from its exposed wire ends. A strong, unitary hollow screen DLC structure is produced which has high internal surface area, which is useful for fluid processing and as an analytical diamond electrode[70].

As another example of electrodeposition of DLC, the abovedescribed processing is repeated with a planar array of electroconductive carbon fibers (electrically connected at both ends by an electroconductive frame) to the electrode power supply, as the electrodeposition substrate 110 [FIG. 1]. To form the deposition substrate 110, a single layer of parallel carbon fibers spaced apart by a distance of about 25 microns between their axes is aligned in a planar parallel array under slight tension so that they do not contact each other. The fibers may be, for example, Toho TENAX® chopped carbon fiber PAN filaments (Toho Tenax America, Inc; unsized or sizing removed) of nominal 4275 MPa tensile strength, 225 GPa tensile modulus, 1.82 g/cm$^3$ density, 7 μm filament diameter and 1,380 μΩ-cm electrical resistivity, or GRANOC™ YS-95A pitch-based graphitic fiber 5 (unsized or sizing removed, of Nippon Graphite Fiber Corporation) having nominal 3530 MPa tensile strength, 920 GPa tensile modulus, 2.19 g/cm$^3$ density, 7 pm filament diameter, −1.5×10$^{-6}$/K coefficient of thermal expansion, 600 W/m·K thermal conductivity, and 1380 μΩ-cm electrical resistivity. To increase electrical conductivity for electrodeposition herein, carbon and graphitic fibers can be doped with electron donors and acceptors[71]. Two platinum or graphite plates spaced on opposite sides of the planar carbon fiber substrate array 110 at a distance of 6 millimeters are used as the counter electrode(s) 114. The electrically conductive carbon fibers are pretreated in an ultrasonic bath of methanol with 1 volume % 0.25 micron diameter diamond particles for 30 min and air dried[72] to facilitate sp3 carbon nucleation. The electrodeposition is carried out on the fibers 402 [FIG. 4] as described hereinabove, until an approximately 0.5-1.0 micron thick hard, strong continuous covalently adherent DLC coating 404 having high sp3 content is deposited on and covalently bonded to the entire exterior surface of the individual fibers 402. The DLC surface of the fibers 400 is readily covalently functionalized for covalent bonding with an organopolymeric matrix to provide a functional surface 406. In this manner, high-performance fibers and filaments 400 having monolithically contiguous diamond/DLC layer 0.25-2μ thick of 20-90 GPa hardness and 7-30 GPa tensile strength, with 100-1000 W/mK z-axis thermal conductivity can be manufactured.

Figure 4:
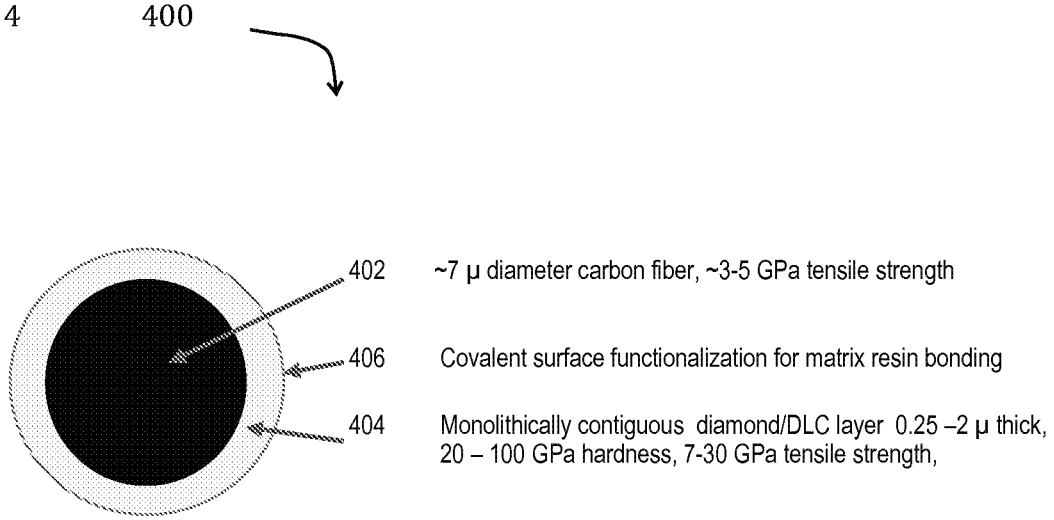
FIG. 4 is a cross-sectional view perpendicular to the axis of an electroconductive graphitic carbon fiber which has been coated with an electrodeposited monolithically contiguous diamondlike carbon layer having exterior surface covalent functionalization for matrix resin bonding.
Figure 5:
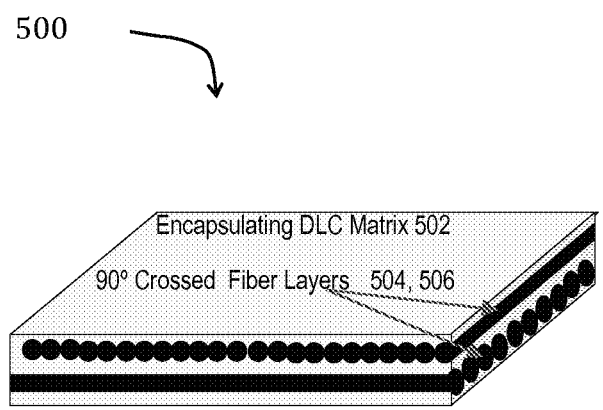
FIG. 5 is a cross-sectional perspective view of 90° crossed layers of graphitic carbon fibers embedded in a monolithic, electrodeposited, ultrahard diamondlike carbon matrix.

In another example illustrating manufacture of a monolithic composite 500 of multiple carbon fibers in a DLC matrix 502 such as illustrated in FIG. 5, multiple layers 504, 506 of close-spaced carbon filaments of nominal 7 micron diameter such as described above are mounted in an electrically conductive frame to form the electrodeposition substrate 110 of a DLC electrodeposition system such as that of FIG. 1. The longitudinal axes of the 7 micron diameter fibers are mounted in each layer 504, 506 at a nominal separation distance of 8 microns, providing approximately only a nominal micron distance between their surfaces. Unlike the above example of manufacture of individual DLC-coated filaments 400 of FIG. 4, the filaments of layers 504, 502 may be in electrical contact with each other. The layers 504, 506 themselves are nominally mounted within a micron or two of each other, and may also preferably touch in electrical contact. The electrically conductive carbon fibers are pretreated in an ultrasonic bath of methanol with 1 volume % submicron or nanodiamond particles for 30 min to facilitate sp3 carbon nucleation. Two graphite or platinum plates spaced on opposite sides of the planar carbon fiber substrate array 110 at a distance of 6 millimeters are used as the counter electrode(s) 114. The electrolyte 108 maybe a methanol-based electrolyte as previously described, and may include an adamantane or higher diamondoid sp3 carbon source. To produce the monolithic DLC matrix 502 encasing the carbon fiber layers 504, 506, a DC cathodic voltage such as −1400 Volts is applied from the power supply 102 to the carbon fiber deposition electrode 110 in the methyl alcohol electrolyte 108 across the counterelectrode(s) 114. After 5 minutes at −1400 V to form a covalently bonded DLC interface on the carbon fiber array 110 (without excessive anodic etching of the carbon fibers), a reverse pulse sequence is initiated between the electrodes 110, 114 like that of FIG. 8 having a cathodic voltage of −1400 V and an anodic voltage of +500 V with a cathodic duty cycle for the electrode of 80% and an anodic duty cycle of 20% with a cycle frequency of 0.01 second applied to the carbon fiber deposition substrate 110. After 10 minutes, purified (preferably electrically conductive) 4-10 nanometer diameter nanodiamond particle suspension is introduced into the electrolyte 108 at a concentration of about 0.1 mg/milliliter. Optionally, graphene and/or semiconductive or preferably metallic-conductive carbon nanotubes can also be provided in the electrodeposition electrolyte 108 at a concentration of 0.01 mg/milliliter to enhance electric conductivity, particularly in connection with the use of undoped relatively nonconducting nanodiamond co-deposition particles. As the DLC electrodeposition proceeds, the DLC layers around adjacent carbon fibers merge to form a unitary matrix. The electrodeposition is continued until a hard, strong monolithic high sp3 carbon DLC matrix fully encases the carbon fiber layers 504, 506. The composite 500 has extreme hardness, strength and flexural modulus (stiffness).

In the examples described herein, current control can also be used instead of, or in combination with, applied voltage in carrying out DLC electrodeposition processes in accordance with the present disclosure. Preferably, both current and voltage control can be used in programmed industrial production processes. Current control advantageously may be less subject to variations in electrolyte conductivity, temperature and separation distance between the deposition electrode(s) and the counterelectrode(s). For example, power supplies such as those of systems of FIGS. 1 and 2 may be set to deliver cathodic current to provide a preselected maximum cathodic current density at the electrodeposition surface(s) during DC and pulsed operation in the range of from about 10 to about 100 mA/cm2 (eg, 50 mA/cm2). The power supply may also be programmed to deliver maximum anodic current density at the electrodeposition surface(s) during anodic pulses in a similar range (eg, 30 mA/cm2). By applying a preselected voltage (eg −1600 V in methanol electrolyte) to the substrate across the electrolyte through the counterelectrode(s) with current control, such that a maximum substrate current density is not exceeded at the electrodeposition surface(s) (eg, 70 mA/cm2), localized overheating, and current microfilaments can be controlled.

Figure 6:
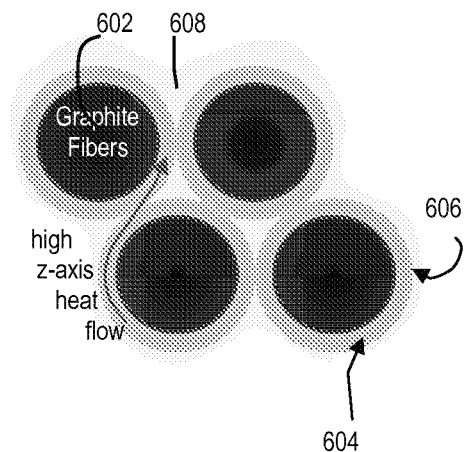
FIG. 6 is a cross-sectional view of a plurality of DLC-coated electroconductive graphite fibers like those of FIG. 4, which are embedded and covalently bound within an organopolymeric matrix.
Figure 7:
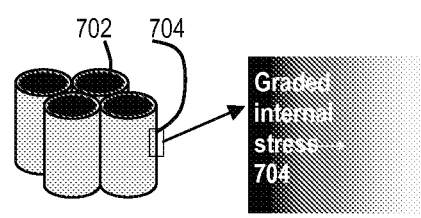
FIG. 7 is a perspective cross-sectional view of carbon fibers like those of FIGS. 4 and 6, having a functionally-graded diamond like carbon coating, with an enlarged view of a portion of the DLC coating of one of DLC-coated fibers.

Electrodepositing diamond/DLC in unitary net shape around carbon and/or or metal fibers, wires and/or screens produces composite structures with unprecedented strength, hardness and stiffness. The wires or fibers can also be designed to carry electrical signals or power, such as for service as an electronic system backplane. Fiber optic channels and conduits can also be embedded in the structures. Electrodeposition systems may be scaled to process very large substrates, including wound fiber/filament substrates. It is also desirable to apply DLC to long electroconductive fibers, wires, filaments, sheets, screens, tapes, and (woven and nonwoven) cloth. Schematically illustrated in FIG. 2 is an electrodeposition system 200 for electrodepositing DLC on conductive fibers, filaments and/or tapes. The electrodeposited DLC may be applied to form a continuous matrix around multiple fibers as illustrated in FIGS. 5 and 10, or may be applied to coat individual fibers, as illustrated in FIGS. 4, 6 and 7. Carbon-fiber reinforced composites are in wide commercial and military use, from "stealth" aircraft to lightweight aerospace and other mechanical structures. A monolithic coating of DLC/diamond on individual fibers, fiber aggregates or carbon nanotube wires/aggregates can significantly increase strength, stiffness, or thermal conductivity[73].

The smooth, monolithic cylindrical DLC/diamond coating on carbon/graphite fiber provides a strong, efficient all-axis heat-conductive[74] structure. Diamond itself has an enormous z-axis heat conductivity (∼2500 W/m·K) which can be over 100 times the z-axis, and over 20 times the x-axis thermal conductivity of carbon fiber. Diamond also has enormous tensile strength (>65+ GPa) at least 10 times that of typical graphite fiber[75]. Diamond's hardness (>165+ GPa), stiffness and low unlubricated friction coefficient (<0.1) make it an ideal sizing agent to protect carbon fibers from mechanical damage during processing. The higher the sp3 content of the electrodeposited DLC in accordance with the present disclosure, the more closely it approaches such properties of monocrystalline diamond. Conventional graphite/carbon filaments and fibers are easily damaged in processing and composite formation, or weakened by surface-adhesion enhancement treatments such as plasma oxidation. Carbon/graphite fibers are conventionally sized with protective surface materials which do not have the intrinsic strength and hardness characteristics of the carbon/graphitic fibers, much less the properties of DLC. DLC-coated fibers such as those illustrated in FIGS. 4, 6 and 7 can have a thin covalently-bonded surface layer 404 of ultrastrong and ultrahard diamond, which can protect the fibers 402 during subsequent composite fabrication. And unlike the limiting bonding chemistry of graphitic/sp2 fiber surfaces, the DLC surface has a rich functionalization chemistry[76] to provide surface functionalization which is readily adaptable for covalent coupling with a resin matrix to form an ultrastrong composite. The DLC can include covalent surface functionalization 406 such as amine or hydroxyl groups, to significantly improve carbon fiber composite manufacture and properties. Because the DLC coating 402 has relatively high all-axis thermal conductivity, stronger, less-graphitic carbon fiber 402 can also be used in manufacture of composites intended for thermal transport functions, to enhance overall composite structural properties. A stronger, and therefore thinner, DLC/diamond-coated fiber composite is inherently more thermally conductive, in proportion to its reduced thickness. A smooth, uniform, monolithic, ultrastrong, resin-functionalized diamond interface provides large improvement in thermally conductive, structural, 2D unitape laminate graphite and other carbon fiber composites.

Illustrated in FIG. 7 is a graphite/carbon filament 702 having a monolithically integral electrodeposited coating 704 having graded (and/or layered) properties. A small compressive stress of 0.25 to 0.75 GPa in at least the outer surface of a diamond/DLC coating on a carbon fiber may be desirable for mechanical strength maximization. But a monolithic diamond/DLC coating electrodeposited on the surface of a carbon fiber should preferably minimize the stress at the interface between the fiber and the electrodeposited DLC coating. In accordance with the present disclosure, functional stress-gradation can be produced through the diamond/DLC coating, from its inner to outer surfaces, by varying electrodeposition conditions. The internal stress of the DLC coating can substantially match the carbon fiber at the surface from which it originates and from which it is monolithically grown, but can be functionally graded so that the outer surface has a desired internal compressive stress of, for example, 0.25-0.75 GPa to maximize composite tensile strength. There are a wide range of carbon/graphite fibers having different internal stress and coefficients of thermal expansion for design of composites for specific uses.

As indicated, unlike high-sp2 carbon/graphite fiber, diamond/DLC has a rich surface functionalization chemistry[8] readily suitable for composite manufacture. For example, surface hydroxyl groups (—OH) are easily formed on diamond electrode surfaces, as are amine groups (—NH$_2$)[77], suitable for bonding with epoxy and other resins such as acetylenic thermosets. Other sp3 carbon functional attachment chemistry is well-developed. Polymerization of matrix polymers and functional oligomers can also be covalently initiated from the DLC surface. Thermosetting resins for which appropriate diamond surface functionalization may be provided for bonding, include phthalic/maleic type polyesters, vinyl esters, epoxies, phenolics, cyanates, aromatic polyimides, bismaleimides, 5250-4, M65, PMR-15, AFR700B, AFR-PE-4, PETI-5, PETI-330, and others. The overall composite performance can also be improved by increasing the resin thermal conductivity and strength. Nanoscale graphene and BN platelets can be easily functionalized (eg, preferably at their edges) for reaction with and incorporation into a resin matrix 608 [FIG. 6]. BN nanosheets are equally thermally conductive and mechanically robust as their graphene carbon counterparts, while being electrically nonconductive, and have profound chemical and thermal stabilities.[78]

As illustrated in FIG. 7, electrodeposited DLC can be functionally graded by control and variation of electrodeposition conditions during the course of the DLC electrodeposition. The current/voltage/temperature conditions, the electrolyte composition, codeposition components such as nanodiamond, graphene and nanotubes, and/or dopants such as boron, nitrogen, metals, etc. can be varied during the course of the electrodeposition to modulate the properties of the deposited DLC. Photostimulation and excitation by UV/VIS can be used or varied during the course of the electrodeposition. The presence and concentration of anodic oxidation sources in the electrolyte can be controlled and varied. The respective zones around the electrodeposition electrode(s) 110 and the counterelectrode(s) 114 can be compartmentalized to contain different electrolyte compositions. The cathodic voltage (current), the reverse anodic voltage (current), duty cycles, and timing can be varied during the course of the electrodeposition. The composition of the electrolyte 108 can be varied during the course of the electrodeposition, for example by including or varying the concentration of carbon source components, codeposition components, and dopants. Variation of deposition pressure at the substrate with the electric field as previously described, and anodic etching of sp2 carbon, are also mechanisms for control of electrodeposited DLC functional properties during the course of the electrodeposition.

Removal of heat generation is a critical limitation for high-speed electronics. Silicon has a relatively low practical upper operating temperature limit (eg, 150-175° C.), and a relatively low thermal conductivity (150 W/m·K). Higher thermal conductivity is needed for heat removal from high-energy dissipation silicon devices, as well as other semiconductors. Electrodeposition of diamond/DLC on appropriate integrated circuit and high-speed electronics substrates can provide thermal heat sinking, MEMS structures of extreme strength, wear-resistance and stiffness, integrated SAW electronics, and even integrated diamond semiconductor electronics with appropriate p-, n- and/or Schottky doping/contacts. In this regard, the disclosure and examples described herein, such as the abovedescribed process for DLC electrodeposition on silicon substrates, may be applied using silicon wafer substrates having high-power electronic circuitry fabricated thereon. In such DLC deposition processes, the backside of an IC wafer without electronic circuitry is preferably pre-treated with diamond to initiate sp3 carbon nucleation. The frontside circuitry of the IC wafer may be protected from electrical damage by dielectric and/or a metallic conductive layer (eg, Al or Cu), which may be in electrical connection with the power source, to also serve as a substrate for DLC electrodeposition. A very thin doped electroconductive CVD DLC layer may be applied to the IC wafer for additional protection and to serve as a base for the electrodeposition of a thicker DLC heat-transfer layer. Electrically conductive submicron diamond particles are preferably provided in suspension in the electrolyte 108, and the electrolyte may include diamondoid and heerodiamondoid (doping) components. Upon electrodeposition of the DLC-diamond particle composite, an IC wafer is provided having excellent heat-spreading thermal conductivity for heat removal from hot-spot circuit sites to off-chip heat-sinking The example may be repeated to deposit DLC around a high-intensity semiconductor diode laser, with appropriate dielectric protection for the laser terminals, to provide a high performance heat removal DLC casing.

Another example illustrates various reverse pulse non-sp3 carbon removal aspects of the present disclosure in comparison to conventional DLC electrodeposition[79]. Substantially analytically pure methanol (99.5%) is used as the, carbon DLC electrodeposition electrotyte in an electrodeposition system 100 like that of FIG. 1. The electrolyte may contain 0.01 to 0.5 weight percent pure water as an anodic oxidant and cathodic hydrogen abstraction component, and heterodiamondoid and/or very small amounts of DMF and/or $B_2O_3$ as conductivity-enhancing doping-agents. The electrodeposition substrate 110 is an n-type silicon (100) monocrystalline wafer of dimension 5 mm×25 mm×0.3 mm, an electrical resistivity of 3-7 Ω/cm. The counterelectrode 114 is a same-size graphite or platinum sheet separated from the electrodeposition substrate electrode 110 by a distance of about 5 mm. Before deposition, the substrate 110 is cleaned with acetone, ethanol and distilled. water sequentially, and then immersed in the 5% HF solution for a few minutes to remove the native oxide layer, cleaned in an ultrasonic cleaner (preferably with diamond slurry to increase sp3 nucleation) and then distilled water, and then placed in the methanol electrolyte with an area of 1.0 cm×0.5 cm submerged in the MeOH for DLC electrodeposition. The silicon substrate 110 may be abraded with sp3 diamond in a manner used for conventional CVD deposition[80]. A DC cathodic voltage of −1600 V is initially applied by the power supply 102 to the substrate 110 across the counterelectrode 114 by program controller 104 to heat the methanol electrolyte to approximately 50-55° C. (with a reflux condenser to limit MeOH evaporation), and then the cathodic electrodeposition voltage is maintained at −1200 V in a constant voltage mode for 15 minutes. The electrolyte may be purged with an inert gas such as nitrogen or argon to remove oxygen. A reverse pulse electrodeposition procedure is then applied to the electrodeposition substrate 110 by the program controller like that of FIG. 8, in which 1200 Volt cathodic: nominally square wave pulses of 30 second duration are alternated with +600 Volt nominally square wave anodic pulses of 1 second duration, applied to the DLC electrodeposition substrate 110. The temperature of the electrolyte is maintained in the range from 50 to 55° C. by the program controller (with temperature sensor 118) and thermal-electrolyte control system 124, for a total electrodeposition time of 4½ hours. A small amount of acetonitrile, DMF and/or boron dopant may be included in the MeOH electrolyte to enhance electrodeposited sp3 carbon conductivity as previously described (with appropriate electrodeposition voltage reduction to accommodate any increased electrolyte electroconductivity). A small amount of purified sp3 nanodiamond is included in the electrolyte 108. After electrodeposition, a hard DLC layer which includes crystalline diamond is formed. This hard layer may be used as a hard low-friction surface or may be used to prepare diamond particles. In this regard, the layer may oxidized by anodization (eg, in a 0.1 M sulfuric acid 0.3 M acetic acid solution) to oxidize away substantially all nondiamond carbon, to provide crystalline diamond particles. Alternatively, the DLC film may be mechanically broken up, and purified of non-sp3 carbon by chemical oxidation in the same manner as conventionally used for purification of detonation nanodiamond to provide diamond particles.

As a further example, a DLC electrodeposition process for codepositing nanodiamond (particles with DLC may be carried out in a similar manner as described above utilizing an electrodeposition system 100 like that of FIG. 1. The electrodeposition substrate 110 may similarly be an n-type silicon (100) monocrystalline wafer of dimension 5 mm×25 mm×0.3 mm, having a bulk substrate electrical resistivity of 3-7 Ω/cm, with heat-generating integrated circuitry fabricated on its front side which is protected by an organic polymer nonconductive coating. The counterelectrode 114 is similarly a graphite sheet separated from the backside of the electrodeposition substrate electrode 110 by a distance of about 5 mm. Before deposition, the uncoated backside of the substrate is cleaned with acetone, ethanol and distilled water sequentially, and then immersed in 5% HF solution to remove the native oxide layer, cleaned in an ultrasonic cleaner (preferably with diamond slurry to increase sp3 nucleation) and then distilled water, and finally placed in the methanol electrolyte with an area of 1.0 cm×0.5 cm submerged and facing the counterelectrode for electrodeposition. The substrate backside 110 may be pretreated with diamond in a manner used for conventional CVD deposition[81]. The methanol electrolyte 108 contains 0.1 mg/cm³ of suspended, purified, doped (electrically conductive) nanodiamond particles having a. diameter in the range of from about 3 to about 10 nanometers comprising a core of sp3 diamond and a surface substantially free of sp2 carbon. The nanodiamond particles may, bear surface covalent hydroxyl and/or hydrogen moieties, and the dispersion may be prepared by ultrasonic dispersion in the methanol electrolyte[82]. A cathodic voltage of −1600 V is initially applied to heat the nanodiamond-containing methanol electrolyte to approximately 50-55° C. the electrodeposition voltage is then maintained at −1200 V in a constant voltage mode for 15 minutes, and then reverse pulse cathodic-anodic electrodeposition cycle is carried out as described in the above example. The temperature of the electrolyte is maintained in the range from 50 to 55° C. for a total electrodeposition time of 4 hours. The resulting DLC film has high sp3 content, including crystalline diamond derived from sp3 carbon deposition on codeposited nanodiamond particles, together with relatively high thermal conductivity for heat transfer functionality.

A similar example may be carried out as in the immediately-preceding description (which may use an Al or Ti foil initial substrate 110 as well as a silicon substrate), but in which the electrolyte initially contains a substantially higher level dispersed purified electrically conductive nanodiamond particles having a diameter in the range of 4 to about 20 nanometers at a level of from about 1 to about 5 milligrams per milliliter of electrolyte, to initially form a relatively dense layer of nanodiamond nucleation sites in the initial DLC layer electrodeposited on the substrate 110. After the electrodeposited DLC layer with the codeposited nanodiamond nucleation sites reaches a thickness in the range of from about 50-100 nanometers, the electrolyte 108 is changed to an electrolyte with only 0.05 mg/mL of nanodiamond particles suspended therein, and an extended anodic treatment cycle is initiated for a time period of 5 minutes to remove substantially all non-sp3 surface carbon. The reverse pulse electrodeposition regimen is then resumed as above, on the remaining sp3 carbon electrodeposition surface, until the DLC film is 2 microns thick. The hard, strong, heat conductive, high-sp3 carbon electrodeposited DLC film produced thereby includes sp3 diamond zones substantially larger than the nanodiamond seeds.

Carbon nanotubes (CNTs) have remarkable anisotropic mechanical properties, including high elastic modulus, large elastic strain, and high toughness desirable for incorporation in DLC[83]. Single-walled (SWNT) and multiwalled (MWNT) nanotubes can be manufactured in small nanoscale diameters and lengths from microns up to centimeters or more. Depending on chirality and doping, CNTs can be metallic, semiconducting or nonconducting dielectrics. Electrically conducting CNTs can be selected and even "cloned" in manufacturing. However, because of their typically relatively short lengths, it is difficult to form extended filaments of CNTs and join their ends, so as to effectively utilize their anisotropic high tensile strengths and other properties. In accordance with the present disclosure, CNTs can be incorporated in a DLC matrix to form monolithic sheets and filaments comprising arrays of CNTs covalently connected in a strong DLC matrix.

In an example of CNT-DLC composite film electrodeposition using reverse pulse anodic treatment, films are electrodeposited on single crystal silicon wafer (100) mounted as the deposition electrode 110 in a system like that of FIG. 1, with a platinum plate as the counter electrode 114 at a parallel separation distance from the electrode 110 of 6 mm. N,N-dimethylformamide (DMF), methanol (MeOH) or a mixture thereof is used as the electrolyte 108. A concentration of MWNTs or partially hydrogenated carbon SWNTs ultrasonically dispersed in the electrolyte 108 is provided at a level of ~0.53 mg/mL. Up to about 0.3 mg/mL of purified nanodiamond (preferably electroconductive) may be substituted for an equal amount of MWNTs, to assist the dispersion of MWNTs and facilitate sp3 carbon nucleation and electrodeposition. The electrolyte may also include small amounts of diamondoid and heterodiamondoid carbon source materials as described herein. After applying an initial DC cathodic potential of −1400 volts to the substrate 110 for 5 minutes, the DLC films are electrodeposited by applying a cathodic potential of −1400 volts and anodic potential of +500 volts using a reverse pulse processing regimen including aspects of the processing regimen similar to the first portion of FIG. 9. In this regard, five cathodic −1400 volt pulses 904 of 0.0001 second duration separated by zero volt "rest periods" of 0.00005 seconds (cathodic duty cycle of ~67% at a frequency ~6667 Hz) are applied to the cathode 110, followed by a single +500 volt anodic pulse 908 of 0.0001 second duration (vs. the counterelectrode 114). This sequence is then repeated over a total electrodeposition time of 5 hours, at a temperature of 50° C. maintained by the controller 102 and thermal system 124. A smooth, adherent, strong, hard black film of DLC-CNT composite is produced. It is theorized that during the anodic oxidation cycles, fullerene-pentagonally-bonded carbon and other non-sp3 carbon configurations of the nanotube ends, which are not as stable as graphitic sp2 carbon of the nanotube sidewalls, are preferentially removed, and that during the cathodic carbon electrodeposition portions of the process, carbon can be attached to the codeposited nanotube ends to covalently bond them in the DLC matrix. The presence of co-deposited (preferably electrically-conductive) nanodiamond particles provides high nucleation density for sp3 diamond in the growing DLC matrix (compare with H. Hu et al[84]).

Mirror polished pieces of approximately 1 ohm-cm resistivity n-type silicon (100) with dimensions of 30 mm×10 mm×0.3 mm, which are ultrasonically pre-cleaned in pure acetone are used as both cathode 110 and anode[85] in an electrodeposition system such as that of FIG. 1 without external heating or cooling, using an electrolyte[86] consisting of pure ethanol (or eg, a 50-50 volume percent mixture of pure ethanol and pure methanol) and deionized water. The ultrasonic cathode precleaning is carried out with suspended nano- or micro diamond particles (to "pre-seed" the surface). The volume ratio of alcohol to water in the electrolyte in this example is 98:2, but may vary in other examples. A suspension of n- or p-type semiconductive or metal-conductive diamond and/or ultrananodiamond particles is maintained in the electrolyte 108 at a level of 0.01 to 1% (eg, 0.1%) by weight based on the total electrolyte weight. Semiconductive or metal-conductive[87] nanodiamond and/or ultrananodiamond for such electrolyte suspensions may be prepared in accordance with conventional practices, including detonation formation, or fragmentation of conventional CVD deposited n- or p-doped diamond or ultrananodiamond, for example 5-100 nm thick[88]. The doped CVD diamond layers may be deposited, separated from the deposition substrate in accordance with conventional practice. Such doped CVD diamond and/or prior n-doped HPHT diamond particles may be ground/milled to submicron particle size and purified in accordance with conventional methods.

The inter-electrode distance between the parallel flat surfaces of electrodes 110, 114 is fixed at 25 mm. A constant direct voltage of between 100 and 200 Volts is applied between the cathode 110 and anode 114 plates for about 15 minutes to stabilize the cathode 110 surface at a current density of from about 1.5 to about 5 mA/cm². A pulse-reverse voltage regimen like that of FIG. 8 is then applied between the electrodes 110, 114, with a cathodic cycle voltage in the range of from about −80 to about −200 volts applied to the cathode 110, and an anodic cycle in which an anodic voltage of about +70 to about +160 volts is then applied to the deposition electrode 110. During the cathodic cycle, carbon is deposited on the cathode, and semiconductive and/or metal-conductive diamond particles are deposited on the cathode. During the anodic cycle, non-sp3 carbon is preferentially etched from the cathode. The relative duration of the cathodic (eg, 5 seconds to 60 seconds) and anodic cycles eg, 4 seconds to 30 seconds) are adjusted so that the anodic cycles remove from about 5 to about 50 percent of the carbon deposited during the cathodic cycles. Typically, the peak voltage and duration of the anodic cycles are less than the peak voltage and duration of the cathodic cycles. The electrodeposition is continued for 5 and a half hours. The resulting DLC deposit on the electrode 110 is smooth and continuous, and has significantly higher sp3 content than a carbon deposit formed in the same manner but without anodic cycling and nanodiamond suspension, (which may even be discontinuous or porous)[90].

Diamond and high-sp3 diamondlike carbons are substantially inert in the body, are compatible with cell growth, and have a rich attachment chemistry for biological surface modification and for electronic and for MEMS systems[91]. In accordance with the present disclosure, low-cost medical diagnosis, long-term-biomedical implant, sensing, wear surface, and medical treatment control devices and processes can be provided by patterning and forming electrodeposited diamond in accordance with the present disclosure. Patterned electrodeposited diamond may be formed by masking by UV photolithography and etching (eg, by oxygen plasma) DLC layers, and/or by forming a patterned conductive electrode(s), and electrodepositing high sp3 DLC on the patterned conductor. A wide variety of other diamond and diamondlike carbon electronic and optical devices, processes and systems can also be provided based on the present disclosure, including ISFETs arrays, transistors, and neural-stimulating/recording electrodes[92]. Micro-Electro-Mechanical/Nano-Electro-Mechanical Systems are important applications in view of the high Young's modulus and thermal conductivity which can be achieved with electrodeposited diamond structures for high frequency SAW devices and electromechanical filters, high sensitivity mass detectors for bio-sensing and surface functionalization for biointegration and biodetection.

Graphene and graphene oxide (including their derivatives, such as amine and hydroxylated derivatives), may also be codeposited into electrodeposited DLC matrices in accordance with the present disclosure. Dispersible, single-layer graphene and/or graphene oxide[93] sheets are preferred for codeposition, over several-layer graphenes and graphene oxides. It is noted that graphene oxide can be readily reduced under cathodic deposition conditions, to form graphene structure zones at the cathode, and may even assist in hydrogen abstraction via its oxygen content. The codeposited graphene sheet content increases the electrical conductivity of the electrodeposited DLC, which can enhance electrodeposition. Variation of graphene content (and CNT and/or nanodiamond content) by variation of deposition conditions, permits functional gradation and/or layering of the electrodeposited DLC composite.

As an example of graphene incorporation in high-performance uniform electrodeposited DLC, few-layer or preferably single-layer graphene oxide sheets may be ultrasonically dispersed in methanol[94] and incorporated into a DLC film by reverse pulse electrodeposition in an electrodeposition system 100 such as illustrated in FIG. 1. Silicon (100) substrates with a resistivity of 14-25 Ω/cm are used as the electrodeposition substrate 110 and a platinum plate is used as the counterelectrode 114. Before electrodeposition, the silicon substrate is cleaned with HF solution (48%), distilled water and acetone, respectively, preferably with ultrasonic treatment in a nano- or microdiamond slurry or suspension to facilitate sp3 diamond nucleation. The deposition electrode 110 and the counterelectrode 114 are separated in parallel at a uniform interelectrode distance of 8 millimeters. The films are deposited under an applied cathodic voltage of 1200-1400 Volts at an electrolyte temperature of approximately 50° C. in accordance with the reverse pulse parameters of the DLC-MWNT example hereinabove. Methanol (including trace water) is used as the electrolyte and carbon source with suspended graphene or graphene oxide sheets at a concentration of ~0.5 mg/mL and suspended electroconductive nanodiamond at a concentration of 0.1 mg/mL of the electrolyte. A hard, uniform DLC layer is produced having anisotropic graphene platelets covalently bound in a high sp3 carbon matrix. The graphene sheets and sp3 nanodiamond incorporated in the hard DLC layer increase its electrical conductivity, facilitate thicker layer formation, and can function to reduce internal stress.

ide ionic liquid (Bu3MeN+Tf2N−), with high electroconductivity and a very wide electrochemical window, can be applied herein to permit control of surface electrochemistry conditions at the cathode to optimize formation of activated carbon source fragments such as putative $CH_3$ radicals and ions. A carbon source, such as methyl alcohol, DMF, DMSO, acetonitrile, ethanol and mixtures thereof may be dissolved with the RTIL at controlled concentration, for example ranging from about 5 volume percent to about 95 volume percent of the total electrolyte solution. RTILs typically do not have substantial vapor pressure (do not boil at elevated electrodeposition temperatures), and accordingly facilitate higher electrodeposition temperatures. High effective electropotentials, associated with higher-energy carbon fragments for sp3 bond formation[95], can be applied to the carbon source(s) at the cathode interface using a wide electrolytic window RTIL, to produce DLC with high sp3 carbon content. Significant increase in sp3 content, thermal and mechanical properties can be provided by independently optimizing the electrodeposition conditions with the aid of RTILs having a wide electrochemical window.

An additional advantage of RTIL electrolytes is the increased capability to electrodeposit DLC at higher temperatures which can facilitate DLC formation reactions such as hydrogen elimination. RTILs typically have negligible vapor pressure, while electrolytes such as methanol, ethanol and acetonitrile have relatively low boiling points. Electrolytes comprising an RTIL and (eg, 5-80 volume %) of a lower boiling point carbon source, can be readily used (eg, with a simple reflux condenser for the deposition tank) at somewhat higher temperatures without resorting to superatmospheric pressure processing conditions. Higher-boiling carbon sources such as DMF (153° C.) and DMSO (189° C.) can also be used or included in mixtures with lower-boiling carbon sources in solution with RTILs.

Other air- and moisture-stable RTILs, such as bis(trifluoromethanesulfonyl)imide RTILs, with high electrochemical windows include:

| Iconic liquids (From "Ionic liquids as electrolytes", Critical Review", Electrochimica Acta 51 (2006) p.5567-5580 | Cathodic limit [V] | Anodic limit [V] | Electro-chemical window | Working Electrode | Ref Electrode |
| --- | --- | --- | --- | --- | --- |
| Pyrrolidinium [nBuMePy] [N(CF3S02)2]⁻ | −3.0 | 3.0 | 6.0 | Graphite | AgIAg |
| Tetraalkylammonium [nPrMe3N] [N(CF3S02)2]⁻ | −3.2 | 2.5 | 5.7 | Glassy Carbon | FcIFc |
| Piperidinium [MePrPp] [N(CF3S02)2]⁻ | −3.3 | 2.3 | 5.6 | Glassy Carbon | FcIFc |

High electrochemical window electrolytes together with carbon source components. Various aspects of the present disclosure are also directed to use of electrolytes with high electrochemical windows, such as Room Temperature Ionic Liquids (RTIL) together with one or more carbon electrodeposition sources having a smaller electrochemical window than the RTIL. Room Temperature Ionic Liquids (RTILs) are liquid organic salts with high electroconductivity. RTILs can have very high electrochemical "windows" of up to 6 volts or more without oxidation/reduction of the RTIL itself. This is much higher than the electrochemical window of water, and conventional electrodeposition carbon sources such as methanol, ethanol, acetonitrile, DMSO or DMF. Room Temperature Ionic Liquid (RTIL) solvents, such as tri-1-butylmethylammonium bis((trifluoro methane)sulfonyl)im- The RTIL electrolyte may also include a hydrogen source component such as borohydride, water[96], or other hydrogen abstraction components to assist hydrogen removal from the DLC surface being deposited, to form reduced-hydrogen, or hydrogen-free substantially tetrahedral DLC. Voltage can be varied in an RTIL electrolyte to produce large electric fields and extremely high pressure gradients in the several-Angstrom-scale Stern zone immediately adjacent the cathode, which are conducive to sp3 bond formation. Reverse pulse, anodic oxidation processing to selectively remove amorphous, graphitic-sp2 and other non-sp3 carbon, as described above, can be applied in RTIL-based electrolytes to enhance the sp3 content, and provide additional benefits.

It is also noted that wide-electrochemical-window RTILs may be useful in anodic DLC electrodeposition. Anodic oxidation of acetylides has produced very small amounts of highly-strained (Lonsdalite-type) diamond, but not uniform films[97] at low voltages inadequate to provide high pressure at the deposition substrate at which sp3 carbon is stable or metastable. RTILs are able to accommodate higher anodic voltages and also to accommodate formation of solvated electrons which can generate H radicals for attack on sp2 carbon. For example, Lithium acetylide or an acetylide of the RTIL cation (eg, by metathesis) can be dissolved in a wide-window highly electroconductive RTIL, and electrodeposited at a potential >2 volts and preferably >3 volts capable of generating a pressure >4 GPa and preferably >5 GPa at the electrodeposition surface on a suitable substrate (eg, a diamond activated silicon substrate) to form a uniform DLC coating. A dopant such as NaBH4 or the borohydride of an RTIL cation is desirable for doping purposes. A small amount of copper can be useful as a catalyst for C—C bond formation upon acetylide oxidation.

Inexpensive large-area diamond electrodeposition, oriented graphene codeposition with DLC, and/or surface deposition on carbon filaments to improve properties[98] can produce materials with previously unreachable performance. High performance DLC can be used in a very wide range of applications, several of which are described below.

Protective armor DLC can be used in flexible (eg personnel) armor designs to defeat ballistic projectile and EM threats in a relatively thin structure. For example, as illustrated in FIGS. 5 and 10, layers of DLC-coated fiber substrates may be manufactured as thin, flexible layers of carbon/graphite fiber in a 2-D matrix of ultrahard DLC high stiffness and high lateral shockwave velocity crossties to maximize high-speed impact resistance, and lateral momentum transfer.

As shown in FIG. 10, multidirectional crossply layers 1002 of strong flexible carbon fibers may be encased in electrodeposited diamond/DLC in periodic crosstie zones 1004 of the fiber layers. Masks for regular deposition patterns such as those of FIG. 10 can easily be applied to carbon filament arrays by printing or photomasking techniques, or electrode design, so that electrodeposited diamond is patterned to retain flexibility of the cross-plied layers. The diamond matrix crosstie zones 1004 are extremely hard. They are slightly thicker than intermediate flexible fiber zones 1006 to also protect the carbon fibers from sharp shearing rupture. The individual carbon fibers themselves can be strengthened by a thin "epitaxial" diamond surface layer, as previously described.

The flexible carbon fiber layers 1002 remain free to bend in zones 1006 between the DLC matrix crosstie zones 1004. Multiple layers may be stacked, as needed for the designed threat level.

The hard strong DLC crosstie zones 1004 (eg, having hardness values of at least 20 GPa, and more preferably at least 30 GPa) have high capacity to withstand hard projectile impact. They also unify the fibers to transmit projectile shock and momentum laterally to fibers outside the area of energy and momentum impact. The fiber zones 1006 between the diamond crossties permit layer flexibility while retaining high tensile strength and toughness to contribute to lateral momentum and impact transfer to adjacent DLC matrix zones 1004. Offset overlap of multiple layers 1000, in which hard crosstie zones 1004 of one or more layers overlap flexible zones 1006 of other layer(s), may be used to provide full area coverage. Note that electrical conductivity of the fibers can also provide electromagnetic (EM) radiation protection for personnel and equipment.

In addition to the crosstie DLC zones to resist and spread impact, thin, strong monolithic DLC coatings on the individual graphite fibers can significantly strengthen them while retaining their flexibility:

Increased fiber strength from ~3-5 GPa, to eg, 6-15 GPa,
Extremely low friction, The ultrahard DLC surface layer replaces sizing, to protect the carbon/graphitic fiber from mechanical processing damage during manufacture
DLC provides increased all-axis thermal conductivity The hard-DLC-crosstied flexible, diamond-coated fiber layers can be stacked in front of similar or different/softer layers (eg, Kevlar™ or Spectra™) to form overlapped, multilayer armor. Because the electrodeposition process can operate at moderate temperature and pressure using simple electrodes and inexpensive plating equipment, large-area composites can be inexpensively manufactured. Scale-up is relatively uncomplicated and not particularly capital-intensive.

Anisotropic strength and stiffness properties maximized in planes perpendicular to impact can be provided by codeposition of CNTs and graphene and/or graphene/graphene oxide nanoplatelets as described hereinabove. By codepositing graphene and/or graphene/graphene oxide with diamond/DLC, anisotropic strength and modulus benefits of oriented graphene can be incorporated into the DLC, to reduce internal strain while increasing anisotropic property enhancement in the fiber layer planes needed for lateral impact distribution. Oxygen-containing COOH, —OH and epoxide groups of the graphene or graphene oxide may assist hydrogen abstraction and attachment in the DLC matrix under appropriate high-electric-field electrodeposition conditions, whereas amide edge-groups can contribute doping conductivity.

Graphane and/or graphene/graphene oxide nanoplatelets may be included, for example in the electrolyte with to co-deposit with the DLC adjacent the carbon/graphite fibers. Because the platelets are (preferably) only one carbon layer thick, and are oriented parallel to the carbon filament-cathode axes, the platelets can be incorporated into the DLC matrix to provide strong sp2 carbon structure oriented to laterally transfer impact loads. The incorporated platelets increase electrodeposition rate and reduce tensile stress. Their tendency to cause multilayer graphite formation can be reduced by use of a high electrodeposition potential and codeposition of nanodiamond and other sp3-seeding components in the electrolyte. The covalent incorporation of graphene platelets (and/or CNTs) can be reduced and then discontinued toward the outer layer of DLC electrodeposition, which is preferably a high sp3 content material.

Figure 11:
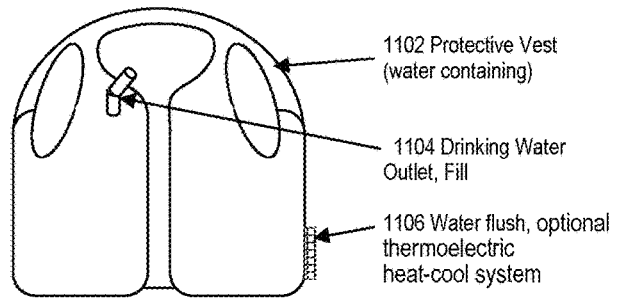
FIG. 11 is a perspective schematic view of a multipurpose, high performance armor vest.
Figure 12:
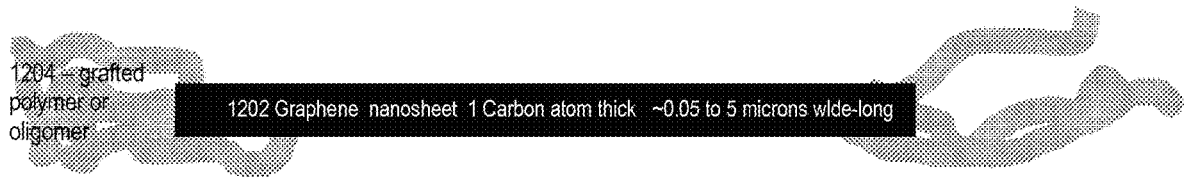
FIG. 12 is a schematic cross-sectional view of a single ultrastrong, ultrastiff graphene monolayer sheet having organopolymer chains grafted to its edges.
Figure 13:
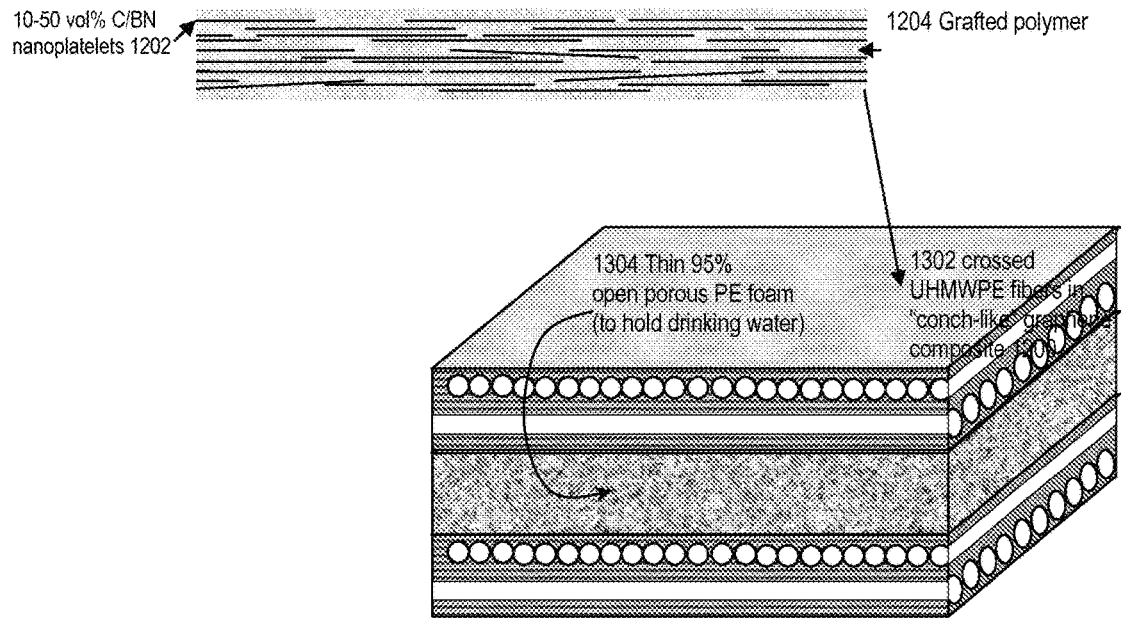
FIG. 13 is a schematic cross-sectional view of a layered composite armor structure including conchlike composite layers of grafted graphene nanosheets, crossply ultrastrong fiber layers such as those of FIG. 1, and intermediate open cell, water-holding foam layers, for use in a multipurpose armor vest like that of FIG. 11.

Illustrated in FIGS. 11-13 is a multipurpose personal armor system 1100 which applies the inertness, hardness, high strength-to-weight ratios and high modulus of diamondlike carbon to permit equipment-weight-reduction together with multipurpose thermal protection and personnel hydration capability to replace unwieldy canteens[99]. The illustrated armor system 1100 has high impact "toughness" and lateral impact spreading capability, sharp "stab" protection and a high protection vs. weight ratio.

Carbon fibers are conventionally used in personnel and other armor. Conventional armor fibers of ultrahigh molecular weight polyethylene (UHMWPE) such as Spectra™ and Dynema™ fibers also have extremely high tensile strength, and even lower specific gravity (eg, less than 1 g/cm$^3$). Unlike strong polyaramids which degrade in the presence of sweat and other moisture, carbon fibers and UHMWPE fibers are impervious to water.

Armor "cloth" such as carbon fiber and UHMWPE cloth can conventionally be made with or without weaving. For example, layers of unidirectional UHMWPE fibers are typically bonded together with ~20% by weight of a thermoplastic rubber (eg, Kraton™ styrene-isoprene-styrene triblock copolymer) rubber[100], which adds weight but little kinetic mechanical protection, other than sticking the unidirectional fibers together. Two fiber sheets are typically overlapped at 90° to provide two-dimensional strength. Multiple layers of the 90° crossed UHMWPE sheets [eg, see FIG. 13] are conventionally stacked into "ballistic panels" held in a garment fabric vest cover like that of FIG. 11. The vest cover itself provides little or no ballistic resistance, but hard (heavy) ceramic plates can typically be inserted in the vest for increased protection. Individual UHMWPE fiber layers are still relatively weak against hypervelocity projectiles and pointed or sharp projectiles or knives which can split and break the individual plastic fibers, which are relatively "soft" despite their ultrahigh tensile strength. Shear-thickening fluids, typically nano-sized $SiO_2$ or clay particles in a fluid ethylene oxide oligomer, have recently been tested to provide some lateral impact-spreading for fiber-based armor layers[101], but are not an optimized weight-efficient impact-resisting material.

Composites of hard strong platelets in a "tough" matrix can be dynamically very strong, by transmitting impact force laterally throughout the composite volume before shear fracture. Order-of-magnitude increases in toughness can be obtained by mimicking the "nano-brick-and-mortar" structure of inorganic nanoplatelets found in the nacreous layer of tough mollusk shell matrices[102]. Similarly, the Chinese report ballistic impact improvement of unidirectional ultra high molecular weight polyethylene (UHMWPE) fiber plates by adding relatively weak calcium carbonate conch shell particles in the matrix[103].

The strongest, thinnest and stiffest laminar "nanoplates" known are hexagonal graphene and hexagonal Boron Nitride (h-BN) nanoplates, which are nominally only one atom thick, with a wide range of manufacturable widths. Graphene sheets of sp2-bonded hexagonal carbon atoms have extraordinary electronic and mechanical properties[104], including extreme stiffness, strength and flexibility, together with high thermal and electrical conductivity[105]. h-BN nanosheets are transparent insulators, with profound chemical and thermal stability which are equally thermally conductive and mechanically robust as their Graphene counterparts[106]. Preparations of a wide variety of forms of graphene and h-BN are rapidly moving toward inexpensive commercial mass production[107]. The extreme strength, modulus, and width-to-thickness ratios (eg, >1000:1 for a typical submicron long-wide nanosheet) of the graphene nanosheets can provide extremely high lateral spreading of impact force, if properly designed and applied.

As shown in FIG. 12, the illustrated embodiment 1200 utilizes graphene and/or h-BN nanosheets at high levels in a "tough" biomimetic nacreous "brick and mortar"-like composite to protect and spread impact at each UHMWPE or other fiber layer. As shown in FIG. 12, polymers 1204 can easily be grown from, or otherwise covalently (strongly) bonded to the edges and surfaces of graphene and/or Boron Nitride nanoplatelets 1202[108]. Graftable polymers 1204 include polyethylene, polyethylene glycol, poly(oxetanes and oxiranes), polystyrene (including triblock and "biblock") copolymer thermoplastic rubbers such as Kraton™ rubber), which are not degraded by water. Such grafted polymers can be crosslinked, if appropriately designed, upon assembly with the UHMWPE fiber layers, if desired. Graphene is electrically conducting, so its inclusion in flexible armor provides EM protection for personnel. Boron nitride is optically transparent, so can be used in transparent armor for faceplates in submicron particle sizes in a matrix with the refractive index of h-BN.

The grafting of suitable polymers 1204 to the edges and surface of graphene and/or h-BN nanoplatelets 1202 provides strong physical capacity for transfer of impact from the nanoplatelet to the polymer matrix and adjacent nanoplatelets under dynamic shock-loading. The number of covalent grafting sites and the molecular weight of the polymers is preferably designed so that at least 20, and preferably at least 50 volume percent of the composite matrix is graphene and/or h-BN nanoplatelets. The polymer grafting is preferably primarily grafted to or from the edges of the nanoplatelets, with relatively low numbers of grafting sites to achieve high nanoplate loadings which maximize lateral spreading of high-speed projectile impact.

As shown in FIG. 13, polymer-grafted, ultrastrong nanoplatelets may be oriented into composite sheets for applying to unify carbon and/or UHMWPE composite fiber layers 1302, by compression, rolling, tensile-drawing, extrusion, and/or electrophoretic deposition. Graphene nanosheets are extremely strong and stiff in the in-plane 2-D directions (~1,060 GPa). These ultrastiff, ultrastrong graphene platelets have a very large length to thickness ratio ideal for bio-inspired nacre-like strength and toughness assembly. Thin, oriented composites of the wide-thin nanoplatelets with large multiple overlap are designed to be similar to the nanostructure found in nacre (mollusk shell), in which >90% of brittle calcium carbonate platelets in soft biological macromolecules, produces an extraordinary combination of mechanical strength, toughness, and stiffness[109]. The grafting of suitable polymers (eg, triblock elastomers) to the ends and surface of the nanoplatelet facilitates nano- "bottom-up" assembly at precise separation without platelet agglomeration, to produce strong physical capacity for transfer of impact from the nanoplatelet to the polymer matrix, adjacent nanoplatelets, and more UHMWPE fibers in the armor layers. The extreme stiffness of the nanoplatelets in their 2-D layer plane facilitates high lateral transfer of shock energy from high speed projectile impact.

As illustrated in FIG. 13 the polymer-grafted, ultrastrong nanoplatelets are oriented into composite sheets 1302 for applying to and unifying layers of carbon and/or UHMWPE fibers. 2-D Orientation of the nanoplatelets, and application to the UHMWPE fibers, can be accomplished by compression, rolling, tensile-drawing, extrusion, and/or electrophoretic deposition at temperatures up to about 100° C. (higher for carbon fiber assembly). Very thin organopolymeric interlayers can be used to facilitate bonding. The resulting composite still maintains some flexibility. The high concentration of wide-thin nanoplatelets with the highest-possible elastic modulus provides large multiple overlap and dynamic stiffness for lateral transmission of dynamic shock and kinetic energy, which is critical for personal armor. Lateral transmission of impact energy permits more UHMWPE fibers of inner layers to participate in stopping an incoming projectile momentum and distributing shock energy, rather than isolating the impact on a few fibers.

Ultra-tough graphene composites like those of FIGS. 12-13 may be used instead of conventional thermoplastic rubber to join and unify crossed UHMWPE and/or carbon fiber layers like those of FIG. 10. The high-nanoplatelet-content layers themselves can be dynamically extremely strong in 2-dimensions upon impact. Their dynamic toughness and flexural modulus (stiffness) is extremely high for impact-spreading under shockwave high-velocity impact conditions. Graphene and h-BN are much stronger and much lighter in 2-dimensions than $WS_2$ nanotubes[110] conventionally proposed for personnel armor. The 2-D nanoplatelets, particularly in the case of sharp, hard kinetic impact, spread the impact and shock over more inner fibers. And because they are ultrastrong, they provide additional resistance themselves, which is not inherently provided by a rubbery polymer which typically unifies UHMWPE fiber layers in conventional armor vests.

As indicated, the nanoplatelet-UHMWPE and/or carbon fiber layers of the embodiment of FIGS. 12-13 are substantially impervious to, and chemically unaffected by water. They may be stacked and assembled in a hermetically-sealed flexible vest structure as shown in FIG. 11 in a manner similar to conventional vest armor manufacture. Very lightweight highly porous reticulated (eg, polyethylene having at least 80 volume percent open porosity) foam 1304 (FIG. 13) may be placed between the crossed UHMWPE fiber layers, to permit water entry, retention, and drainage into and from the hermetically sealed vest covering. As shown in FIG. 11, the multiple layers with intermediate reticulated open PE foam may be assembled in a waterproof casing 1102 with an upper collar "drinking spout" 1104 and a lower outlet spout. Preferably at least the outside layers are multiple crossed DLC coated layers 1000 with overlapped DLC crosstie zones 1004 such as those illustrated in FIG. 10. Suitable "backplates" may be included in the armor vest, if desired, in accordance with conventional practice. An optional "snap on" detachable thermoelectric heating-cooling element 1106 and fan (which can provide interior ventilation for the wearer, as well as thermo-element cooling) may be coupled to the vest 1102.

In use, the wearer's drinking water may be contained in the vest interior. This water is fluid and incompressible, but has very useful dynamic resistance properties (eg, "belly flop" diving from a high height), particularly when confined within a reticulated open foam. A shock-wave from ultrahigh speed projectiles spreads with distance between the impacting projectile and the thickness of the protective armor vest. Individual plastic UHMWPE fibers in the protective layers are strong in tension but not in shear, so they "give" in the center points of kinetic projectile contact, particularly if they "smack up against" backplate resistance. In the illustrated design, upon hypervelocity impact, the incompressible fluid water held in the reticulated foam both resists the impact, and transfers kinetic energy laterally, while also facilitating fiber orientation so that the impacted fibers are not immediately crushed against the next inner layer, and so their high tensile strength is utilized more effectively at a less-tangent angle against the kinetic forward motion of the projectile. The extra distance, kinetic force spreading, and "give" at the point of impact produces greater dynamic tensile resistance for the impacted fibers of each layer. In addition, the layer-to-layer differences in impedance produce multiple shockwave reflections at each layer which dissipate the impact shockwave energy both in time, and in space—which is the goal of armor.

The illustrated armor vest 1100 with its water content can be cooled or frozen in a ship, base camp or in vehicle storage, and handed out to wearers before a mission or other use in a hot environment. Refrozen vests from vehicle refrigeration can quickly replace those which have "warmed up". Cold water can be quickly pumped into and through the vest to replace that consumed by the wearer. Because of the extreme inertness of the UHMWPE, foam and carbon components, the flexible vests can be flushed out with water, ultrasonically cleaned, and treated with sterilizing chemicals such as detergents and hydrogen peroxide, to ensure sanitation and cleanliness.

Flexible armor vests are thermally insulating, so wearers can readily become overheated with physical exertion. (Alternative cooling systems can include simple water-wicking for external evaporation-cooling, with or without a small circulation pump to circulate the water in the vest for thermal transfer). The drinking water can be circulated through the vest and a detachable thermoelectric element, to cool (in desert) or heat (in mountainous or cold regions) the wearer's vest.

The present disclosure is also directed to manufacture of diamond particles, powders and epitaxial growth surfaces. Diamond particles and powders such as required for industrial cutting and polishing, and for diamond compacts, are relatively expensive. In this regard, the present disclosure is also directed to production of particulate and crystalline diamond.

Polycrystalline diamond compacts are conventionally produced using diamond and optionally other hard refractory materials such as tungsten carbide (WC) alloy, under high pressure and high temperature (HPHT) conditions. Diamond compacts can effectively combine the high abrasion capability, hardness and strength of diamond, together with toughness and weldability of WC alloy for use as metal-cutting tools, drilling bits, drag bit oil and gas well drill cutters, wire-drawing forms, and other industrial applications[111]. Diamond compacts are also useful as high speed projectile tips against hard targets[112]. A hard diamond/DLC electrodeposited coating over a TiC, $TiB_2$, WC or electroconductive polycrystalline diamond compact provides a formidable ultrahigh speed projectile nose 400, as illustrated in FIG. 14.

As illustrated in FIG. 15, another application of inexpensive net-shape diamond/DLC and/or diamond/DLC coatings is for hypervelocity railgun projectile impact surfaces, such as railgun nosecones of railgun projectiles 1500.

Railgun projectiles launched at high velocity (eg, from 1 to 3 kilometers/second) in the lower atmosphere are subject to enormous atmospheric drag and surface heating. Diamond/DLC surfaced railgun projectiles in accordance with the present disclosure can have a simple alumina or other highly negative enthalpy ceramic coating to protect a DLC surface from atmospheric degradation. A disadvantage of an alumina layer is that it can be reduced by carbon at high temperature at the diamond interface. Alternatively, a thin refractory high-enthalpy carbide or boride surface (eg, TiB2 or AlMgB14) can also provide protection against diamond/DLC oxidation.

Electrodeposited diamond/DLC can have high thermal conductivity. By cooling its inner surface (or more energetic propellant liquid such as trimethylaluminum) directly or indirectly with a coolant such as liquid H2, liquid/solid $NH_3$, silane and/or methane[113] during or prior to launch, the diamond/DLC surface can be kept at a lower surface temperature, at which it is less- or non-reactive in air during hypersonic transit. Cold liquid $H_2$, Neon, $N_2$, $NH_3$, $CH_4$, etc can (with appropriate pumps and valving) be injected into a pre-cryogenically-cooled projectile reservoir of a railgun projectile immediately prior to launch. Such coolants can be made on-board by DD(X) ships from seawater, reducing munition storage requirements. A coolant reservoir can be in the nosecone, body, sabot and/or the C-armature of a railgun projectile, and can have its discharge initiated through the projectile tip by appropriate control valving and conduits, during and/or immediately prior to launch. Because railgun projectile transit in the atmosphere may take only several seconds, the cryogenic coolant discharge may similarly be timed to occur over a very short time period.

By evaporating and ejecting a light inert or reducing gas such as neon, $H_2$ or $NH_3$ at the projectile tip[114] 1502, the diamond/DLC or other projectile surface can be protected from rapid oxidation. The discharge of cryogenic reducing hydrogen gas from the projectile tip both cools the leading surface(s), and protects it from oxidation. In addition, the skin friction drag and consequent heating of the surface is substantially reduced[115] by the surface presence of a light gas such as $H_2$ or helium. This greatly increases both the range and velocity capabilities of the projectile. At a railgun muzzle discharge velocity of, for example, 1-2 kilometers/second, a projectile launched at a moderate upward angle (eg, 30°) from the horizon will pass through most of the dense oxidizing atmosphere within several seconds. Accordingly, preferably at least about 80% of the cryogenic gas stored in the projectile will be discharged from the projectile leading surface(s) within from about 0.5 to about 5 seconds after launch. The liquid $H_2$, helium and/or $NH_3$, etc. may be injected from a cold-magazine-projectile reservoir immediately prior to launch, into an appropriate cavity or reservoir in the nose-cone 1502, body 1506, sabot 1504 and/or armature 1508 of the railgun projectile 1500. An advantage for at least some initial armature storage of cryogenic liquid is reduced armature temperature, delayed plasma transition upon launch, and reduced rail erosion.

A railgun sabot is conventionally used to hold and conform the projectile within the railgun launch barrel. The sabot falls away after launch, and accordingly constitutes wasted mass and launch energy. A highly conductive armature is conventionally used to carry railgun current directly from the rails as long as possible during launch, prior to armature melt, arcing and/or plasma generation. The armature also falls away upon launch. As shown in FIG. 15, a round or "square" railgun sabot 1504 can be designed as a scramjet around a cylindrical projectile body 1506. Liquid $H_2$ and/or $NH_3$ coolant (and/or borane, trimethylaluminum, etc) are energetic propellants which can drive the scramjet formed by the sabot 1504 and the outer surface of the projectile body. The sabot 1504 (including a C-type armature) can be constructed of a physically strong energetic metal composite which reacts (oxidizes) rapidly with the extremely hot atmosphere generated at launch velocity at the scramjet interior[116], as part of a consumable very high energy scramjet casing. The cryogenic hydrogen or other energetic coolant stored in the railgun projectile "consumes" heat generated by railgun launch. The vaporized cryogenic gas is released at the tip and/or other leading surface(s) of the projectile 1500, where it envelops the leading surfaces of the projectile to protect against oxidation and reduce atmospheric friction drag, and is burned in the scramjet configuration formed by the sabot 1504 and the outer projectile body surface, to accelerate the projectile. Controlled release of lightweight gas under program and navigation control at different sides of the leading surface(s) can be used to control direction and orientation of the projectile, by selectively reducing drag along the surface with the most hydrogen or other low-mass gas. If the sabot 1504 is made of an energetic metal composite such as Aluminum/TiH2, Aluminum/Fe2O3 and/or Aluminum/PTFE composite alloy, its inner surface can be designed to very rapidly "burn" and ablate over a short time period (eg, 1-3 seconds) with extremely intense heat release in the scramjet interior to fuel the scramjet operation. The sabot 1504 is accordingly designed to be consumed in providing thrust to the projectile after railgun launch, rather than simply falling away immediately after launch. The sabot may be heated to or near ignition temperature by the electric current of the railgun launch.

Other specific applications for DLC-matrix composites also include diamond-matrix energy flywheels, generators and turbines. Magnetic components such as NdFeB particles can be codeposited and magnetically oriented by an external magnetic field in selected volumes of the matrix to form functional magnetically-polarized zones within an ultrastrong structure. Highly electrically conductive bromine-doped carbon fibers which maintain high tensile strength despite intercalation, can be used for substrate coils within a unitary DLC matrix.

Electrodeposited diamond/DLC which is doped to be electrically conductive is useful for waste water treatment because its high electrolysis "window" permits generation of highly oxidizing (and reducing) conditions and species. A thin (eg, 1-10 micron) conductive electrodeposited diamond/DLC coating produced in accordance with the present disclosure on a titanium screen is an effective final waste-water treatment filter. The effective surface area of the coating may be increased by codeposition of nanoscale and/or micron-scale particles which are subsequently removed. Such DLC/diamond electrodes may also be an insoluble anode material for electrochemical processes in molten salt systems, which are "safer" for molten salt processing of nuclear materials than electrodes which are consumed during use in such electrolytes.

Metallic, n-type semiconducting[117] and degenerately doped (effectively metallic) semiconducting substrates are preferred as substrates for cathodic electrodeposition of DLC in accordance with the present methods. Electrodeposition of doped p-type and n-type DLC is desirable for increasing the conductivity of the electrodeposited layer so that it does not become a self-limiting, prohibitive barrier to the current flow necessary for continued electrodeposition. Shallow p-type doping of diamond is readily accomplished via dopants such as boron. Shallow n-type doping is more difficult, but electron-donating elements such as nitrogen, sulfur and phosphorous can produce n-type doping which is effective at higher deposition voltages used in preferred DLC electrodeposition herein. Boron-substituted diamondoids such as boron-substituted adamantane are a preferred doping source for p-type doping of the electrodeposited DLC of which it becomes a part. The boron is already in a tetragonal-stabilized sp3 "crystalline" form which facilitates p-type hole band activation. Boraadamantane is used as a starting material for adamantane chemistry. Nitrogen-doped diamond has a deeper band which is less useful for room-temperature semiconductor doping of diamond, but is an n-type dopant which increases conductivity at the high voltage gradients which can be used for electrodeposition. Accordingly nitrogen-containing adamantane and other diamondoid compounds are useful carbon sources for doping of electrodeposited DLC herein. P-containing adamantanes and heterodiamondoids are similarly useful for electrodeposition of n-type DLC. Hexamethylenetetramine has a cage structure like that of adamantane, and is isoelectronic with adamantane. DABCO (1,4-diazabicyclo[2.2.2]octane may be used as a nitrogen-doping component of sp3-carbon-deposition electrolytes useful herein. Nitrogen+boron co-doping is useful for increasing the overall conductivity of electrodeposited DLC. A doping concentration of from $1 \times 10^{14}$ to about $1 \times 10^{22}$ dopant atoms per cubic centimeter is preferred in the electrodeposited DLC. Electrodeposition of doped DLC which is n-type and/or both p-, n-type is desirable for cathodic electrodeposition of DLC layers having a thickness greater than about 1 micron. Heteroadamantanes and other heterodiamondoids having p- and/or n-type dopant elements such as N, B, S, As and/or P in their sp3-carbon structure are especially useful as doping agents for doping electrodeposited DLC as described herein. In this regard, heterodiamondoid compound(s) may be included in the sp3-carbon depositing electrolyte in an amount which co-deposits the dopant element(s) in the desired range. This concentration will depend, at least in part, on the relative electrodeposition potentials and rates of the respective sp3-carbon depositing components of the electrolyte, which can be readily determined by testing respective electrolyte mixtures. However, typically the heterodiamondoid component will comprise from about 0.01 weight percent, to about 25 weight percent of the electrolyte mixture. As indicated herein, codeposition of doped semiconductive particles as doping agents can also increase the conductivity of electrodeposited DLC. Diamond particles of wide range of size, for example 3-10 nm, 100-500 nm, and 8-12 micron diameter diamond powder may be overcoated by CVD with a thin layer of electrically conductive boron-doped diamond or nitrogen-doped diamond to manufacture electrically conducting diamond powders of relatively high p- or n-type electrical conductivity, for example[118] ranging from about 0.1 Scm to about 2 S/cm. For codeposition, electrically conductive diamond and diamondlike particles having a largest dimension ("particle size") of less than 250 nm, for example less than 100 nm, are preferred for production of DLC electrodeposits. As also described herein, p-n junctions can be formed in electrodeposited DLC in accordance with the present disclosure by doping a first portion layer of the electrodeposited DLC with a first type (either p- or n-) doping, and subsequently electrodepositing DLC having the opposite type of doping (either n- or p-type) atop (adjacent) the first portion. An intermediate layer of relatively undoped DLC may separate the oppositely-doped layers. This may be carried out by electrodepositing the first portion comprising a doping electrolyte with a first type doping agent, and subsequently electrodepositing DLC using an electrolyte comprising an opposite-type doping agent. Anodic oxidation to selectively remove sp2 carbon may be carried out to increase the sp3-carbon DLC content at n-, p-interfaces.

Nucleation is an important aspect of DLC electrodeposition. Uniform and rapid sp3 carbon nucleation can facilitate uniform deposition of high-sp3 carbon DLC, preferably with high >5 GPa surface interface pressure from the deposition-surface-electrolyte near electric field. Moreover, uniform nucleation at the surface of an electroconductive electrodeposition substrate can facilitate transfer of at least partially crystalline order from the substrate to the electrodeposited carbon. While heteroepitaxial order is difficult to accomplish using high temperature vapor deposition processes[119], electrodeposition of DLC can be carried out in accordance with the present disclosure under conditions which enhance uniform nucleation and which may also preserve at least some of the substrate order in the sp3-carbon DLC electrodeposited thereon. Moreover, patterned, defined nucleation can provide patterned DLC structures which may preserve at least some heteroepitaxial order from the substrate on which the DLC is electrodeposited. In this regard, the present disclosure also is directed to methods of electrodeposition of DLC in which a thin substantially uniform sp3-carbon layer is adhered to the surface of a conductive substrate to form an electrodeposition surface for electrodeposition of diamondlike carbon. The layer is desirably an ordered (monolayer crystalline or semicrystalline) substantially monomolecular layer of an sp3 carbon material such as an activated fullerene, an aliphatic cage compound, an aliphatic amino sp3 structured compound, an adamantane and/or higher diamondoid, or a short (C1 to C6) aliphatic hydrocarbon. Suitable methods for self assembly of adamantanes, higher diamondoids, boranes, carboranes and other suitable cage molecules on conductive substrates may be utilized to provide an electrodeposition surface for enhanced nucleation and sp3 DLC carbon electrodeposition[120]. A wide variety of linking groups may be employed to attach an sp3-nucleating monomolecular layer on the substrate. Thiol, sulfide and phosphonate groups are preferred for attachment to coordinating metals such as gold, silver, copper and titamum[121]. Unsaturated alkyl linking groups are particularly preferred for attaching the sp3-nucleating groups to semiconducting substrates such as H-terminated silicon via hydrosilylation reaction.

There are wide ranges of available materials which can be bonded to substrate surfaces in at least partially crystalline order, such as mono- and dialkenes/alkynes, acetylenes, amines, adamantanes and higher diamondoids, haloalkylsilanes such as dichlorodimethylsilane, electrografting alkyls, Grignard reagents and organolithium compounds. Covalent bonding can be accomplished using a wide variety of reaction systems such as Lewis acid catalysts, thermal activation, electrografting, UV/VIS activation, and/or Grignard and organometallic reaction, for covalent bonding of alkyl and other sp3 carbon moieties to an electroconductive substrate surface[122]. Functionality of the surface-bonded organic can be selected from the wide range of materials, and patterned in a large variety of ways. Masking, etching, electrodeposition and printing permit 2D and 3D designs and structures.

Si—C bonds of the ordered monolayer are readily formed on hydrogen-terminated silicon surfaces by hydrosilylation. As an alternative to hydrosilylation, covalently attached layers can be formed on Si surfaces by other attachment methods and reaction such as those employing Grignard or alkyl-lithium reactants. Electrochemical attachment such as methylation using methyl iodide is also a useful procedure for applying a uniform monolayer of covalently bound sp3 carbon moieties. Microwave processing can increase the rate of the hydrosilylation reaction and surface coverage.

Silicon surfaces such as monocrystalline silicon wafer surfaces may be provided with a hydrogen or halide (eg, chloride) surface functionality for covalent attachment of carbo-nucleation agents by conventional methods such as hydrofluoric acid and/or ammonium fluoride treatment (for hydrogen termination for hydrosilylation reaction), or UV treatment in the presence of chlorine (for chloride termination for Grignard reaction). Hydrosilylation is a relatively simple and robust method for covalent attachment of uniform sp3 carbon monolayer coatings on silicon substrates.

An adamantine or higher diamondoid nucleation agent should best be derivatized to facilitate adherence to the electroconductive substrate. 1-allyladamantane, 3-allyl-1-vinyladamantane and 1,3-diallyladamantane are examples of adamantanes which may be covalently attached to silicon substrates by hydrosilylation reaction[123].

By providing an electrolyte having an effective pH (negative log of the hydrogen ion concentration) less than about 6.5, and preferably about 5 or less, abundant hydrogen ions can be attracted to the cathode to reduce sp2 carbon bonds of electrodeposited carbon and/or to ultimately be reduced at the cathode. Electric field-induced pressure at the cathode, preferably at least 4 GPa, can help stabilize sp3 carbon bonding of electrodeposited carbon or incipient carbon moieties, under high hydrogenation conditions facilitated by cathodized hydrogen ions. When combined with preferential anodic oxidation of sp2 carbon as described herein, a synergistic enhancement of cathodic sp3 carbon electrodeposition is provided.

For example, smooth p-type Si<100> substrates (10 mm×20 mm×0.3 mm) with a resistivity of about 7 ohm cm are treated in a conventional manner to have a hydrogen-terminated surface. A monolayer of methyl, ethyl or propyl groups is covalently attached to the silicon surface. With reference to FIG. 1, the silicon substrate with the covalent alkyl or alkene moieties is mounted as the cathode 110, and a graphitic plate of the same size is mounted as the counterelectrode at the anode 114 at a distance of approximately 1 centimeter from the cathode. Analytically pure methanol is used as the electrolyte 108. A DC potential of 1600 volts is continuously applied across the silicon substrate as cathode and graphite as anode, by the power supply 102 and controller 104 for 5 hours while the temperature of the methanol electrolyte is maintained at 50° C.[124.] Nitrogen gas is introduced both to purge oxygen and to assist system cooling. Upon termination of the 1600 Volt deposition power supply, the silicon substrate 110 has a substantially hydrogen-free compact and uniform DLC coating having sp2 and sp3 carbon bonding. Upon termination of the 1600 volt power supply, a pure aqueous mixture of 0.5 molar $HNO_3$ and 0.5 molar $H_2SO_4$ is added to the methanol electrolyte 108 so that the electrolyte is 0.05 molar in $HNO_3$ and 0.05 molar in $H_2SO_4$. The polarity of the electrodes is then reversed so that the DLC-coated silicon electrode becomes the anode, and the graphite counterelectrode becomes the cathode. Under anodic oxidizing conditions, sp2-bonded surface carbon is preferentially etched from the DLC layer, selectively leaving sp3-bonded carbon[125]. The methanol electrolyte containing $HNO_3$, $H_2SO_4$ and water is substantially more electroconductive than the pure methanol previously used for cathodic DLC electrodeposition, facilitating much lower voltage processing. The polarity of the DC power supply is reversed, so that the graphite electrode becomes the cathode, and the sp3 and sp2 carbon coated silicon electrode becomes the anode. A constant DC voltage of about 1.5 to 2 volts is applied across the now-anode 110 (carbon-coated silicon) and the now-cathode 114 (graphite sheet) by the power supply 102 and controller 104 for about 10 to 20 minutes or until from about 10 to about 25 weight percent of the previously-electrodeposited DLC is etched away, whichever occurs first[126]. The DLC coating on the silicon electrode is enriched in sp3 carbon content because of the selective removal of surface-accessible sp2 carbon. The polarity of the DC power supply is again reversed, and the methanol/nitric acid/sulfuric acid/$H_2O$ oxidation electrolyte is then drained from the electrodeposition cell 106. The cell 106 is then washed several times with pure methanol, and then refilled with pure methanol. A constant DC voltage of 1600 Volts is applied across the silicon cathode 110 and the graphite anode 114 by power supply 102 and program controller 104 for 3 hours at a constant temperature of 50° C. to produce a compact high-sp3 DLC film on the silicon substrate. Because of the relatively low electroconductivity of the sp3 electrodeposit, irregularities of thickness which may result from etching of sp2 clusters can be smoothed by increased electrodeposition into shallower areas of the DLC coating which are closer to the silicon sheet, and therefore more conducive for carbon electrodeposition. The finished DLC-coated silicon sheet has high sp3-bonded carbon. The silicon can be etched away if desired, to produce a thin, high-sp3 DLC sheet with little or substantially no hydrogen content which is useful as a heat-conductor. If the methanol electrolyte comprises an n-doping component such as N-hetero adamantane, DABCO $9N_2(C_2H_4)_3$] or quinuclidine or the like, the deposited DLC will have increased conductivity, permitting reduction of the applied voltage. An p-, n-heterojunction will be formed on a p-type substrate. If this process is carried out with a suspension of doped electrically conductive diamond particles, deposition of sp3 carbon and electroconductivity of the deposit are enhanced. The alternating cathodic electrodeposition, followed by anodic selective removal of sp2 carbon may be repeated to build up the deposit thickness. P-, N-junctions may be provided by use of respective p-, n-, dopants and/or doped diamond particles in the electrolyte used to deposit successive layers of DLC. The above electrodeposition procedure may be repeated using an n-type silicon cathode substrate having a self-assembled covalently attached adamantane or higher diamondoid monolayer on the silicon electrodeposition surface.

Similarly, a single crystalline <100> mirror-like silicon wafer of 5 mm×20 mm×0.5 mm dimension having a resistivity of (0.5-3) Ω cm may be mounted as the substrate cathode[127] in a simple electrodeposition system 100 like that of FIG. 1. The native oxide layer is removed from the silicon substrate and the silicon surface atoms are hydrogen-terminated prior to deposition by dipping them in HF 20% for 5 min and subsequent cleaning by deionized water and ethanol[128]. A high purity graphite plate is used as an anode placed at 4-6 mm from the cathode. The DC power supply is used to provide a constant voltage of 1200V across the silicon cathode and the graphite anode. A mixture of pure ethanol and pure methanol at a volume ratio of 80% ethanol and 20% methanol is used as the electrolyte liquid 108. The deposition is conducted under atmospheric pressure and the bath temperature is maintained at 60° C. After deposition of about 1 micron of sp3 and sp2 carbon, the ethanol/methanol electrolyte is replaced with a 0.1 M KOH aqueous solution[129]. The sp3/sp2 carbon-coated silicon cathode is then anodically polarized at about +2.6 V vs. Ag/AgCl reference electrode 120 in 0.1 M KOH solution for approximately 5-10 minutes to selectively oxidize and remove sp2 carbon content at the surface. The silicon electrode is then washed in ethanol, the KOH solution is replaced by mixture of pure ethanol and pure methanol at a volume ratio of 80% ethanol and 20% methanol as the electrolyte liquid 108, and the cathodic electrodeposition is again conducted at a voltage of 1200V across the silicon cathode and the graphite anode under atmospheric pressure and bath temperature of 60° C. The resulting DLC electrodeposit has enhanced sp3 carbon content. UV light from a UV LED may be applied to the cathode deposition surface during cathodic carbon electrodeposition in these examples to increase electrical conductivity. In addition, because the conduction band edge of sp3 diamond is located at a very negative potential, photo-excited electrons from high bandgap diamond can have very high reducing capability[130] which facilitates sp3 electrodeposition. The example may be repeated using methanol electrolyte in the cathodic carbon deposition steps[131]

In another example of surface preparation and anodic oxidative sp2 removal, diamond-like carbon films (DLC) are synthesized by electrolysis on a hydrosilylated silicon substrate using $CH_3CN$ (0.8% v/v) and deionized water as electrolyte[132]. The electrodeposition substrate may be n-type phosphorous-doped <100> single crystal silicon wafer (resistivity ~1-5 Ωcm) of 10 mm×8 mm×0.3 mm dimensions, conductively attached to a copper cathode 110. A graphite sheet of similar dimension is used as the anode 114 spaced ~8 mm from the silicon cathode. A continuous voltage of 16 volts is applied across the electrodes 110, 114 by power supply 102 and controller 104 for 4 hours. Electrolysis is carried out at atmospheric pressure at an electrolyte bath temperature of 300° K. A pH meter is used to maintain a pH of 4 in the electrolyte bath 108 (eg, with an oxidizing acid such as nitric or perchloric acid which can serve as an anodic oxidizer for selective sp2 carbon removal). After 4 hour deposition, the electrolyte may be changed to an oxidizing electrolyte such as aqueous sulfuric acid with acetic acid, the polarity of the electrodes switched, and from about 15 to about 35 percent of the deposited DLC layer is anodically oxidatively removed at an electrode potential of about 2 volts, to selectively remove sp2 carbon and relieve tensile stress. The DLC cathodic electrodeposition procedure is then repeated with the acetonitrile electrolyte to electrodeposit additional DLC on the sp3-enriched surface.

The thermal conductivity of copper, such as copper traces and electrodes or heat sinks of integrated circuits and PC boards, can be improved[133] if an sp3 tetragonally-bonded diamond film with a thickness of at least one micron and more preferably at least 3 microns is electrodeposited on a copper surface to form heat sink systems. Copper ($a_{Cu}$=0.3615 nm) and nickel have respective crystal lattice spacing similar to that of diamond, ($a_{diamond}$=0.3567 nm) High-temperature heteroepitaxial vapor deposition of sp3 carbon on copper is difficult because of long nucleation induction times, graphite formation, and mismatch of the small thermal expansion coefficient of diamond with the larger thermal expansion coefficient of copper and nickel. In this regard, a monolayer of functionalized or unfunctionalized buckminsterfullerene $C_{60}$ (or other $C_{20}$, $C_{70}$, $C_{76}$, $C_{80}$, and/or $C_{90}$ fullerene) is vapor-deposited on a cleaned, pristine Cu<111> sheet[134], which is subsequently treated with UV light[135] to activate and facilitate sp2 to sp3 hybridization of the fullerene coating. A 10 mm×10 mm×2 mm sheet of the surface-treated <111> copper is electrically connected as the cathodic electrode 110 of an electrodeposition system 100 like that of FIG. 1. Pure methanol is used as the electrolyte. A platinum sheet of similar size is used as the counter electrode 114 placed 7 mm from and parallel to the copper anode. A constant DC voltage of 1400 volts is applied across the anode 110 and the cathode 114 by power supply 102 and program controller 104 for 5 hours at a constant temperature of 50° C. to produce a compact DLC film[136] on the copper substrate. After 5 hours, a pure aqueous mixture of 0.5 molar $HNO_3$ and 0.5 molar $H_2SO_4$ is added to the methanol electrolyte 108 so that the electrolyte is 0.1 molar in $HNO_3$ and 0.1 molar in $H_2SO_4$. The polarity of the electrodes 110, 114 is then reversed so that the DLC-coated copper electrode 114 becomes the anode, and the platinum counterelectrode becomes the cathode. Under anodic oxidizing conditions, sp2-bonded surface carbon is preferentially etched from the DLC layer, selectively leaving sp3-bonded carbon. The methanol electrolyte containing $HNO_3$, $H_2SO_4$ and water is substantially more electroconductive than the pure methanol previously used for cathodic DLC electrodeposition. A constant DC voltage of about 2.5-3 volts is applied across the now-anode 110 (DLC-coated Cu<111>) and the now-cathode 114 (platinum sheet) by the power supply 102 and controller 104 for about 10 minutes or until about 10 weight percent of the previously-electrodeposited DLC is etched away, whichever occurs first. The DLC coating on the copper electrode is enriched in sp3 carbon because of the selective removal of surface-accessible sp2 carbon. The methanol/nitric acid/sulfuric acid/$H_2O$ oxidation electrolyte is then drained from the electrodeposition cell 106. The cell 106 is then washed several times with pure methanol, and then refilled with pure methanol. The polarity of the DC power supply is reversed, and a constant DC voltage of 1400 Volts is applied across the sp3-enriched DLC-coated copper cathode 110 and the platinum anode 114 by power supply 102 and program controller 104 for 4 hours at a constant temperature of 50° C. to produce a compact high-sp3 DLC film on the copper substrate. Because of the low electroconductivity of the sp3 deposit, irregularities of thickness which may result from etching of sp2 clusters or sp2 content ad crystal boundary zones can be smoothed by electrodeposition into shallower areas of the DLC coating which are closer to the copper sheet, and therefore more conducive for carbon electrodeposition current. The finished DLC-coated copper sheet has high degree of sp3-bonded carbon and is useful as a heat-conductor. The above electrodeposition procedure may be repeated using a <111> copper sheet on which has been bonded an organosulfide or organothiol such as an alkylthiol or alkyl sulfide. For example, a self-assembled monolayer of n-hexane or n-octane thiol or dithiol is readily applied and bonded to copper[137], has short enough alkyl carbon chains to permit current flow, and retains some of the crystalline order of the underlying <111> copper which has a similar lattice cell structure to that of sp3 diamond. Alternatively, a crystalline or partially crystalline monolayer of an attached adamantane or higher diamondoid provides a surface with high electron emissivity.

As an additional example, a single-crystal, extremely smooth copper substrate (eg <10 Angstrom rms roughness, MTI Corporation, Richmond, Calif.) may be used[138] for providing an ordered diamondoid nucleation surface for electrodeposition. The substrate may be uncoated, or coated with gold or other metal (eg, 5 nm of titanium which may be followed by 100 nm of gold deposited by magnetron sputtering). A layer of substantially pure diamondoid functionalized with attachment or linking groups, such as [121] tetramantane-6-thiol is attached to the electroconductive substrate by conventional self-assembly methods[139] carried out at appropriate temperature from diamondoid solution or vapor. The initial attachment, such as by slightly labile sulfur bonding of the thiol groups to the metal substrate surface, may be relatively rapid. The diamondoid layer is also desirably subjected to a conventional surface crystallization process, in which the surface-attached diamondoid moieties form two-dimensional crystals, which is a slower process which is assisted by the labile bonding of the sulfur bonding permitting realignment and slight movement of the diamondoid moieties to increase packing and crystal order. The surface crystallization process can be carried out or enhanced at subambient temperatures favoring crystallization. The conductive copper substrate having an area of 1 cm×1 cm with such an ordered diamondoid coating is electrically connected and positioned as the cathode in an electrodeposition apparatus such as illustrated in FIG. 1, in an sp3-depositing electrolyte. A parallel 1.5 cm×1.5 cm platinum anode is positioned 1 cm away from the copper cathode. The electrolyte may comprise from about 10 to about 100 percent by weight of an sp3-depositing component such as methyl alcohol, acetonitrile, acetic acid, formic acid, ethanol, DMF, DMSO and mixtures thereof. Dissociative Electron-Transfer reductions of sp3 carbon organic compounds (R-X where R is an sp3 carbon-electrodepositing moiety, and X is an electronegative moiety) useful herein can electrogenerate alkyl radicals and/or or carbanions (R-) for electrodeposit on the growing carbon cathode[140]. Halogenated adamantane and higher diamondoids can be useful for electrogeneration of multicarbon sp3 radicals and carbanions at the cathode, as well as facilitating hydrogen abstraction[141].

The electrolyte may further comprise 0-10 weight percent water, 0-10 weight percent diamondoid (preferably heterodiamondoids as dopant), and 0-10 weight percent of an oxidizing agent such as nitric acid, sulfuric acid and/or perchloric acid (including salts thereof), hydrogen peroxide and/or C1-C4 organic peroxide. A cathodic DC deposition current in the range of from about 40 to about 60 mA/cm$^2$ is applied through the 1 cm×1 cm deposition surface for a sufficient time to deposit a DLC layer on the diamondoid layer having a thickness of at least about 0.25 micron, and more preferably at least about 0.5 micron. The electrodeposited DLC layer has enhanced sp3 carbon content over an otherwise identical deposition carried out on a plain copper substrate without the diamondoid electrodeposition layer. The electrodeposited coating may be subjected to anodic oxidation to remove from about 10 to about 25 weight percent of the electrodeposited DLC to preferentially remove sp2 carbon, and then further processed to cathodically electrodeposit DLC. The cycle may preferably be repeated at least 3 times.

Carbon paper comprising matted nonwoven or woven carbon fibers may conventionally be coated by microwave plasma-assisted chemical vapor deposition with boron-doped nanocrystalline diamond to improve its chemical resistance and microstructural stability for fuel cell electrode use[142]. However, such processing is prohibitively expensive for mass fuel cell manufacture. In accordance with the present disclosure, such matted carbon fiber papers may be used as cathodes for DLC electrodeposition. The sp2 carbon paper may have sp3 and sp2 carbon electrodeposited thereon (both sides, which covers the fibers), followed by anodic selective removal of sp2 carbon. The matted fiber should best initially be coated with at least 0.5 to 1.0 micron of electrodeposited DLC, before the first anodic sp2 carbon removal step, to prevent anodic removal of the underlying sp2 carbon fibers. In this regard, the initial anodic sp2 carbon removal step should best remove only 5-20 percent of the previously electrodeposited DLC, which provides a buffer layer for subsequent sp3 carbon layer(s). Subsequent cycles of cathodic DLC electrodeposition and anodic sp2 carbon removal may anodically remove higher amounts of carbon, such as 10 to about 40 percent of the carbon cathodically electrodeposited in the preceding cycle.

There are wide ranges of available materials which can be used as sp3 carbon electrodeposition sources or electrobonded as monomolecular, ordered layers to cathodic substrate surfaces, such as mono- and dialkenes/alkynes, acetylenes, amines, adamantanes and higher diamondoids[143], haloalkylsilanes such as dichlorodimethylsilane, electrografting alkyls, Grignard reagents and organolithium compounds. Covalent bonding can be accomplished using a wide variety of reaction systems such as Lewis acid catalysts, thermal activation, electrografting, UV/VIS activation, and/or Grignard and organometallic reaction, for covalent bonding of alkyl and other sp3 carbon moieties to an electroconductive substrate surface[144]. Functionality of the surface-bonded organic can be selected from the wide range of materials, and patterned in a large variety of ways. Masking, etching, electrodeposition and printing permit 2D and 3D designs and structures. Si—C bonds are readily formed on hydrogen-terminated silicon surfaces by hydrosilylation. As an alternative to hydrosilylation, covalently attached layers can be formed on Si surfaces using Grignard or alkyl-lithium reactants. Electrochemical attachment such as methylation using methyl iodide is also a useful procedure for applying a uniform monolayer of covalently bound sp3 carbon moieties. Silicon surfaces may be provided with the hydrogen or chloride surface functionality for covalent attachment of carbo-nucleation agents by conventional methods such as hydrofluoric acid and/or ammonium fluoride treatment (for hydrogen termination for hydrosilylation reaction), or UV treatment in the presence of chlorine (for chloride termination for Grignard reaction). Hydrosilylation is a relatively simple and robust method for covalent attachment of uniform sp3 carbon monolayer coatings on silicon substrates. For example, diamondoid thiols selfassembled on gold and silver metal surfaces are highly ordered[145]. 1,3-Diaminoadamantane and 3,3'-diamino-1,1'-diadamantane[146] and their salts are useful carbon sources having a covalent electron-donating nitrogen component in a diamondlike carbon structure. The cyclohexane rings form rigid, relatively strain-free sp3 chair conformations[147] to restrict formation of double bonds and to limit back-side (electrophilic or nucleophilic) attack.

While various aspects of the present invention have been described with respect to particular embodiments of apparatus, methods, products and devices, it will be appreciated that modifications, applications, adaptations and improvements may be made based on the present disclosure, and are intended to be within the scope of the accompanying claims.

ENDNOTES

Each citation or reference in this application is hereby incorporated in its entirety herein by reference.

[1]Zhang, L. et al (2009), "A Survey of the Machining Characteristics and Mechanical Polishing Technology of CVD Diamond Films", Advanced Materials Research Vols. 69-70, pp. 192-197

May, W. P., (2000), "Diamond thin films: A 21$^{st}$ Century Material" Phil. Trans. Mathematical, Physical and engineering Sciences, Vol. 358, pp 0.473-495

[2]Cai, K., D. Guo, et al. (2000), "Evaluation of diamond-like carbon films deposited on conductive glass from organic liquids using pulsed current." Surface and Coatings Technology 130(2): 266-273;

Cai, K., D. Guo, et al. (2000). "Electrodeposition of diamond-like amorphous carbon films on aluminum from acetonitrile." Applied Physics A: Materials Science and Processing 71(2): 227-228:

Cao, C., H. Zhu, et al. (2000). "Electrodeposition diamond-like carbon films from organic liquids." Thin Solid Films 368(2): 203-207

Fu, Q., J.-T. Jiu, et al. (2000). "Electrodeposition of carbon films from various organic liquids." Surface and Coatings Technology 124(2): 196-200:

Guo, D., K. Cai, et al. (2002). "Evaluation of carbon films electrodeposited on different substrates from different organic solvents." Applied Physics A: Materials Science and Processing 74(1): 69-72: Diamond-like carbon (DLC) films have been deposited on Si, aluminum and ITO:

Guo, D., K. Cai, et al. (2001). "Evaluation of diamond-like carbon films electrodeposited on an Al substrate from the liquid phase with pulse-modulated power." Carbon 39(9): 1395-1398;

Guo, D., K. Cai, et al. (2001). "Electrodeposition of diamond-like carbon films from organic solvents and effects of annealing on the film structure." Wuli Xuebao/Acta Physica Sinica 50(12): 2416-2417;

He, W., R. Yu, et al. (2005). "Electrodeposition mechanism of hydrogen-free diamond-like carbon films from organic electrolytes." Carbon 43(9): 2000-2006;

Huang, L., H. Jiang, et al. (2006). "Synthesis of copper nanoparticles containing diamond-like carbon films by electrochemical method." Electrochemistry Communications 8(2): 262-266;

Jiang, H.-Q., L.-N. Huang, et al. (2004). "Composition and structure of diamond-like carbon films prepared by using the liquid phase electrodeposition technique." Gongneng Cailiao/Journal of Functional Materials 35(5): 560-562;

Jiu, J. T., L. P. Li, et al. (2001). "Deposition of diamond like carbon films by using liquid phase electrodeposition technique and its electron emission properties." Journal of Materials Science 36(24): 5801-5804;

Jiu, J.-T., K. Cai, et al. (1999). "Liquid deposition of hydrogenated carbon films in N,N-dimethyl formamide solution." Materials Letters 41(2): 63-66;

Jiu, J.-T., H. Wang, et al. (1999). "Effect of annealing temperature on the structure of diamond-like carbon films by electrodeposition technique." Journal of Materials Science 34(21): 5205-5209;

Li, C., C.-B. Cao, et al. (2003). "Electrodeposition of carbon nitride films from solutions of dicyandiamide and DMF." Gongneng Cailiao/Journal of Functional Materials 34(4): 400-402;

Li, C., C.-B. Cao, et al. (2004). "Electrodeposition of carbon nitride thin films having high nitrogen content on indium tin oxide coated glass." Beijing Ligong Daxue Xuebao/Transaction of Beijing Institute of Technology 24(1): 86-89;

Shen, F., H. Wang, et al. (2004). "Preparation of diamond-like carbon films on the surface of Ti alloy by electrodeposition." Journal of Materials Science and Technology 20(3): 367-368;

Shen, F.-L., D.-J. Wen, et al. (2005). "Influence of deposition condition on diamond-like carbon films by liquid deposition on the surface of Ti alloy." Gongneng Cailiao/Journal of Functional Materials 36(8): 1278-1281

Wang, H., M.-R. Shen, et al. (1997). "Deposition of unhydrogenated diamond-like amorphous carbon films by electrolysis of organic solutions." Thin Solid Films 293(1-2): 87-90;

Wang, H., M.-R. Shen, et al. (1997). "Pulsed electrodeposition of diamond-like carbon films." Journal of Materials Research 12(11): 3102-3105;

Yan, X., T. Xu, et al. (2005). "Field-emission properties of diamond-like-carbon and nitrogen-doped diamond-like-carbon films prepared by electrochemical deposition." Applied Physics A: Materials Science and Processing 81(1): 41-46;

Yan, X., T. Xu, et al. (2004). "Study of structure, tribological properties and growth mechanism of DLC and nitrogen-doped DLC films deposited by electrochemical technique." Applied Surface Science 236(1-4): 328-335;

Yan, X., T. Xu, et al. (2004). "Preparation and characterization of electrochemically deposited carbon nitride films on silicon substrate." Journal of Physics D: Applied Physics 37(6): 907-913;

Yan, X. B., T. Xu, et al. (2004). "Characterization of hydrogenated diamond-like carbon films electrochemically deposited on a silicon substrate." Journal of Physics D: Applied Physics 37(17): 2416-2424; Yan, X.-B., T. Xu, et al. (2003). "Tribological properties of diamond-like carbon films by electrochemical deposition." Mocaxue Xuebao/Tribology 23(3): 169-173;

Zhang, J.-T., C.-B. Cao, et al. (2003). "Optical and electrical properties of carbon nitride films deposited by cathode electrodeposition" Journal of Materials Science 38(12): 2559-2562;

Zhang, J.-T., C.-B. Cao, et al. (2003). "The preparation and characterization of CNx film with high nitrogen content by cathode electrodeposition." Applied Surface Science 214(1-4): 364-369;

Zhu, H.-S., J.-T. Jiu, et al. (2003). "Aroused problems in the deposition of diamond-like carbon films by using the liquid phase electrodeposition technique." Journal of Materials Science 38(1): 141-145.

[3]Aublanc, P., V. et al. (2001). "Diamond synthesis by electrolysis of acetates." Diamond and Related Materials, 10(3-7): 942-6;

Chang, K.-P., W.-J. Cheng, et al. (2003). "Selective deposition of diamond films on Si(100) substrates." Rengong Jingti Xuebao/Journal of Synthetic Crystals 32(6): 610.

He, S. and Y. Meng (2009). "Synthesis of carbon films containing diamond particles by electrolysis of methanol." Thin Solid Films 517(19): 5625-5629.

He, W., R. Yu, et al. (2005). "Electrodeposition mechanism of hydrogen-free diamond-like carbon films from organic electrolytes." Carbon 43(9): 2000-2006.

Jiu, J.-T., K. Cai, et al. (1999). "Liquid deposition of hydrogenated carbon films in N,N-dimethyl formamide solution." Materials Letters 41(2): 63-66.

Kulak, A. I., A. I. Kokorin, et al. (2003). "Electrodeposition of nanostructured diamond-like films by oxidation of lithium acetylide." Electrochemistry Communications 5(4): 301-305.

Liu, A., E. Liu, et al. (2010). Electrochemical behavior of gold nanoparticles modified nitrogen incorporated diamond-like carbon electrode and its application in glucose sensing, Hongkong, China, IEEE Computer Society.

Zhu, H.-S., J.-T. Jiu, et al. (2003). "Aroused problems in the deposition of diamond-like carbon films by using the liquid phase electrodeposition technique." Journal of Materials Science 38(1): 141-145.

Cai, K., et al. (2000). "Electrodeposition of diamond-like amorphous carbon films on aluminum from acetonitrile." *Applied Physics A: Materials Science and Processing* 71: 227-228

[4]Gupta, S., M. P. Chowdhury, et al. (2004). "Field emission characteristics of diamond-like carbon films synthesized by electrodeposition technique." *Applied Surface Science* 236(1-4): 426-434;

Gupta, S., M. Pal Chowdhury, et al. (2004). "Synthesis of DLC films by electrodeposition technique using formic acid as electrolyte." *Diamond and Related Materials* 13(9): 1680-1689;

Gupta, S., R. K. Roy, et al. (2003). "Low voltage electrodeposition of diamond-like carbon films." *Materials Letters* 57(22-23): 3479-3485.

He, W. et al. (2005). "Electrodeposition mechanism of hydrogen-free diamond-like carbon films from organic electrolytes." *Carbon* 43(9): 2000-2006;

Roy, M., et al. (2007). "Deposition of hydrogenated amorphous carbon films with enhanced sp3-C bonding on nanocrystalline palladium interlayer." *Diamond and Related Materials* 16(3): 517-525;

Roy, R. et al. (2002). "Synthesis of diamond-like carbon film by novel electrodeposition route." *Thin Solid Films* 422 (1-2): 92-7

[5] Because conventionally electrodeposited DLC can reach 19 GPa hardness (~6 GPa tensile strength), even a slight improvement in sp3 content can produce a spectacularly hard and strong material.

[6] Eg, see U.S. Pat. Nos. 7,951,455, 7,950,477 and references cited therein, and K. Suzuki et al, (2009), "Development of New PCD Made Up of Boron Doped Diamond Particles and its Machinability by EDM", Advanced Materials Research Vols. 76-78, pp 684-689

[7] M. Roy, "Electro-deposition of adherent films of H2-free quality diamond-like carbon materials on SS-304 substrates using nanocrystalline SnO2 interlayer", Diamond & Related Materials 14 (2005) 60-67

[8] Kedong Ma et al, "Synthesis and characterization of nickel-doped diamond-like carbon film electrodeposited at a low voltage", Surface & Coatings Technology 204 (2010) 2546--2550

[9] Stefan Woelki et al, (2000), "A modifed Poisson-Boltzmann equation II. Models and solutions Chemical Physics 261 (2000) 421-438

[10] Alexander Kraft, (2007), "Doped Diamond: A Compact Review on a New, Versatile Electrode Material" Int. J. Electrochem. Sci., 2 (2007) 355-385

[11] A mechanism involving the anodic discharge of methanol to methoxyl radical on boron-doped diamond electrodes has been proposed to account for Kolbe reaction differences between sp3 and sp2 carbon electrodes, see eg, Alain Fankhauser et al, "Investigation of the anodic acetoxylation of p-methylanisole (p-MA) in glacial acetic acid medium using graphite (sp2) and BDD (sp3) electrodes", Journal of Electroanalytical Chemistry 614 (2008) 107-112; in this regard, anodic formation of methyl radicals and ions can potentially be used in an appropriately designed electrolyte, together with selective anodic oxidation of sp2 carbon, to apply—$CH_3$ to the DLC substrate during anodic cycles, cf Lindsay S. Hernández-Muñoz et al, Modification of carbon surfaces with methyl groups by using ferrocene derivatives as redox catalysts of the oxidation of acetate ions", Journal of Electroanalytical Chemistry 650 (2010) 62-67

[12] see M. Yoshimura et al, "Factors controlling the electrochemical potential window for diamond electrodes in non-aqueous electrolytes", Diamond and Related Materials 11 (2002) 67-74 nitromethane can also serve as a carbon source at the cathode

[13] T. Yano, et al, "Electrochemical Behavior of Highly Conductive Boron-Doped Diamond Electrodes for Oxygen Reduction in Acid Solution", Journal of The Electrochemical Society, 146 (3) 1081-1087 (1999) Sp2 carbon (perhaps quinone) catalyzes $O_2$ reduction, while sp3 carbon does not readily reduce $O_2$. Under appropriate conditions, cathodically electrodeposited sp2 carbon could be removed by active cathodically-reduced oxygen species which preferentially attack sp2 carbon.

[14] Cai, u Y., A. B. Anderson, et al. (2007). "Hydrogen Evolution on Diamond Electrodes by the Volmer-Heyrovsky Mechanism." *Journal of the Electrochemical Society* 154: F36-F43.

[15] G. Sepold, et al, Influence of UV-laser radiation on the synthesis of DLC films by ECR-plasma-CVD Diamond and Related Materials 8 (1999) 1677-1681 (increasing energy of the deposited carbon ions with a simultaneous reduction in internal stresses, caused by photolytically induced modification of the film structure by UV-laser radiation at 80 C, laser pulse rate 1 Hz, 248 nm, 20ns duration)

[16] Mendez, A. E., M. A. Prelas, et al. (2006) "A novel method for the diffusion of boron in 60-80 micron size natural diamond type II/A powder" '2006 MRS Spring Meeting, Apr. 20, 2006-Apr. 21, 2006, San Francisco, Calif., United states, Materials Research Society (thermal diffusion at elevated temperature with bias, thermal ionization and optical ionization)

[17] WenLiang He, et al, "Electrodeposition mechanism of hydrogen-free diamond-like carbon films from organic electrolytes", Carbon 43 (2005) 2000-2006

[18] eg, see He, Y. Y., G. F. Zhang, et al. (2011). "Effects of reactors on the deposition of DLC films using liquid electrochemical technique." Diamond and Related Materials 20(2): 97-100

[19] Jisheng Zhang et al, "Synthesis and tribological behaviors of diamond-like carbon films by electrodeposition from solution of acetonitrile and water", Applied Surface Science 254 (2008) 3896-3901

[20] Anne E. Fischer et al, Preparation and Electrochemical Characterization of Carbon Paper Modified with a Layer of Boron-Doped Nanocrystalline Diamond, Journal of The Electrochemical Society, 154: 9: K61-K67 (2007)

[21] Diamond becomes a semimetal conductive material when the concentration of boron doping reaches ~$1 \times 10^{20}$ $10^{21}$ $cm^{-3}$ and nanodiamond can contribute conductivity from surface adsorption or defects, see, eg, J. B. Zang et al, "Electrochemical properties of nanodiamond powder electrodes", Diamond & Related Materials 16 (2007) 16-20

[22] M. Yu. Koroleva et al, "Sedimentation Stability of Aqueous Dispersions of Nanodiamond Agglomerates", ISSN 0040-5795, Theoretical Foundations of Chemical Engineering, 2009, Vol. 43, No. 4, pp. 478-481

[23] Jing Guo, et al, "Synthesis of $B_{50}N_2$ nanorods by electrolysis of organic solutions", Electrochemistry Communications 8 (2006) 1211-1214 (boric acid dissolved in DMF, at 400 V)

[24] Nitrogen is a relatively deep donor, but co-doping with boron and/or hydrogen (to form N—H—N complexes) can produce shallow donor n-type behavior. Yu, C., T. Zhang, et al. (2006). "The origin of shallow n-type conductivity in boron-doped diamond with H or S co-doping: Density functional theory study." *Diamond and Related Materials* 15: 1868-1877.

[25] Frangieh, G., F. Jomard, et al. (2009). "Influence of tertiarybutylphosphine (TBP) addition on the CVD growth of diamond." Physica Status Solidi (A) Applications and Materials 206: 1996-1999.

Kato, H., T. Makino, et al. (2009). "Selective growth of buried n+ diamond on (001) phosphorus-doped n-type diamond film." Applied Physics Express 2, (Heavy phosphorus doping (n+) by selective (111) direction growth technique on (001) diamond films)

Kato, H., D. Takeuchi, et al. (2009). "Characterization of specific contact resistance on heavily phosphorus-doped diamond films." Diamond and Related Materials 18: 782-785.

Kato, H., T. Makino, et al. (2008). N-type diamond growth by phosphorus doping. Diamond Electronics—Fundamentals to Applications II, Nov. 26, 2007-Nov. 30, 2007, Boston, Mass., United states, Materials Research Society.

Ghodbane, S., F. Omnes, et al. (2008). "n-type phosphorus-doped polycrystalline diamond on silicon substrates." Diamond and Related Materials 17: 1324-1329 (microwave plasma-assisted deposition of homogeneously n-type phosphorus-doped polycrystalline (microcrystalline) diamond films of good crystalline quality with phosphorus concentration at least $7\times10^{17}$ cm$^3$)

Wan, S., L. Wang, et al. (2009). "Field emission properties of DLC and phosphorus-doped DLC films prepared by electrochemical deposition process." *Applied Surface Science* 255(6): 3817-3821

[26]Chevallier, J., M. A. Pinault, et al. (2007). Different approaches for the n-type doping of diamond. 14th International Workshop on the Physics of Semiconductor Devices, IWPSD, Dec. 16,2007-Dec. 20, 2007, Mumbai, India, Inst. of Elec. and Elec. Eng. Computer Society (conversion of p-type boron-doped diamond into n-type diamond under deuteration giving high conductivities up to 2 S/cm at 300 K)

[27]Yuanlie Yu et al, "Cathode electrodeposition and characterization of Ru nanoparticles doped a-CNx:H composite films", Diamond & Related Materials 19 (2010) 661-664

[28]Diamond typically becomes a semimetal conductive material when the concentration of boron doping reaches $1\times10^{20}$-$10^{21}$ cm$^{-3}$ J. B. Zang, et al, "Electrochemical properties of nanodiamond powder electrodes", Diamond & Related Materials 16 (2007) 16-20

[29]Bogatyreva, G. P., M. A. Marinich, et al. (2011). "The effect of the methods of recovering diamond nanopowders on their physicochemical properties." *Journal of Superhard Materials* 33: 208-216. Danilenko, V. V. (2005). "Specific features of synthesis of detonation nanodiamonds." *Combustion, Explosion and Shock Waves* 41(5): 577-588.

Bogatyreva, G. P., M. A. Marinich, et al. (2011). "The effect of the methods of recovering diamond nanopowders on their physicochemical properties." *Journal of Superhard Materials* 33: 208-216. Danilenko, V. V. (2005). "Specific features of synthesis of detonation nanodiamonds." *Combustion, Explosion and Shock Waves* 41(5): 577-588.

Kruger, A., F. Kataoka, et al. (2005). "Unusually tight aggregation in detonation nanodiamond: Identification and disintegration." *Carbon* 43: 1722-1730.

Lin, E. L., S. A. Novikov, et al. (1998). "Shock-initiated and static synthesis of semiconducting materials based on ultrafine diamond." *Chemical Physics Reports* 17: 291-294.

Mitev, D., R. Dimitrova, et al. (2007). "Surface peculiarities of detonation nanodiamonds in dependence of fabrication and purification methods." *Diamond and Related Materials* 16(4-7 SPEC ISS): 776-780. Morita, Y., T. Takimoto, et al. (2008). "A facile and scalable process for size-controllable separation of nanodiamond particles as small as 4 nm." *Small* 4(12): 2154-2157.

Okotrub, A. V., L. G. Bulusheva, et al. (2007). "Surface electronic structure of detonation nanodiamonds after oxidative treatment." *Diamond and Related Materials* 16: 2090-2092.

Osawa, E., D. Ho, et al. (2009). "Consequences of strong and diverse electrostatic potential fields on the surface of detonation nanodiamond particles." *Diamond and Related Materials* 18: 904-909.

Osswald, S., G. Yushin, et al. (2006). "Control of sp2/sp3 carbon ratio and surface chemistry of nanodiamond powders by selective oxidation in air." *Journal of the American Chemical Society* 128(35): 11635-11642. Pershin, S. V., D. N. Tsaplin, et al. (1996). "Effect of size and structure of carbon particles on the threshold pressure of diamond formation behind a detonation wave." *Chemical Physics Reports* 15: 913-921. Pichot, V., M. Comet, et al. (2008). "An efficient purification method for detonation nanodiamonds." *Diamond and Related Materials* 17(1): 13-22.

Shenderova, O., A. Koscheev, et al. (2011). "Surface chemistry and properties of ozone-purified detonation nanodiamonds." *Journal of Physical Chemistry C* 115: 9827-9837.

Zhao, Y. and M. Wang (2008). "Preparation of polycrystalline cBN containing nanodiamond." *Journal of Materials Processing Technology* 198(1-3): 134-138.

[30]Baranov, P. G., A. A. Soltamova, et al. (2011). "Enormously high concentrations of fluorescent nitrogen-vacancy centers fabricated by sintering of detonation nanodiamonds." *Small* 7: 1533-1537.

Barnard, A. S. and M. Sternberg (2006). "Substitutional boron in nanodiamond, bucky-diamond, and nanocrystalline diamond grain boundaries." *Journal of Physical Chemistry B* 110(39): 19307-19314.

Lin, E. E., G. A. Dubitskii, et al. (1997). "On the feasibility of doping of ultrafine diamonds in a detonation wave." *Chemical Physics Reports* 16: 555-557.

Pichot, V., O. Stephan, et al. (2010). "High nitrogen doping of detonation nanodiamonds." *Journal of Physical Chemistry C* 114: 10082-10087.

Electrically conductive nanodiamond particles may also be manufactured by high-pressure synthesis, and milling of larger electroconductive diamond particles, such as micron and submicron scale boron-doped (BDD) electroconductive diamond particles.

[31]XiaoWen Fang et al, (2009) "Nonaromatic Core-Shell Structure of Nanodiamond from Solid-State NMR Spectroscopy", J. American chemical Society, 131, 1426-1435

[32]Aleksenskiy, A. E., E. D. Eydelman, et al. (2011). "Deagglomeration of detonation nanodiamonds." *Nanoscience and Nanotechnology Letters* 3:68-74.

Chaudhary, A., J. O. Welch, et al. (2010). "Electrical properties of monodispersed detonation nanodiamonds." *Applied Physics Letters* 96.

Hanada, K., K. Matsuzaki, et al. (2007). "Nanocrystalline diamond films fabricated by sol-gel technique." *Surface Science* 601: 4502-4505.

Niu, K.-Y., H.-M. Zheng, et al. (2011). "Laser dispersion of detonation nanodiamonds." *Angewandte Chemie—International Edition* 50: 4099-4102.

Shenderova, O., S. C. Hens, et al. (2010). "Nanodiamond particles in electronic and optical applications." 2009 MRS Fall Meeting, Nov. 30, 2009-Dec. 3, 2009 1203: 69-81.

Xu, X., Y. Zhu, et al. (2005). "Mechanochemical dispersion of nanodiamond aggregates in aqueous media." *Journal of Materials Science and Technology* 21: 109-112.

Zhu, Y., X. Shen, et al. (2004). "On the z-potential of nanodiamond in aqueous systems." *Journal of Materials Science and Technology* 20: 469-471.

Zhukov, A. N., F. R. Gareeva, et al. (2010). "Surface charge of detonation nanodiamond particles in aqueous solutions of simple 1: 11 Electrolytes." *Colloid Journal* 72: 640-646.

[33]Zhi Li, et al, "Pyrolysis Chemistry of Cubane and Methylcubane: The Effect of Methyl Substitution on Stability and Product Branching", J. Phys. Chem. A (2003), 107, 1162-1174

V. V. Zakharov et al, "Cubane derivatives 3. Synthesis and molecular structure of 1,4-bis(hydroxymethyl)cubane", Russian Chemical Bulletin 1998, Volume 47, Number 7, 1349-1352

L. B. Romanova, et al, "Cubane derivatives 10. Synthesis and molecular structures of nitroxymethylcubanes", Russian Chemical Bulletin, 2010, Volume 59, Number 5, Pages 1051-1055

A. V. Shastin, et al, "Synthesis and structures of 1,4-bis (chloromethyl)- and 1,4-bis(bromomethyl)cubanes", Russian Chemical Bulletin, 2006, Volume 55, Number 8, Pages 1452-1454

A. V. Shastin et al, "Synthesis of 4-bromocubane-1-carbaldehyde", Russian Chemical Bulletin, 2006, Volume 55, Number 7, Pages 1304-1306

V. V. Zakharov et al, "Cubane derivatives 5. Synthesis of 1-bromo-9,9 ethylenedioxypentacyclo[4.3.0.02,5.03, 8.04,7]non-4-ylcarbinol", Russian Chemical Bulletin, 1998, Volume 47, Number 11, Pages 2226-2228

V. V. Zakharov et al "Cubane derivatives 7. Synthesis and molecular structure of 4-bromo-1-hydroxymethylcubane", Russian Chemical Bulletin, 2005, Volume 54, Number 6, Pages 1505-1508

[34]J. E. Dahl, S. G. Liu, R. M. K. Carlson, "isolation and structure of higher diamondoids, nanometer sized diamond molecules", Science 299 (2003) 96.

Y. Lifshitz et al, Science, (2002) 297:1531

[35]Nur, Y., et al. (2008). "Facile synthesis of poly(hydridocarbyne): A precursor to diamond and diamond-like ceramics." Journal of Macromolecular Science, Part A: Pure and Applied Chemistry 45(5): 358-363.

Nur, Y. et al, (2009) "Electrochemical polymerization of hexachloroethane to form poly(hydridocarbyne): a preceramic polymer for diamond production", J Mater Sci 44:2774-2779 (I speculate that Nur et al may have electrodeposited DLC/diamond on their cathodes from acrylonitrile solvent, leading directly to very small diamond particles, without understanding this mechanism)

[36]Pitcher, M. W., S. J. Joray, et al. (2004). "Smooth continuous films of stoichiometric silicon carbide from poly (methylsilyne)." Advanced Materials 16(8): 706; Venneulen, L. A. and K. Huang (2000). "Electrosynthesis of new polysilynes: Poly(methylsilyne) and poly(cyclohexylsilyne-co-methylsilyne)." Polymer 41(2): 441-444.

[37]Sofo, Jorge O. et al. (2007). "Graphane: A two-dimensional hydrocarbon". Physical Review B 75 (15): 153401

Denis, P. A. (2013). "Concentration dependence of the band gaps of phosphorus and sulfur doped graphene." Computational Materials Science 67: 203-206.

Wen, X.-D., T. Yang, et al. (2012). "Graphane nanotubes." ACS Nano 6(8): 7142-7150.

Wei, W. and T. Jacob (2012). "Strong charge-transfer excitonic effects in C4H-type hydrogenated graphene." Physical Review B (Condensed Matter and Materials Physics) 86(16): 165444 (165444 pp.). Vanzo, D., D. Bratko, et al. (2012). "Wettability of pristine and alkyl-functionalized graphane." Journal of Chemical Physics 137(3).

Ray, N. R., J. Datta, et al. (2012). "Signature of Misoriented Bilayer Graphenelike and Graphanelike Structure in the Hydrogenated Diamond-Like Carbon Film." IEEE Transactions on Plasma Science 40(7): 1789-1793. Poh, H. L., Z. Sofer, et al. (2012). "Graphane electrochemistry: Electron transfer at hydrogenated graphenes." Electrochemistry Communications 25(1): 58-61.

Kim, H, T. Balgar, et al. (2012). "Is there sp3-bound H on epitaxial graphene? Evidence for adsorption on both sides of the sheet." Chemical Physics Letters 546: 12-17.

Jiao, N., C. He, et al. (2012). Hydrogenated graphene: Structures and surface work function. 12th International Conference on Numerical Simulation of Optoelectronic Devices, NUSOD 2012, Aug. 28, 2012-Aug. 31, 2012, Shanghai, China, IEEE Computer Society.

Jian, Z. and S. Qiang (2012). "How to fabricate a semihydrogenated graphene sheet? A promising strategy explored." Applied Physics Letters 101(7): 073114 (073114 pp.).

Hussain, T., B. Pathak, et al. (2012). "Functionalization of graphane with alkali and alkaline-earth metals: an insulator-to-metallic transition." Europhysics Letters 99(4): 47004 (47006 pp.).

Hussain, T., T. Adit Maark, et al. (2012). "Polylithiated (OLi2) functionalized graphane as a potential hydrogen storage material." Applied Physics Letters 101(24).

Costamagna, S., M. Neek-Amal, et al. (2012). "Thermal rippling behavior of graphane." Physical Review B (Condensed Matter and Materials Physics) 86(4): 041408 (041404 pp.).

Carbonell-Coronado, C., F. de Soto, et al. (2012). "H2 Physisorbed on Graphane." Journal of Low Temperature Physics pp. 1-7, doi 10.1007/s10909-012-0828-8

Bi-Ru, W. and Y. Chih-Kai (2012). "Electronic structures of graphane with vacancies and graphene adsorbed with fluorine atoms." AIP Advances 2(1): 012173 (012177 pp.).

Scarpa, F., R. Chowdhury, et al. (2011). "Thickness and in-plane elasticity of graphane." Physics Letters A 375 (20): 2071-2074.

Fokin, A. A., D. Gerbig, et al. (2011). "/- and /-interactions are equally important: Multilayered graphanes." Journal of the American Chemical Society 133(50): 20036-20039.

[38]For naturally occurring diamondoids rom two commercial natural gas fields, see Chung, H. S.; Chen et al, "Recent development in high-energy density liquid hydrocarbon fuels. Energy & Fuels 1999, 13, 641-649

Fokin, A. A., L. V. Chernish, et al. (2012). "Stable alkanes containing very long carbon-carbon bonds." Journal of the American Chemical Society 134(33): 13641-13650

Schreiner, P. R., L. V. Chernish, et al. (2011). "Overcoming lability of extremely long alkane carbon-carbon bonds through dispersion forces." Nature 477(7364): 308-311.

[39]J. E. Dahl et al, U.S. Pat. No. 7,884,256 (2011), Polymerizable higher diamondoid derivatives Wei, Z., J. M. Moldowan, et al. (2007). "Origins of thiadiamondoids and diamondoidthiols in petroleum." Energy & Fuels 21(6): 3431-3436

Fokin, A. A., B. A. Tkachenko, et al. (2009). "Reactivities of the prism-shaped diamondoids [1(2)3]tetramantane and [12312] hexamantane (cyclohexamantane), Chemistry—A European Journal 15(15): 3851-3862

J. Dahl, J. M. Moldowan, et al. (2010). "Synthesis of Higher Diamondoids and Implications for Their Formation in Petroleum." Angewandte Chemie International Edition 49(51): 9881-9885

Landt, L., C. Bostedt, et al. (2010). "Experimental and theoretical study of the absorption properties of thiolated diamondoids." Journal of Chemical Physics 132(14): 144305

Willey, T. M., J. R. I. Lee, et al. (2009). "Determining orientational structure of diamondoid thiols attached to silver using near-edge X-ray absorption fine structure spectroscopy." Journal of Electron Spectroscopy and Related Phenomena 172(1-3): 69-77

Schreiner, P. R., A. A. Fokin, et al. (2009). "[123]Tetramantane: Parent of a new family of -helicenes." Journal of the American Chemical Society 131(32): 11292-11293

Bordoloi, A., A. Vinu, et al. (2007). "Oxyfunctionalisation of adamantane using inorganic-organic hybrid materials based on isopoly and heteropoly anions: Kinetics and mechanistic studies." Applied Catalysis A: General 333 (1): 143-152.

Cai, L., J. Guo, et al. (2011). "Synthesis of adamantane-containing cationic surfactants." Huagong Xuebao/CIESC Journal 62(11): 3295-3300 (tertiary and quaternary amine adamantanes)

Cai, L., J. Guo, et al. (2011). A novel synthesis of 3-amino-1-adamantanemethanol. 2011 International Conference on Chemical Engineering and Advanced Materials, CEAM 2011, May 28, 2011-May 30, 2011, Changsha, China, Trans Tech Publications Chen, C.-H., W.-J. Shen, et al. (2004). "Synthesis and characterization of spiro(adamantane-2,9-fluorene)-based triaryldiamines: Thermally stable hole-transporting materials." Synthetic Metals 143(2): 215-220

Matsuoka, S.-I. and T. Ishizone (2005). Synthesis of poly (1,3-adamantane) by cationic ring-opening polymerization of 1,3-dehydroadamantanes. 54th SPSJ Annual Meeting 2005, May 25, 2005-May 27, 2005, Yokohama, Japan, Society of Polymer Science Matsuoka, S.-I., N. Ogiwara, et al. (2006). Cationic ring-opening polymerization of 1,3-dehydroadamantanes, Wiley-VCH Verlag.

Matsuoka, S.-I. and T. Ishizone (2006). Synthesis of poly (1,3-adamantane) by cationic ring-opening polymerization of 1,3-dehydroadamantane and polymer reactions. 55th SPSJ Annual Meeting, May 24, 2006-May 26, 2006, Nagoya, Japan, Society of Polymer Science.

Inomata, S., S.-I. Matsuoka, et al. (2012). "Ring-opening polymerizations of 1,3-dehydroadamantanes: Synthesis of novel thermally stable poly(1,3-adamantane)s." Macromolecules 45(10): 4184-4195.

Uehara, Y., N. Ogiwara, et al. (2006). Cationic ring-opening polymerization of 5,7-dialkyl-1,3-dehydroadamantanes. 55th SPSJ Annual Meeting, May 24, 2006-May 26, 2006, Nagoya, Japan, Society of Polymer Science.

[40]Fokina, N. A., B. A. Tkachenko, et al. (2012). "Synthesis of diamondoid carboxylic acids." Synthesis 2012(2): 259-264

[41]Landt, L., et al. (2009). "Optical response of diamond nanocrystals as a function of particle size, shape, and symmetry." Physical Review Letters 103(4)

Clay, W. A., et al. (2011). "Photoluminescence of diamondoid crystals." Journal of Applied Physics 110(9): 093512 (093516 pp.).

Roth, S., et al. (2010). "Negative-electron-affinity diamondoid monolayers as high-brilliance source for ultrashort electron pulses." Chemical Physics Letters 495(1-3): 102-108.

[42]Hu, J., F. Yang, et al. (2012). Synthesis of N,N,N-trimethyl-1-adamantyl quaternary ammonium hydroxide and technology development. 2011 International Symposium on Chemical Engineering and Material Properties, ISCEMP 2011, Nov. 4, 2011-Nov. 6, 2011, Shenyang, Liaoning, China, Trans Tech Publications.

Mikhailov, B. M. (1983). "Chemistry Of 1-Boraadamantane." Pure and Applied Chemistry 55(9): 1439-1452.

Nakano, T. and Y. Funaki (2011). Photoresist resin composition and method for forming a pattern. L. Daicel Chemical Industries. EP 99921193.

Ogiwara, N., S.-I. Matsuoka, et al. (2006). Spontaneous copolymerization of 1,3-dehydroadamantanes—Analysis of polymerization mechanism. 55th Society of Polymer Science Japan Symposium on Macromolecules, Sep. 20, 2006-Sep. 22, 2006, Toyama, Japan, Society of Polymer Science. Oliveira, F. S., M. G. Freire, et al. (2010). Solubility of adamantane in phosphonium-based ionic liquids, 2540 Olentangy River Road, P.O. Box 3337, Columbus, Ohio 43210-3337, United States, American Chemical Society.

Takagi, R., Y. Miwa, et al. (2005). "One-pot synthesis of adamantane derivatives by domino Michael reactions from ethyl 2,4-dioxocyclohexanecarboxylate." Journal of Organic Chemistry 70(21): 8587-8589.

Wang, L., J.-J. Zou, et al. (2011). "Rearrangement of tetrahydrotricyclopentadiene using acidic ionic liquid: Synthesis of diamondoid fuel." Energy and Fuels 25(4): 1342-1347.

Olah, G. A., G. Rasul, et al. (2000). "Homoconjugation in the Adamantane Cage: DFT/IGLO Studies of the 1,3-Dehydro-5-adamantyl Cation, Its Isoelectronic Boron Analogue 1,3-Dehydro-5-Boraadamantane, and Related Systems." Journal of Organic Chemistry 65(19): 5956-5959.

Korolkov, D. V. and O. V. Sizova, "Electronic structure of adamantine", International Journal of Quantum Chemistry Edition 5, Vol. 88 pp 606-613 (2002) (electronic structure of adamantane and related molecular cations under theory of trishomoaromacity)

Yan, G., N. R. Brinkmann, et al. (2003). "Energetics and Structures of Adamantane and the 1- and 2-Adamantyl Radicals, Cations, and Anions." Journal of Physical Chemistry A 107(44): 9479-9485. Borovkov, V. I. and Y. N. Molin (2004). "Paramagnetic relaxation of adamantane radical cation in solution." Chemical Physics Letters 398(4-6): 422-426.

Polfer, N., B. G. Sartakov, et al. (2004). "The infrared spectrum of the adamantyl cation." Chemical Physics Letters 400(1-3): 201-205.

Blancafort, L., P. Hunt, et al. (2005). "Intramolecular electron transfer in bis(methylene) adamantyl radical cation: A case study of diabatic trapping." Journal of the American Chemical Society 127(10): 3391-3399 Mathews, A. S., I. Kim, et al. (2006). "Fully aliphatic polyimides from adamantane-based diamines for enhanced thermal stability, solubility, transparency, and low dielectric constant." Journal of Applied Polymer Science 102(4): 3316-3326.

Hu, J., F. Yang, et al. (2012). Synthesis of N,N,N-trimethyl-1-adamantyl quaternary ammonium hydroxide and technology development. 2011 International Symposium on Chemical Engineering and Material Properties, ISCEMP 2011, Nov. 4, 2011-Nov. 6, 2011, Shenyang, Liaoning, China, Trans Tech Publications.

[43]See U.S. Pat. Nos. 7,795,468; 7,173,160; 6,815,569; 6,812,371; 6,812,370; 7,402,716; 7,034,194; 6,861,569, 6,844,477; 6,843,851; 6,831,202; 6,828,469; 6,743,290; 7,224,532; 7,160,529; 7,061,073; 7,306,671; 7,276,222; 7,273,598; 6,783,589 (diamondoids including functionalized diamondoids); U.S. Pat. Nos. 8,013,078; 7,981,975; 7,649,056; 7,312,562; 7,049,374; 7,402,835; (Heterodiamondoids); U.S. Pat. Nos. 7,309,476; 7,884,256; 6,858, 700; 7,094,937; 7,488,565; 7,304,190 (polymerizable and higher diamondoid derivatives); U.S. Pat. No. 7,306,674 (Nucleation of diamond films using higher diamondoids); see also published US Patent Applications 20110112258; 20100221453; 20100190985; 20100112214; 20100094012; 20090176035; 20090075203; 20090029067; 20080094724; 20080094723; 20080094722; 20080009546; 20070251446; 20060258748; 20060228479; 20060183870; 20060063107; 20060057496; 20050209490; 20050168122; 20050159634; 20050074690; 20050019955; 20050019576; 20040262744;

20040251478; 20040227138; 20040220442; 20040198049; 20040198048; 20040109328; 20040059145; 20040054243; 20040021204; 20040016397; 20030199710; 20030100808; 20030097032; 20020193648; 20020188163; 20020177743; 20020147373; 20020143218; 20020143217; 20020139295; 20020137976; 20020134301; 20020130407

[44]W. Smith, Bochkov A., R. Caple (2001), Organic Synthesis. Science and art. M.: World. pp. 573. ISBN 5-03-003380-7 (via 3-dimensional stability)

[45]P. R. Schleyer et al, "Stable Carbonium Ions. VIII. The 1-Adamantyl Cation", J. Am. Chem. Soc. 86 (19): 4195-4197 (1964)

George A. Olah, et al, "Bridgehead adamantyl, diamantyl, and related cations and dications", J. Am. Chem. Soc. 107 (9): 2764-2772 (1985)

Yayu, W., E. Kioupakis, et al. (2008). "Spatially resolved electronic and vibronic properties of single diamondoid molecules." Nature Materials 7(1): 38-42

Olah, G. A., G. Rasul, et al. (2000). "Homoconjugation in the Adamantane Cage: DFT/IGLO Studies of the 1,3-Dehydro-5-adamantyl Cation, Its Isoelectronic Boron Analogue 1,3-Dehydro-5-Boraadamantane, and Related Systems" Journal of Organic Chemistry 65(19): 5956-5959

Esteves, P. M., G. G. P. Alberto, et al. (2001). "Ab initio study of the adamantonium cations: The protonated adamantane" Journal of Physical Chemistry A 105(17): 4308-4311.

[46]Eg, see P. Bonhote, A. P. Dias, N. Papageorgiou, K. Kalyanasundaram, M. Graetzel, Inorg. Chem. 35 (1996) 1168.

[47]Pirali, O., H. Alvaro Galue, et al. (2010). "Infrared spectra and structures of diamantyl and triamantyl carbocations." International Journal of Mass Spectrometry 297(1-3): 55-62

Lenzke, K., L. Landt, et al. (2007). "Experimental determination of the ionization potentials of the first five members of the nanodiamond series." Journal of Chemical Physics 127(8): 084320-084321

[48]Wang, L., J.-J. Zou, et al. (2011). "Rearrangement of tetrahydrotricyclopentadiene using acidic ionic liquid: Synthesis of diamondoid fuel." Energy and Fuels 25(4): 1342-1347

[49]R. Horiuchi et al, "Seebeck Measurements of N-Doped Diamond Thin Film", Phys. Stat. Sol. (a) 193, No. 3, 457-461 (2002)

[50]see, eg, E D Eidelman et al, "The strong then thermoelectric effect in nanocarbon generated by the ballistic phonon drag of electrons", Journal of Physics: Condensed Matter Volume 19 Number 26 (2007) 266210; US Patent Application 20080029145, "Diamond-like carbon thermoelectric conversion devices and methods for the use and manufacture thereof"; U.S. Pat. No. 5,712,448, "Cooling device featuring thermoelectric and diamond materials for temperature control of heat-dissipating devices"

[51]J. E. Dahl et al, U.S. Pat. No. 8,013,078 (2011), Heterodiamondoids

[52]Ishiwata, H., Y. Acremann, et al. (2012). "Diamondoid coating enables disruptive approach for chemical and magnetic imaging with 10 nm spatial resolution." Applied Physics Letters 101(16): 163101 (163105 pp.) Schwertfeger, H., C. Wurtele, et al. (2008). "Monoprotection of diols as a key step for the selective synthesis of unequally disubstituted diamondoids (Nanodiamonds)." Journal of Organic Chemistry 73(19): 7789-7792; Willey, T. M., J. D. Fabbri, et al. (2008). "Near-edge X-ray absorption fine structure spectroscopy of diamondoid thiol monolayers on gold." Journal of the American Chemical Society 130(32): 10536-10544 Yang, W. L., J. D. Fabbri, et al. (2007). "Monochromatic electron photoemission from diamondoid monolayers." Science 316(5830): 1460-1462

Dahl, J. E. U. S., W. Bokhari, et al, Chemically attached diamondoids for CVD diamond film nucleation, U.S. patent application Ser. No. 11/725,465 published as 20070251446 (2007)

[53]Compare Hongyan Hu et al, "Synthesis of C60 nanoparticle doped hard carbon film by electrodeposition", Carbon 46: 1095-1097 (2008) which incorporates graphitic sp2 fullerenes which do not have high bonding concentration with the co-deposited DLC.

[54]Compare Yuanlie Yu et al, "Ultrafast electrodeposition of amorphous carbon nitride films from fullerene derivative", Electrochemistry Communications 12 (2010) 390-393, which codeposits a nondiamondoid, nonsp3 fullerene 310 carbon atom component, $C_{60}[(NH_2)2CNCN]_5$, to produce-carbon nitrogen films which may have relatively little sp3 carbon.

[55]S. Liu, et al, US Patent Publication 20090075203 Al Photoresist Compositions Comprising Diamondoid Derivatives, published Mar. 19, 2009

[56]Ciftan Hens, S., G. Cunningham, et al. (2011). "Nanodiamond-assisted dispersion of carbon nanotubes and hybrid nanocarbon-based composites." *Nanoscience and Nanotechnology Letters* 3: 75-82.

[57]An, S. J., Y. Zhu, et al. (2010). "Thin film fabrication and simultaneous anodic reduction of deposited graphene oxide platelets by electrophoretic deposition." Journal of Physical Chemistry Letters 1(8): 1259-1263.

[58]T. Fukushima, "π-Electronic Soft Materials Based on Graphitic Nanostructures", Polymer Journal, Vol. 38, No. 8, pp. 743-756 (2006)

T. Fukushima, et al, Chem. Eur. J. 2007, 13, 5048

T. Fukushima, et al, Science 2003, 300, 2072

[59]Krueger, A., M. Ozawa, et al. (2007). "Deagglomeration and functionalisation of detonation diamond." Physica Status Solidi (A) Applications and Materials 204(9): 2881-2887. (surface functionalisation of nanodiamond starting from hydroxyl groups including the grafting of silanes and amino acids)

Osswald, S., G. Yushin, et al. (2006). "Control of sp2/sp3 carbon ratio and surface chemistry of nanodiamond powders by selective oxidation in air." Journal of the American Chemical Society 128(35): 11635-11642. (detonation-synthesized ~5-nm nanodiamond covered by oxygen-containing surface functional groups, with up to 96% of sp3-bonded carbon comparable to that found in microcrystalline diamond.

[60]J. Achard et al, "Thick boron doped diamond single crystals for high power electronics", Diamond & Related Materials 20 (2011) 145-152

[61]Kiyoshi Suzuki et al, (2009), "Development of New PCD Made Up of Boron Doped Diamond Particles and its Machinability by EDM", Advanced Materials Research Vols. 76-78 (2009) pp 684-689

[62]For conductive nanodiamond use in co-electrodeposition of DLC herein, a microwave plasma or other vapor-deposited N, S, B and/or P doped CVD diamond layer on diamond nanoparticles may, for example, be from about 1 to about 5 nm thick and have a doping level for example, in the range of from about $1\times10^{17}$ to about $1\times10^{21}$ dopant atoms per cubic centimeter.

Ay, Ayten, "Boron doped ultrananocrystalline diamond powder: Alternative support material for PEMFCs", Ph.D. Thesis, Michigan State University (G. Swain, Advisor), (2011), 195 pages Swope, V. M., I. Sasaki, et al. (2007). *Conductive diamond powder: A new catalyst support for the polymer electrolyte membrane fuel cell*. Multifunctional Carbon Materials for Electrochemical and Electronic Applications—210th ECS Meeting, Oct. 29, 2006-Nov. 3, 2006, Cancun, Mexico, Electrochemical Society Inc.

Sikora, A., A. Berkesse, et al. (2009). "Structural and electrical characterization of boron-containing diamond-like carbon films deposited by femtosecond pulsed laser ablation." Solid State Sciences 11: 1738-1741

Teraji, T., H. Wada, et al. (2006). "Highly efficient doping of boron into high-quality homoepitaxial diamond films." Diamond and Related Materials 15: 602-606 (high-power microwave plasma chemical vapor deposition)

[63] J. Ting and M. L. Lake, (1994), "Diamond-coated carbon fiber", J. Mater. Res., Vol. 9, No. 3, 636-642 (~5 GPa tensile stress upon cooling in thick diamond coatings on short carbon fibers)

S. I. Shah et al (1995), "Diamond deposition on carbon fibers", J. Vac. Sci. Technol. A 13(3) 1624-1627

[64] Hu, H., G. Chen, et al. (2008). "Facile synthesis of CNTs-doped diamond-like carbon film by electrodeposition." Surface and Coatings Technology 202(24): 5943-5946. (residual stress of the carbon film was greatly reduced from 1.2 to 0.83 GPa after the incorporation of CNTs)

[65] It is noted that use of electrolyte components which increase electrolyte electroconductivity will typically permit reduction of applied voltage in DLC electrodeposition.

[66] M. Fryda, T. Matthee, S. Mulcahy, A. Hampel, L. Schafer and I. Troster, Diamond Rel. Mater., 12 (2003) 1950

A. Kraft, "Doped Diamond: A Compact Review on a New, Versatile Electrode Material", Int. J. Electrochem. Sci., 2 (2007) 355-385

[67] Xingbin Yan et al, "Study of structure, tribological properties and growth mechanism of DLC and nitrogen-doped DLC films deposited by electrochemical technique", Applied Surface Science 236 (2004) 328-335

[68] T. M. Manhabosco et al, "Electrodeposition of diamond-like carbon (DLC) films on Ti", Applied Surface Science 255 (2009) 4082-4086

[69] R. S. Li, et al, "Effect of deposition voltage on the field emission properties of electrodeposited diamond-like carbon films", Applied Surface Science 255 (2009) 4754-4757

[70] This approach may be used to produce a wide variety of porous and semiporous DLC structures. For example, ceramic and/or metallic microparticles and nanoparticles such as $TiB_2$, Al nanoparticles with a hard $Al_2O_3$ coating may be codeposited with the DLC (and preferably also with electrically conductive nanodiamond particles) at sufficient concentration to form an interconnected network within a continuous DLC matrix. If reverse pulse sp2 carbon processing is used, the $Al_2O_3$ coating protects the metallic nanoparticles from anodic dissolution. However, the metallic nanoparticles can be chemically removed from the DLC composite by suitable etchants.

Compare Kondo, T., S. Lee, et al. (2009). "Conductive diamond hollow fiber membranes." Electrochemistry Communications 11: 1688-1691.

[71] J. R. Gaier and M. E. Slabe, (1987) "Stability of Bromine, Iodine Monochloride, Copper (II) Chloride and Nickel (II) chloride Intercalated Pitch-Based Graphite Fibers", NASA Technical Memorandum 89904, 17 pages

[72] S. Ismat Shah, et al, "Diamond deposition on carbon fibers", J. Vac. Sci. Technol. A 13(3):1995 1624-1627

[73] Graphite filaments and fibers are easily damaged in processing and composite formation, or weakened by surface-adhesion enhancement treatments such as plasma oxidation. They are conventionally sized with protective surface coatings which do not share their intrinsic strength characteristics. A thin covalently-bonded surface layer of ultrastrong and ultrahard diamond, which can include surface functionalization such as amine or hydroxyl groups, can significantly improve carbon fiber composite manufacture and properties.

[74] A. Kanareykin, A. et al, (2007) "Progress Towards Development Of A Diamond-Based Cylindrical Dielectric Accelerating Structure", IEEE Proceedings of PAC07, Advanced Concepts, p 3163-3165

[75] Pure single-crystal diamond can have a hardness value of 167 GPa when scratched with nanodiamond, while nanodiamond has a higher hardness value <–300 GPa, apparently under conditions which favor "toughness". The tensile strength of diamond could be as high as 60-225 GPa, depending on orientation and lattice perfection. Natural polycrystalline ballas and carbonado diamond are tougher than single-crystal diamond; they are used for deep-drilling bits and other demanding industrial applications. Nanodiamond composites can be much harder than natural crystalline diamond. These potential properties present enormous opportunity for improving the strength of DLC composites such as carbon fiber composites. See Mikhail I. Eremets et al, "the strength of diamond". Applied Physics Letters 87, 141902 (2005); R. H. Telling et al, Theoretical Strength and Cleavage of Diamond, Physical Review Letters 84:22: 5160-5163 (2000); http://en.wikipedia.org/wiki/Material_properties_of diamond

[76] Ababou-Girard, S., F. Solal, et al. (2006). "Covalent grafting of organic molecular chains on amorphous carbon surfaces." Journal of Non-Crystalline Solids 352(9-20 SPEC ISS): 2011-2014.

Balaban, T. S., M. C. Balaban, et al. (2006). "Polyacylation of single-walled carbon nanotubes under friedel-crafts conditions: An efficient method for functionalizing, purifying, decorating, and linking carbon allotropes." Advanced Materials 18(20): 2763-2767.

Chong, K. F., K. P. Loh, et al. (2007). "Cell adhesion properties on-photochemically functionalized diamond." Langmuir 23(10): 5615-5621. (functionalization with undecylenic acid)

Coffinier, Y., S. Szunerits, et al. (2007). "Covalent linking of peptides onto oxygen-terminated boron-doped diamond surfaces", Diamond and Related Materials 16(4-7 SPEC ISS): 892-898. (formation of semicarbazide boron-doped diamond surfaces)

Hernando, J., T. Pourrostami, et al. (2007) "Immobilization of horseradish peroxidase via an amino silane on oxidized ultrananocrystalline diamond." Diamond and Related Materials 16(1): 138-143

Li, L., J. L. Davidson, et al. (2006). "Surface functionalization of nanodiamond particles via atom transfer radical polymerization." Carbon 44(11): 2308-2315 (atom transfer radical polymerization "grafting-from" synthesis)

Maddanimath, T., S. Pethkar, et al. (2002). "Application of electrochemically prepared carbon nanofibers in supercapacitors." Journal of Power Sources 109(1): 105-110. (electrochemical in situ functionalization)

Matrab, T., M. M. Chehimi, et al. (2006). "Surface functionalization of ultrananocrystalline diamond using atom transfer radical polymerization (ATRP) initiated by electro-grafted aryldiazonium salts." Diamond and Related Materials 15(4-8): 639-644.

Nakamura, T., M. Hasegawa, et al. (2006). "Photochemical modification of nanodiamond films with sulfur-containing functionalities." Diamond and Related Materials 15(4-8): 678-681.

Nakamura, T., T. Ohana, et al. (2007). "Photochemical modification of diamond films with sulfur-containing functionalities." Japanese Journal of Applied Physics, Part 1: Regular Papers and Short Notes and Review Papers 46(1): 348-350.

Nichols, B. M., K. M. Metz, et al. (2006). "Electrical bias dependent photochemical functionalization of diamond surfaces." Journal of Physical Chemistry B 110(33): 16535-16543.

Song, K.-S., T. Hiraki, et al. (2007). "Miniaturized diamond field-effect transistors for application in biosensors in electrolyte solution." Applied Physics Letters 90(6): 063901. (functionalization with amine by ultraviolet irradiation in an ammonia gas)

Sun, B., S. E. Baker, et al. (2007). "Covalent molecular functionalization of diamond thin-film transistors." Diamond and Related Materials 16(8): 1608-1615.

Sun, B., P. E. Colavita, et al. (2006). "Covalent photochemical functionalization of amorphous carbon thin films for integrated real-time biosensing." Langmuir 22(23): 9598-9605.

Zhong, Y. L., K. F. Chong, et al. (2007). "Optimizing biosensing properties on undecylenic acid-functionalized diamond." Langmuir 23(10): 5824-5830.

[77]Ammonia plasma treatment of hydrogen terminated diamond produces surface terminal amino groups P. Bouvier, et al, Electrochem. Solid-State Letters, 8 (2005) E57.

[78]Golberg, D. Yoshio Bando, et al, (2010) "Boron Nitride Nanotubes and Nanosheets" (review), ACSNano, V 4:2979-2993

[79]Siqing He et al, "Synthesis of carbon films containing diamond particles by electrolysis of methanol", Thin Solid Films 517 (2009) 5625-5629

[80]P. M. Koinkar, Field emission characteristics of chemical vapor deposited diamond thin films with SnO2 as overlayer on silicon", Thin Solid Films 474 (2005) 275-278

[81]P. M. Koinkar, Field emission characteristics of chemical vapor deposited diamond thin films with SnO2 as overlayer on silicon", Thin Solid Films 474 (2005) 275-278

[82]Depending on electrolyte characteristics and nanodiamond surface chemistry, the zeta potential of the nanodiamond particles may be adjusted to control attraction to the cathode for codeposition rate adjustment, if desired

[83]H. Hu, et al, "Facile synthesis of CNTs-doped diamond-like carbon film by electrodeposition", Surface & Coatings Technology 202 (2008) 5943-5946

[84]Hongyan Hu et al, "Facile synthesis of CNTs-doped diamond-like carbon film by electrodeposition", Surface & Coatings Technology 202 (2008) 5943-5946

[85]Jackson Tsukada et al, "Electro-Deposition of Carbon Structures at Mid Voltage and Room Temperature Using Ethanol/Aqueous Solutions", Journal of The Electrochemical Society, 159 (3) D159-D161 (2012)

[86]other organics such as acetone, acetic acid, etc may also be used. Eg, see Zhang, G. F., Y. Y. He, et al. (2011), "Influence of additive on diamond films synthesized using liquid phase electrochemical method", 11th IUMRS International Conference in Asia, IUMRS-ICA2010, Sep. 25,2010-Sep. 28,2010, Qingdao, China, Trans Tech Publications Ltd.

A Pandey, B. and S. Hussain (2011). "Effect of nickel incorporation on the optical properties of diamond like carbon (DLC) matrix." *Journal of the Physics and Chemistry of Solids* 72(10): 1111-1116

Qiang Fu et al, "Electrodeposition of carbon films from various organic liquids", Surface and Coatings Technology 124 (2000) 196-200 (films deposited from the liquids with a higher dipole moment and dielectric constant tend to contain more sp3 C and are more diamond like)

[87]When boron concentration of diamond exceeds about $3 \times 10^{20}$ per $cm^3$, diamond becomes a metallic-type conductor and can be a superconductor at low temperatures. Eg, see Takano, Y, "Superconductivity in CVD diamond films" Journal of Physics: Condensed Matter 21(25): 253201 (2009)

[88]O. A. Williams et al, "Growth, electronic properties and applications of nanodiamond", Diamond & Related Materials 17 (2008) 1080-1088 [see cited references for applications of electrodeposited diamond]

[89]M.-A. Pinault-Thaury et al, "n-Type CVD diamond: Epitaxy and doping", Materials Science and Engineering B 176 (2011) 1401-1408

Brandao, L. E. V., R. F. Pires, et al. (2010). "Free-standing boron doped CVD diamond films grown on partially stabilized zirconia substrates." *Vibrational Spectroscopy* 54(2): 84-88.

Suzuki, M., T. Ono, et al. (2009). "Low-temperature thennionic emission from nitrogen-doped nanocrystalline diamond films on n-type Si grown by MPCVD." *Diamond and Related Materials* 18(10): 1274-1277

J. Achard et al, "Thick boron doped diamond single crystals for high power electronics", Diamond & Related Materials 20 (2011) 145-152

Livia Elisabeth Vasconcellos de Siqueira Brandao, et al, "Free-standing boron doped CVD diamond films grown on partially stabilized zirconia substrates", Vibrational Spectroscopy 54 (2010) 84-88 Huang, H., Y. H. Wang, et al. (2012). "Improvement of suspension stability and electrophoresis of nanodiamond powder by fluorination." *Applied Surface Science* 258(8): 4079-4084.

La Torre Riveros, L., D. A. Tryk, et al. (2005). "Chemical purification and characterization of diamond nanoparticles for electrophoretically coated electrodes." *Reviews on Advanced Materials Science* 10(3): 256-260. [particles attracted to cathode]

Ogura, M., H. Kato, et al. (2011). "Misorientation-angle dependence of boron incorporation into (0 0 1)-oriented chemical-vapor-deposited (CVD) diamond." *Journal of Crystal Growth* 317(1): 60-63.

[90]in this regard, the extensive art available to and cited by Tsukada et al should be noted, none of which applies anodic etching to preferentially remove non-sp3 carbon: T. Suzuki, et al, J. Mater. Sci. lett., 19, 1899 (2000); H. Wang, et al, Deposition of Diamond-like Carbon Films by Electrolysis of Methanol Solution, Appl. Phys. Lett., 69 (1996) 1074; H. Wang, et al, Pulsed Electrodeposition of Diamond-like Carbon Films, J. Mater. Res., 12 (1997) 3102; J. Jiu, et al, Liquid Deposition of Hydrogenated Carbon Films in N, N-dimethyl farmamide solution, Materials Letters, 41 (1999) 63; Q. Fu, et al, Simultaneous Formation of Diamond-like Carbon and Carbon Nitride Films in the Electrodeposition of an Organic Liquid, Chemical Physics Letters, 301 (1999) 87-90; J. Jiu, et al, Liquid Phase Deposition of Hydrogenated Diamond-like Carbon Films on Conductive Glass Substrates Using a Pulse-modulated Source, Materials Research Bulletin, 34 (1999) 1501; J. Jiu, et al, The Effect of Annealing Temperature on the Structure of Diamond-like Carbon Films by Electrodeposition Technique, Journal of Materials Science, 34 (1999) 5205; Q. Fu, et al, Electrodeposition of Carbon Films from Various Organic Liquids, Surface and Coatings Technology, 124 (2000) 196; H. Wang, et al, Amorphous Carbon and Carbon Nitride Films Synthesized by Electrolysis of Nitrogen-containing Liquid, Diamond and Related Materials, 9 (2000) 1307; C. Cao et al, Electrodeposition Diamond-like Carbon Films from Organic Liquids, Thin Solid Films, 368 (2000) 203; D. Guo, et al, Preparation of Hydrogenated Diamond-like Carbon Films on Conductive Glass from an Organic Liquid Using Pulsed Power Chemical Physics Letters, 325 (2000) 499; K. Cai, et al, Electrodeposition of Diamond-like Amorphous Carbon Films on Aluminum from Acetonitrile, Appl. Phys., A 71 (2000) 227; K. Cai, et al, Evaluation of Diamond-like Carbon Films Deposited on Conductive Glass from Organic Liquids Using Pulsed Current, Surface and Coatings Technology, 130 (2000) 266; D. Guo, et al, Electrodeposition of Diamond-like Carbon Films on Si from N, N-dimethylfarmamide, Chemical Physics Letters, 329 (2000) 346; H. Wang and M. Yoshimura, Electrodeposition of Diamond-like Carbon Films in Organic Solvents Using a Thin Wire Anode, Chemical Physics Letters, 348 (2001) 7; V. P. Novikov and V. P. Dymont, Synthesis of Diamond-like Phases of Carbon by an Electrochemical Method, Tech. Phys. Lett., 22 (1996) 283; V. P. Novikov and V. P. Dymont, Synthesis of Diamondlike Films by an Electrochemical Method at Atmosphere Pressure and Low Temperature, Appl. Phys. Lett., 70 (1997) 200; V. P. Novikov and V. P. Dymont, Mechanism of Electrochemical Synthesis of Diamond-like Carbon, Tech. Phys. Lett., 23 (1997) 350; V. P. Dymont, et al, Effect of Thermal Annealing on Spectral Properties of Electrodeposited Carbon Films, Technical Physics, 45 (2000) 905; Y. Lifshitz, Diamond-like Carbon—Present Status, Diamond and Related Materials, 8 (1999) 1659.

[91]H.-Y. Chan et al, "Fabrication And Testing Of A Novel All-Diamond Neural Probe For Chemical Detection And Electrical Sensing Applications", IEEE MEMS 2008, Tucson, Ariz., USA, Jan. 13-17, 2008

Michael W. Varney et al, "Polycrystalline-Diamond MEMS Biosensors Including Neural Microelectrode-Arrays", Biosensors 2011, 1, 118-133; doi:10.3390/bios1030118

David J Garrett et al, "Ultra-nanocrystalline diamond electrodes: optimization towards neural stimulation applications", *J. Neural Eng.* 9 016002 (2012)

Ganesan K, et al, "Diamond penetrating electrode array for epi-retinal prosthesis", *Conf Proc IEEE Eng Med Biol Soc.* 2010; 2010:6757-60.

Regan E M et al, "Differential patterning of neuronal, glial and neural progenitor cells on phosphorus-doped and UV irradiated diamond-like carbon", *Biomaterials.* 2010 January; 31(2):207-15. Epub 2009 Oct. 14.

Ignatius M J, et al, "Bioactive surface coatings for nanoscale instruments: effects on CNS neurons", *J Biomed Mater Res.* 1998 May; 40(2):264-74.

Leonard, R. L. et al. (2012). "Protective coatings for enhanced performance in biomedical applications." *Surface Engineering* 28(7): 473-479 (Biomedical implants such as prosthetic hips, heart stents and instruments used in vivo)

Mohan, L., C. et al. (2012). "Corrosion behavior of titanium alloy Beta-21S coated with diamond like carbon in Hank's solution." *Applied Surface Science* 258(17): 6331-6340. (bio-implant materials)

Skoog, S. A., A. V. Sumant, et al. (2012). "Ultrananocrystalline diamond-coated microporous silicon nitride membranes for medical implant applications." *JOM* 64(4): 520-525.

Hauert, R. (2005). *A review of DLC coatings for biological applications.* 2005 World Tribology Congress III, Sep. 12-16 2005-Washington, D.C., United states, American Society of Mechanical Engineers.

Kim, J H, S K Lee, et al. (2009). *Ultra thin CVD diamond film deposition by electrostatic self-assembly seeding process with nano-diamond particles,* 26650 The Old Road, Valencia, Calif., 91381-0751, United States, American Scientific Publishers.

Zhuang, H., B. Song, et al. (2011). "Microcontact printing of monodiamond nanoparticles: An effective route to patterned diamond structure fabrication." *Langmuir* 27(19): 11981-11989.

Songtao Xie, "Boron-Doped Diamond Neurosensors and Neural Stimulating Electrodes"; Jeannette M. Bursee, "Neural cell patterning on thin film boron doped diamond electrodes for neurotransmitter detection in vitro", Case Western Reserve University See www.neurans-on-diamond.org and "Diamond to Retina Artificial Micro-Interface Structures" Final Activity report (April 2006) for DREAMS, a European project gathering 5 institutes aiming at the development of novel bio sensing interfaces exploiting the bio-inertness of synthetic diamond.

[92]Qian, F., W. Linjun, et al. (2009). *Preparation and photoelectric properties of a thin-film nanocrystalline diamond phototransistor.* International Symposium on Photoelectronic Detection and Imaging 2009: Material and Device Technology for Sensors, 17 Jun. 2009, USA, SPIE Volpe, P. N., P. Muret, et al. (2010). "High breakdown voltage Schottky diodes synthesized on p-type CVD diamond layer." *Physica Status Solidi A* 207(9): 2088-2092.

Tadjer, M. J., T. J. Anderson, et al. (2010). "Comparative Study of Ohmic Contact Metallizations to Nanocrystalline Diamond Films." *Materials Science Forum* 645-8: 733-735.

Lingyun, S., T. Ke, et al. (2010). *Preparation of an optically activated field effect transistor based on diamond film.* Seventh International Conference on Thin Film Physics and Applications, 24-27 Sep. 2010, USA, SPIE—The International Society for Optical Engineering Fuyuan, X., W. Linjun, et al. (2010). "Electrical properties of hydrogen terminated p-type diamond film." *Materials Science Forum* 663: 625-628.

[93]Dubin, S., S. Gilje, et al. (2010). "A one-step, solvothermal reduction method for producing reduced graphene oxide dispersions in organic solvents." ACS Nano 4(7): 3845-3852 (reduction of graphene oxide in N-methyl-2-pyrrolidinone produces a stable colloidal dispersion. redispersible in a variety of organic solvents) Na Liu, et al, "One-Step Ionic-Liquid-Assisted Electrochemical Synthesis of Ionic-Liquid-Functionalized Graphene Sheets Directly from Graphite", Advanced Functional Materials 2008, 18, 1518-1525

[94]Junyan Zhang et al, "Good electrical and mechanical properties induced by the multilayer graphene oxide sheets incorporated to amorphous carbon films Solid State Sciences", 12 (2010) 1183-1187

[95] Roy et al, Deposition of hydrogenated amorphous carbon films with enhanced sp3-C bonding on nanocrystalline palladium interlayer, Diamond & Related Materials 16 (2007) 517-525

[96] Trace water generated or inadvertently present in electrolytes may serve as a hydrogen abstraction agent in conventional DLC electrodeposition. $H^+$ at the cathode can generate atomic hydrogen for pairing with surface-bound —C—H, to assist its removal from the cathode DLC surface as $H_2$ molecules.

[97] Aishnn H. C. Sirk et al, (2008), "Electrochemical Synthesis of Diamondlike Carbon Films", Journal of The Electrochemical Society, 155 (5) E49-E55

[98] Graphite filaments and fibers are easily damaged in processing and composite information, or weakened by surface-adhesion enhancement treatments such as plasma oxidation. They are conventionally sized with protective surface coatings which, of course, do not share their intrinsic strength characteristics. A thin covalently-bonded surface layer of ultrastrong and ultrahard diamond (which could include surface functionalization such as amine or hydroxyl groups) significantly improves carbon fiber composite manufacture and properties.

[99] http://www.almc.ariuy.mil/alog/issues/julaug00/ms498.htm, "Alternatives to the Soldier Canteen" by Major James E. Gibson. (Soldiers need more than water carried in a primitive attachment to their belts—they need an easy-to-use hydration system that enhances their battlefield performance. "Water, fuel, and ammunition are three key elements of logistics support on the battlefield . . . . A canteen is awkward to carry and use. Water weighs about 8 pounds per gallon. Carrying a filled canteen on a strap around the neck or hung from a utility belt already loaded with ammunition and other gear may slow a soldier down when he needs to move quickly. Crawling and climbing are more difficult when a loosely suspended weight is bobbing on a soldier's body. A canteen can catch on brush or wire obstacles while a soldier is on the move . . . . To drink from the canteen, a soldier must unfasten the flaps of the canvas cover, draw the canteen out, unscrew the cap, drink, then return the canteen to its cover and refasten the flaps. In a tactical situation, a half-empty canteen sloshes audibly, potentially revealing the soldier's position . . . ")

[100] Saligheh, O. et al, (2009), "The Effect of Post Hot Compaction on Crystallinity and Thermal Behavior of Ultra-High Molecular Weight Polyethylene Fiber Laminates", *Journal of Macromolecular Science, Part B: Physics*, 48:766-773

[101] Bohannan, A. and E. Fahrenthold (2008). "Hypervelocity impact simulation using membrane particle-elements." International Journal of Impact Engineering 35(12): 1497-1502.

Chin, W. K. and E. D. Wetzel (2008). Breathability Characterization of Ballistic Fabrics, Including Shear Thickening Fluid-Treated Fabrics. United States: 18p.

Decker, M. J., C. J. Halbach, et al. (2007). "Stab resistance of shear thickening fluid (STF)-treated fabrics." Composites Science and Technology 67(3-4): 565-578.

Hassan, T. A., V. K. Rangari, et al. (2010). "Synthesis, processing and characterization of shear thickening fluid (STF) impregnated fabric composites." Materials Science and Engineering A 527(12): 2892-2899. Kalman, D. P., J. B. Schein, et al. (2007). Polymer dispersion based shear thickening fluid-fabrics for protective applications, Baltimore, Md., United states, Soc. for the Advancement of Material and Process Engineering.

Mahfuz, H., F. Clements, et al. (2009). "Enhanced stab resistance of armor composites with functionalized silica nanoparticles." Journal of Applied Physics 105(6).

Rangari, V. K., T. A. Hassan, et al. (2008). Synthesis and mechanical properties of shear thickening fluid/Kevlar composite for body armor application, Long Beach, Calif., United states, Soc. for the Advancement of Material and Process Engineering.

Rao, H., M. V. Hosur, et al. (2009). Stab characterization of hybrid ballistic fabrics, Albuquerque, N. Mex., United states, Society for Experimental Mechanics.

Rosen, B. A., C. H. N. Laufer, et al. (2007). Multi-threat performance of kaolin-based shear thickening fluid (STF)-treated fabrics, Baltimore, Md., United states, Soc. for the Advancement of Material and Process Engineering.

[102] Lin, T.-H., W.-H. Huang, et al. (2010). "Bioinspired assembly of surface-roughened nanoplatelets." Journal of Colloid and Interface Science 344(2): 272-278.

[103] Liu, S., J. Wang, et al. (2010). "Improving the ballistic performance of ultra high molecular weight polyethylene fiber reinforced composites using conch particles." Materials and Design 31(4): 1711-1715.

[104] Allen, M. J., V. C. Tung, et al. (2010). "Honeycomb carbon: A review of graphene." Chemical Reviews 110 (1): 132-145.

[105] Compton, O. C., D. A. Dikin, et al. (2010). "Electrically conductive "alkylated" graphene paper via chemical reduction of amine-functionalized graphene oxide paper." Advanced Materials 22(8): 892-896. Stankovich, S., D. A. Dikin, et al. (2006). "Graphene-based composite materials." Nature 442(7100): 282-286. (Graphene thermal conductivity ~3,000 W/m° K, stiffness 1,060 GPa, fracture strength-carbon nanotubes)

[106] Dmitri Golberg, D. et al, (2010) "Boron Nitride Nanombes and Nanosheets", ACSNano, Vol 4 p. 2979-7993

[107] A X. et al. "Stable Aqueous Dispersions of Noncovalently Functionalized Graphene from Graphite and their Multifunctional High Performance Applications." Nano Letters. (mass-production of graphene) Ang, P. K., S. Wang, et al. (2009). "High-throughput synthesis of graphene by intercalation-exfoliation of graphite oxide and study of ionic screening in graphene transistor." ACS Nano 3(11): 3587-3594. Che, J., L. Shen, et al. (2010). "A new approach to fabricate graphene nanosheets in organic medium: Combination of reduction and dispersion." Journal of Materials Chemistry 20(9): 1722-1727.

Chen, W. and L. Yan (2010). "Preparation of graphene by a low-temperature thermal reduction at atmosphere pressure." Nanoscale 2(4): 559-563; Chen, W., L. Yan, et al. (2010). "Preparation of graphene by the rapid and mild thermal reduction of graphene oxide induced by microwaves." Carbon 48(4): 1146-1152. Geng, Y., S. J. Wang, et al. (2009). "Preparation of graphite nanoplatelets and graphene sheets." Journal of Colloid and Interface Science 336(2): 592-598.

Hamilton, C. E., J. R. Lomeda, et al. (2009). "High-yield organic dispersions of unfunctionalized graphene." Nano Letters 9(10): 3460-3462.

Lv, W., D.-M. Tang, et al. (2009). "Low-temperature exfoliated graphenes: Vacuum-promoted exfoliation and electrochemical energy storage." ACS Nano 3(11): 3730-3736.

Mohanty, N., A. Nagaraja, et al. (2010). "High-throughput, ultrafast synthesis of solutiondispersed graphene via a facile hydride chemistry." Small 6(2): 226-231.

Pu, N.-W., C.-A. Wang, et al. (2009). "Production of few-layer graphene by supercritical CO2 exfoliation of graphite." Materials Letters 63(23): 1987-1989.

Shen, J., Y. Hu, et al. (2009). "Fast and facile preparation of graphene oxide and reduced graphene oxide nanoplatelets." Chemistry of Materials 21(15): 3514-3520.

Soldano, C., A. Mahmood, et al. (2010). "Production, properties and potential of graphene." Carbon 48(8): 2127-2150.

[108]Cao, Y., J. Feng, et al. (2010). "Alkyl-functionalized graphene nanosheets with improved lipophilicity." Carbon 48(5): 1683-1685.

Fang, M., K. Wang, et al. (2009). "Covalent polymer functionalization of graphene nanosheets and mechanical properties of composites", Journal of Materials Chemistry 19(38): 7098-7105. (initiator molecules covalently bonded to the graphene surface via a diazonium addition and the succeeding atom transfer radical polymerization bonded polystyrene chains to the graphene nanosheets. Polystyrene nanocomposites with 0.9 wt % graphene nanosheets had ~70% and 57% increases in tensile strength and Young's modulus)

Fang, M., K. Wang, et al. (2010). "Single-layer graphene nanosheets with controlled grafting of polymer chains", Journal of Materials Chemistry 20(10): 1982-1992. (measured thermal conductivity for polystyrene composite film with 2.0 wt % Graphene nanosheets increased by a factor of 2.6)

Jeon, I.-Y., L.-S. Tan, et al. (2008). "Nanocomposites derived from in situ grafting of linear and hyperbranched poly(ether-ketone)s containing flexible oxyethylene spacers onto the surface of multiwalled carbon nanotubes." Journal of Polymer Science, Part A: Polymer Chemistry 46(11): 3471-3481.

Li, J., H. Lin, et al. (2008). "Instant modification of graphite nanosheets by the grafting of a styrene oligomer under microwave radiation." Journal of Applied Polymer Science 109(3): 1377-1380.

Paunikallio, T., M. Suvanto, et al. (2008). "Grafting of 3-(trimethoxysilyl)propyl methacrylate onto polypropylene and use as a coupling agent in viscose fiber/polypropylene composites." Reactive and Functional Polymers 68(3): 797-808.

Takei, T. (2010). "Electrochemical preparation of hybrid film using inorganic nanosheets and the related electrochemical properties." Nippon Seramikkusu Kyokai Gakujutsu Ronbunshi/Journal of the Ceramic Society of Japan 118(1376): 257-262.

Zhang, B., Y. U. Chen, et al. (2010). "Poly(N-vinylcarbazole) chemically modified graphene oxide." Journal of Polymer Science, Part A: Polymer Chemistry 48(12): 2642-2649.

Zhi, C., Y. Bando, et al. (2007). "Grafting boron nitride nanotubes: From polymers to amorphous and graphitic carbon." Journal of Physical Chemistry C 111(3): 1230-1233.

[109]Tzung-Hua Lin, et al, (2010), "Bioinspired assembly of surface-roughened nanoplatelets", Journal of Colloid and Interface Science 344 (2010) 272-278P. Podsiadlo, et al, (2007), "Ultrastrong and Stiff Layered Polymer Nanocomposites", Science 318, 80 (LBL work)

[110]In 2005, ApNano announced a nanocomposite armor material based on tungsten disulfide (and subsequently TiS2) nanotubes, which was also recently tested in France. WS$_2$ and TiS$_2$ are reportedly less expensive to manufacture than carbon nanotubes, but not as strong. DoD reportedly expressed interest in carbon nanotube fiber cloth developed at Cambridge University and Nanocomp for personal minor. Graphene nanosheets are ultimately less expensive than TiS$_2$ or carbon nanotubes, and stronger in the overall 2-dimension geometry optimized for impact-spreading and resistance needed for minor applications.

[111]HongSheng, et al, (2010), "HPHT preparation and Micro-Raman characterization of polycitystalline diamond compact with low residual stress", SCIENCE CHINA-Physics, Mechanics & Astronomy, Vol. 53, p 1.445-4448

[112]N. V. Nechitailo, (2009), "Advanced High-Speed Ceramic Projectiles Against Hard Targets, IEEE Transactions on Magnetics, VOL. 45, NO. 1, January, 2009

[113]Naval use of H$_2$ and NH$_3$ is not uncommon Missile combustion engines are cooled by liquid hydrogen propellant. Gelman 212/214 and Russian 677 Lada Class submarines use liquid hydrogen. NH$_3$ is easier to handle than hydrogen because it melts at −77° C., boils at −33.34° C. and has the advantage of a high heat of vaporization (1371 kJ kg$^{-1}$), while that of CH$_4$ is 760 kJ kg$^{-1}$ and H$_2$ is only 452 kJ kg$^{-1}$. Liquid hydrogen and ammonia can be manufactured on-board by nuclear-powered (electric) navy ships, starting with hydrolysis of sea water, further reducing magazine and munitions storage requirements, which is a goal of naval railgun systems.

[114]Larger projectiles preferably have liquid H$_2$/NH$_3$ injected at launch. Smaller projectiles may contain hydrogen storage materials such as LiAlH$_4$, (Na,Mg)BH$_4$, etc., which release hydrogen at moderate temperatures.

[115]Bruckner, A. and A. Higgins (1997). Investigation of Ram Accelerator Gasdynamic Limits. United States: 166p.

Chandwick, K. M., D. J. DeTurris, et al. (1993). "Direct measurement of skin friction in supersonic combustion flow fields." Journal of Engineering for Gas Turbines and Power 115(3): 507-514.

Choi, J.-Y., I.-S. Jeung, et al. (1996). Transient simulation of superdetonative mode initiation process in scram-accelerator, Napoli, Italy, Combustion Inst.

Denman, A. W., P. A. Jacobs, et al. (2005). Compressible, turbulent flow with boundary-layer heat addition, Reno, Nev., United states, American Institute of Aeronautics and Astronautics Inc. (reduction in viscous drag in scramjet combustors through hydrogen combustion in the boundary layer)

Gonor, A. L., V. A. Khaikine, et al. (2007). Numerical simulations of the performance of scramjet engine with pylon set and of the supersonic star-shaped inlet flow, Reno, Nev., United states, American Institute of Aeronautics and Astronautics Inc.

Goyne, C. P., R. J. Stalker, et al. (1999). "Shock-tunnel skin-friction measurement in a supersonic combustor." Journal of Propulsion and Power 15(5): 699-705.

Miller, A. R. (2010). "Hydrogen tube vehicle for supersonic transport: 2. Speed and energy." International Journal of Hydrogen Energy 35(11): 5745-5753. (low density of hydrogen increases sonic speed by a factor of 3.8 and decreases drag by 15 relative to air)

Paull, A., R. J. Stalker, et al. (1995). "Experiments on supersonic combustion ramjet propulsion in a shock tunnel." Journal of Fluid Mechanics 296: 159-183

Singh, D. J., M. H. Carpenter, et al. (1997). Thrust Enhancement in Hypervelocity Nozzles by Chemical Catalysis. United States: 4p.

Stalker, R. J. (2006). Scramjets, sub-orbital flight and skin friction, Canberra, Australia, American Institute of Aeronautics and Astronautics Inc. (Combustion of hydrogen in turbulent boundary layers to reduce skin friction. When applied to a simplified scramjet flowpath in flight at 4.3 km/s (Mach 14), the use of boundary layer combustion doubles the net hydrogen fuel specific impulse for the scramjet)

Stalker, R. J., A. Paull, et al. (2005). "Scramjets and shock tunnels—The Queensland experience." Progress in Aerospace Sciences 41(6): 471-513.

Stalker, R. J., J. M. Simmons, et al. (1995). Measurements of Scramjet Thrust in Shock Tunnels. Australia: 11p.

Tanno, H., A. Paull, et al. (2001). "Skin-friction measurements in a supersonic combustor with crossflow fuel injection." Journal of Propulsion and Power 17(6): 1333-1338.

[116]To maximize thermal output, an energetic metal sabot composite interior surface should not form a self-protective alumina coating. Nanoscale thermite composites with a strong aluminum matrix containing $Fe_2O_3$ and CuO nanoparticles (please see my Nov. 6, 2008 Final Report for Navy SBIR Contract N68936-08-C-0047, "Low-Cost Production of Super-Therinites", and my Jun. 11, 2010 Final Report for Darpa SBIR Contract W31P4Q-09-C-0329 to the extent they are available). Reactive metal hydrides such as $TiH_2$ and titanium subhydrides, and less-energetic organic fluorides can also be incorporated in a strong aluminum matrix, to destroy a protective $Al_2O_3$ surface of the sabot-scramjet interior as it oxidizes.

[117]S. Hussain et al, "Growth of carbon nanostructures on p-, i- and n-Si substrates by electrochemical route", J. Phys. D: Appl. Phys. 46 (2013) 355301

[118]Sasaki, I., et al. (2011). "Microstructural Stability of Electrically Conducting Diamond Powder as Probed Using Electrochemical Methods and In Situ Raman Spectroscopy." Journal of the Electrochemical Society 158 (11): 1446-1452

Liang, G., et al. (2010). "Oxidation resistance of bare and pt-coated electrically conducting diamond powder as assessed by thermogravimetric analysis." Journal of the Electrochemical Society 157(1): 19-25

Ay, A., et al. (2008). "The physicochemical and electrochemical properties of 100 and 500 nm diameter diamond powders coated with boron-doped nanocrystalline diamond." Journal of the Electrochemical Society 155(10): B1013-B1022.

Swope, V. M., et al. (2007). Conductive diamond powder: A new catalyst support for the polymer electrolyte membrane fuel cell. Multifunctional Carbon Materials for Electrochemical and Electronic Applications—210th ECS Meeting, ECS Transactions Vol 3 pp 27-36

[119]L. Constant et al, "AES and XPS observations of HFCVD diamond deposition on monocrystalline (111) copper", Diamond and Related Materials, Volume 6, Issues 5-7, Pages 664-667 (1997)

[120]J. Nathan Hohman et al, "Cage molecules for self-assembly", Materials Science and Engineering R 70 (2010) 188-208

[121]W A Clay et al, "Photocathode device using diamondoid and cesium bromide films", Applied Physics Letters 101, 241605 (2012)

Fei Hua Li et al, "Covalent Attachment of Diamondoid Phosphonic Acid Dichlorides to Tungsten Oxide Surfaces", Langmuir (2013) 29, 9790-9797

Andrey A. Fokin et al, "Selective Preparation of Diamondoid Phosphonates", J. Org. Chem. (2014) 79, 5369-5373

W A Clay et al, "Physical properties of materials derived from diamondoid molecules", Rep. Prog. Phys. 78 (2015) 016501

[122]Sri Sai S. Vegunta et al, "Electrochemical and Thermal Grafting of Alkyl Grignard Reagents onto (100) Silicon Surfaces", Langmuir 2009, 25(21), 12750-12756;

T. Yamada, et al, "Detection of C— Si Covalent Bond in $CH_3$ Adsorbate Formed by Chemical Reaction of $CH_3MgBr$ and H:Si(111)", J. Am. Chem. Soc., 125, 8039 (2003)

Tetsuya Osaka, et al, "Electrical and Electrochemical Properties of Alkyl-Monolayer Modified Si (111) in the Presence of Water", Journal of The Electrochemical Society, 154 (11) H919-H926 (2007)

M. Orosco et al. (2006) "Protein-coated porous-silicon photonic crystals for amplified optical detection of protease activity", Adv. Mater. 18, 1393 (2006)

Inez N. Lees et al, "Chemical Stability of Porous Silicon Surfaces Electrochemically Modified with Functional Alkyl Species", Langmuir 2003, 19, 9812-9817

Janet M. Holland et al, "Metal Mediated Reactions on Porous Silicon Surfaces", Journal of Solid State Chemistry 147, 251-258 (1999)

Huck, L. A. and J. M. Buriak, "Toward a mechanistic understanding of exciton mediated hydrosilylation on nanocrystalline silicon." Journal of the American Chemical Society 134(1): 489-497 (2012)

Guo, D.-J., J. Wang, et al. (2009). "Macroporous silicon templated from silicon nanocrystallite and functionalized Si—H reactive group for grafting organic monolayer", Journal of Colloid and Interface Science 336(2): 723-729.

Petit, A., M. Delmotte, et al. (2008). "Microwave effects on chemical functionalization of hydrogen-terminated porous silicon nanostructures." Journal of Physical Chemistry C 112(42): 16622-16628.

Wenju Feng et al, "Fullerene monolayer-modified porous Si. Synthesis and photoelectrochemistry." Electrochemical and Solid-State Letters 1(4): 172-174 (1998)

Wenju Feng et al, "Self-Assembly and Characterization of Fullerene Monolayers on Si(100) Surfaces", Langmuir 15, 3152-3156 (1999)

Buriak, J. M. and M. J. Allen, "Photoluminescence of porous silicon surfaces stabilized through Lewis acid mediated hydrosilylation." Journal of Luminescence 80(1-4): 29-35 (1998)

J. M. Buriak, M. J. Allen, Journal of the American Chemical Society 120 (1998) 1339-1340.

M. R. Linford, C. E. D. Chidsey, Journal of the American Chemical Society 115 (1993) 12631-12632.

R. Boukherroub, A. Petit, A. Loupy, J. N. Chazalviel, F. Ozanam, Journal of Physical Chemistry B 107 (2003) 13459-13462.

R. Boukherroub, J. T. C. Wojtyk, D. D. M. Wayner, D. J. Lockwood, Journal of the Electrochemical Society 149 (2002) 59-63.

M. P. Stewart, J. M. Buriak, Angewandte Chemie International Edition 37 (1998) 3257-3260.

E. C. Wu, J.-H. Park, J. Park, E. Segal, F. Cunin, M. J. Sailor, ACS Nano 2 (2008) 2401-2409.

E. Segal, L. A. Perelman, T. Moore, E. Kesselman, M. J. Sailor, Physica Status Solidi C 6 (2009) 1717-1720.

[123]eg, see E. C. Capaldi et al, U.S. Pat. No. 3,467,318 "Alkenyl Adamantanes", issued Jul. 22, 1969, as well as U.S. Pat. Nos. 6,858,700; 7,312,562; 7,306,674; 7,884, 256; 8,154,185; and 8,420,768

[124] WenLiang He et al, "Electrodeposition mechanism of hydrogen-free diamond-like carbon films from organic electrolytes", Carbon 43 (2005) 2000-2006

[125] Aiping Zeng et al, "Diamond-like carbon (DLC) films as electrochemical electrodes", Diamond & Related Materials 43 (2014) 12-22

[126] Swain, G. M. (1994), "Susceptibility to surface corrosion in acidic fluoride media: A comparison of diamond, HOPG, and glassy carbon electrodes" Journal of the Electrochemical Society 141(12): 3382-3393.

[127] Raid A Ismail et al, "Synthesis and characterization of diamond-like carbon film on silicon by electrodeposition from solution of ethanol and methanol", Materials Science in Semiconductor Processing 27 (2014) 461-467

[128] A. Faucheux et al, "Mechanisms of Thermal Decomposition of Organic Monolayers Grafted on (111) Silicon", Langmuir 2007, 23, 1326-1332

Francois Ozanam et al, "Greffage de molecules a la surface du silicium par voie electrochimique", The Canadian Journal Of Chemical Engineering, V 76, 1020-1026 (1998)

[129] T. Yano et al, "Electrochemical Behavior of Highly Conductive Boron-Doped Diamond Electrodes for Oxygen Reduction in Acid Solution", Journal of The Electrochemical Society, 146 (3) 1081-1087 (1999)

[130] S. Yoshihara et al, "Photoelectrodeposition of copper on boron-doped diamond films: application to conductive pattern formation on diamond. The photographic diamond surface phenomenon", Electrochimica Acta 44 (1999) 2711-2719

[131] Siqing He et al, "Synthesis of carbon films containing diamond particles by electrolysis of methanol", Thin Solid. Films 517 (2009) 5625-5629

[132] B. Ghosh et al, "Electrodeposited diamond-like carbon (DLC) films on n-Si(100) substrates for photovoltaic application", Materials Science in Semiconductor Processing 25 (2014) 130-136

R. K. Roy et al, Vacuum 70 (2003) 543-549.

R. K. Roy et al, Thin Solid Films 422 (2002) 92-97

[133] Ma Zhi-bin et al, "Deposition of Diamond Films on Copper Substrate", Plasma Science and Technology, Volume 2, Issue Number 2 p, 207-212 (2000)

[134] L. Constant et al, "HFCVD diamond growth on Cu(111). Evidence for carbon phase transformations by in situ AES and XPS", Surface Science 387, 2843 (1997)

[135] C. Li et al, "The influence of C60 as intermediate on the diamond nucleation on copper substrate in HFCVD", Applied Surface Science 207 (2003) 169-175

[136] R. S. Li et al, "Effect of deposition voltage on the field emission properties of electrodeposited diamond-like carbon films", Applied Surface Science 255 (2009) 4754-4757

[137] Kenneth R. Rodriguez et al, "Enhanced infrared absorption spectra of self-assembled alkanethiol monolayers using the extraordinary infrared transmission of metallic arrays of subwavelength apertures", Journal Of Chemical Physics Volume 121, Number 18 p. 8671-8674 (2004)

[138] W. L. Yang et al, "Monochromatic Electron Photoemission from Diamondoid Monolayers", Science 316, 1460 (2007)

[139] T. M. Willey et al, "Observation of quantum confinement in the occupied states of diamond clusters", Physical Review B 74, 205432 (2006); A. Ulman, "Formation and Structure of Self-Assembled Monolayers", Chemical Reviews 96, 1533 (1996).

[140] See Kosuke Izutsu, Electrochemistry in Nonaqueous Solutions, p 254, (2002) Wiley-VCH Verlag GmbH & Co. KGaA ISBNs: 3-527-30516-5; 3-527-60065-5

[141] see, eg, Ladislav Kavan, "Electrochemical Carbon", Chem. Rev. 1997, 97, 3061-3082

[142] Fischer, A. E., et al, "Preparation and electrochemical characterization of carbon paper modified with a layer of boron-doped nanocrystalline diamond." Journal of the Electrochemical Society 154(9): 61-67 (2007)

[143] U.S. Pat. Nos. 3,467,318; 5,017,734; 6,858,700; 7,312,562; 7,306,674; 7,884,256; 8,154,185; 8,420,768

[144] Sri Sai S. Vegunta et al, "Electrochemical and Thermal Grafting of Alkyl Grignard Reagents onto (100) Silicon Surfaces", Langmuir 2009, 25(21), 12750-12756;

T. Yamada, et al, "Detection of C— Si Covalent Bond in $CH_3$ Adsorbate Formed by Chemical Reaction of $CH_3MgBr$ and H:Si(111)", J. Am. Chem. Soc., 125, 8039 (2003)

Tetsuya Osaka, et al, "Electrical and Electrochemical Properties of Alkyl-Monolayer Modified Si (111) in the Presence of Water", Journal of The Electrochemical Society, 154 (11) H919-H926 (2007)

M. Orosco et al. (2006) "Protein-coated porous-silicon photonic crystals for amplified optical detection of protease activity", Adv. Mater. 18, 1393 (2006)

Inez N. Lees et al, "Chemical Stability of Porous Silicon Surfaces Electrochemically Modified with Functional Alkyl Species", Langmuir 2003, 19, 9812-9817

Janet M. Holland et al, "Metal Mediated Reactions on Porous Silicon Surfaces", Journal of Solid State Chemistry 147, 251-258 (1999)

Huck, L. A. and J. M. Buriak, "Toward a mechanistic understanding of exciton mediated hydrosilylation on nanocrystalline silicon." Journal of the American Chemical Society 134(1): 489-497 (2012)

Guo, D.-J., J. Wang, et al. (2009). "Macroporous silicon templated from silicon nanocrystallite and functionalized Si—H reactive group for grafting organic monolayer", Journal of Colloid and Interface Science 336(2): 723-729.

Petit, A., M. Delmotte, et al. (2008). "Microwave effects on chemical functionalization of hydrogen-terminated porous silicon nanostructures." Journal of Physical Chemistry C 112(42): 16622-16628.

Wenju Feng et al, "Fullerene monolayer-modified porous Si. Synthesis and photoelectrochemistry." Electrochemical and Solid-State Letters 1(4): 172-174 (1998)

Wenju Feng et al, "Self-Assembly and Characterization of Fullerene Monolayers on Si(100) Surfaces", Langmuir 15, 3152-3156 (1999)

Buriak, J. M. and M. J. Allen, "Photoluminescence of porous silicon surfaces stabilized through Lewis acid mediated hydrosilylation." Journal of Luminescence 80(I-4): 29-35 (1998)

J. M. Buriak, M. J. Allen, Journal of the American Chemical Society 120 (1998) 1339-1340.

M. R. Linford, C. E. D. Chidsey, Journal of the American Chemical Society 115 (1993) 12631-12632.

R. Boukherroub, A. Petit, A. Loupy, J. N. Chazalviel, F. Ozanam, Journal of Physical Chemistry B 107 (2003) 13459-13462.

R. Boukherroub, J. T. C. Wojtyk, D. D. M. Wayner, D. J. Lockwood, Journal of the Electrochemical Society 149 (2002) 59-63.

M. P. Stewart, J. M. Buriak, Angewandte Chemie International Edition 37 (1998) 3257-3260.

E. C. Wu, J.-H. Park, J. Park, E. Segal, F. Cunin, M. J. Sailor, ACS Nano 2 (2008) 2401-2409.

E. Segal, L. A. Perelman, T. Moore, E. Kesselman, M. J. Sailor, Physica Status Solidi C 6 (2009) 1717-1720.

[145]Natalie A. Fokina et al, "Synthesis of Diamondoid Carboxylic Acids", Synthesis 2012,44, 259-264

T. M. Willey et al, J. Am. Chem. Soc. 2008,130,10536

Willey, T. M., et al. (2008). "Near-edge X-ray absorption fine structure spectroscopy of diamondoid thiol monolayers on gold." Journal of the American Chemical Society 130(32): 10536-10544

[146]Anu Stella Mathews et al, "Fully Aliphatic Polyimides from Adamantane-Based Diamines for Enhanced Thermal Stability, Solubility, Transparency, and Low Dielectric Constant", Journal of Applied Polymer Science, Vol. 102, 3316-326 (2006)

[147]George A. Olah et al, "Bridgehead Adamantyl, Diamantyl, and Related Cations and Dications", J. Am. Chem. Soc. 107, 2764-2772 (1985)

The invention claimed is:

1. A method for electrodepositing diamondlike carbon comprising the steps of:
cathodically electrodepositing diamondlike carbon on an electrodeposition substrate from a carbon source electrolyte to form an $sp^3$ and $sp^2$ carbon containing diamondlike carbon cathodic DLC electrodeposit layer,
anodically preferentially removing $sp^2$ carbon from said cathodic DLC electrodeposit layer to form an $sp^3$ carbon enhanced DLC layer with decreased $sp^2$ carbon content and an enhanced proportion of $sp^3$ carbon content to $sp^2$ carbon content compared to said cathodic DLC layer prior to said preferential $sp^2$ carbon removal, and
cathodically electrodepositing diamondlike carbon on said $sp^3$-carbon enhanced DLC layer to form a contiguous, monolithic diamondlike carbon electrodeposit layer.

2. The method in accordance with claim 1 wherein said electrodeposition is carried out with an electrolyte comprising one or more $sp^3$ carbon-containing polar solvents comprising acetonitrile, methyl alcohol, ethyl alcohol, dimethyl formamide, acetic acid, formic acid, and dimethyl sulfoxide.

3. The method in accordance with claim 1 wherein said electrodeposition substrate is selected from the group consisting of graphite, amorphous carbon, carbon fibers, semiconducting substrates and metal substrates.

4. The method in accordance with claim 1 wherein electrodeposition current employed in said electrodeposition is from about 2 to about 300 milliamperes per square centimeter of electrodeposition substrate surface.

5. The method in accordance with claim 1 wherein the anodic step removes from about 5% to about 90% by weight of the carbon electrodeposited.

6. The method in accordance with claim 1 wherein UV/blue light is applied to diamondlike carbon being electrodeposited, or wherein electroconductive particles are co-electrodeposited with cathodically electrodeposited diamondlike carbon, to increase the electrical conductivity of the electrodeposited DLC.

7. The method in accordance with claim 1 wherein periodic anodic treatment is applied to produce multilayered diamondlike carbon electrodeposits of different composition and properties comprising $sp^3$ layers of 5-50 nm thickness, interleaved with layers of 5-10 nm thickness having higher $sp^2$ content than said $sp^3$ layers.

8. The method in accordance with claim 1 wherein n- or p-type diamondlike carbon is electrodeposited atop an opposite-type diamondlike carbon layer, with or without an intermediate intrinsic diamondlike carbon zone, by changing electrolytes having different electrodeposition dopants.

9. The method in accordance with claim 1 wherein an at least partially ordered substantially monomolecular layer of a DLC forming organocarbon is provided prior to initial cathodic electrodeposition of diamondlike carbon on said substrate, and wherein subsequent cathodic electrodeposition forms an $sp^3$ and $sp^2$ continuous carbon layer having a thickness between about 0.4 microns and about 10 microns.

10. The method in accordance with claim 1 wherein said electrodeposition is carried out at temperatures in the range of from about 20° C. to about 175° C. at atmospheric or elevated pressures up to about 20 atmospheres.

11. The method in accordance with claim 1 wherein an interelectrode electrodeposition voltage in the range of from about 800 volts to about 2000 volts is applied for nonconductive electrolytes or in the range of from about 10 volts to about 200 volts for electrically conductive electrolytes.

12. The method in accordance with claim 1 wherein the electrodeposition rate of said electrodeposition (excluding codeposited particulates) is in the range of from about 1 to about 20 nanometers per minute.

* * * * *

UNITED STATES PATENT AND TRADEMARK OFFICE
CERTIFICATE OF CORRECTION

PATENT NO. : 10,941,500 B1
APPLICATION NO. : 16/369393
DATED : March 9, 2021
INVENTOR(S) : James J. Myrick Page 1 of 1

It is certified that error appears in the above-identified patent and that said Letters Patent is hereby corrected as shown below:

In the Specification

In Column 5, Line 7, delete "HO %)" and replace with -- (~10 %) --

In Column 40, Line 54, delete "adamantine" and replace with -- adamantane --

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*